United States Patent
Bahe et al.

(10) Patent No.: US 11,370,150 B2
(45) Date of Patent: Jun. 28, 2022

(54) BLADDER SYSTEM FOR CURING COMPOSITE PARTS

(71) Applicant: The Boeing Company, Chicago, IL (US)

(72) Inventors: Amy Elizabeth Bahe, Tukwila, WA (US); Megan E. Bliss, SeaTac, WA (US); William Hollensteiner, Auburn, WA (US); William Henry Ingram, Jr., Puyallup, WA (US); John Dempsey Morris, Seattle, WA (US); Jonathan Santiago, Seattle, WA (US); Benjamin Jeffrey Stephenson, Seattle, WA (US); Samuel Ray Stewart, Redmond, WA (US); Charles William Thomas, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/834,177

(22) Filed: Mar. 30, 2020

(65) Prior Publication Data
US 2020/0223106 A1    Jul. 16, 2020

Related U.S. Application Data

(62) Division of application No. 14/714,590, filed on May 18, 2015, now abandoned.

(51) Int. Cl.
*B29C 33/50*    (2006.01)
*B29C 70/34*    (2006.01)

(52) U.S. Cl.
CPC .......... *B29C 33/505* (2013.01); *B29C 70/342* (2013.01)

(58) Field of Classification Search
None
See application file for complete search history.

(56) References Cited

U.S. PATENT DOCUMENTS

| 4,186,044 A | 1/1980 | Bradley |
| 4,947,584 A * | 8/1990 | Wexler .................... E06B 7/215 49/307 |

(Continued)

FOREIGN PATENT DOCUMENTS

| DE | 102010004865 | 7/2011 |
| JP | H07246486 | 9/1995 |

(Continued)

OTHER PUBLICATIONS

Office Action of Substantive Examination issued by the Federal Service for Intellectual Property in application No. 2016018614/05(013504) dated Aug. 7, 2019. English translation included.

(Continued)

*Primary Examiner* — Christopher T Schatz
(74) *Attorney, Agent, or Firm* — McDonnell Boehnen Hulbert & Berghoff LLP

(57) ABSTRACT

A structure comprising a plurality of walls defining a bladder cavity, the bladder cavity comprises an initial cross section size. A first plurality of wave features provided along at least one of the plurality of walls defining the bladder cavity. In one arrangement, the first plurality of wave features allow (Continued)

the structure to expand from the initial cross section size to a second cross section size after the structure becomes inflated during a composite charge cure, the second cross section size larger than the initial cross sectional size.

20 Claims, 29 Drawing Sheets

(56) References Cited

U.S. PATENT DOCUMENTS

| | | | |
|---|---|---|---|
| 5,366,684 | A | 11/1994 | Comeau, Jr. |
| 5,421,932 | A * | 6/1995 | Fujio ................ B29C 66/1224 156/192 |
| 6,458,309 | B1 | 10/2002 | Allen et al. |
| 8,430,984 | B2 | 4/2013 | Lee et al. |
| 2005/0211843 | A1 | 9/2005 | Simpson et al. |
| 2006/0118238 | A1 | 6/2006 | Hossein |
| 2010/0139850 | A1 | 6/2010 | Morris et al. |
| 2010/0282350 | A1 * | 11/2010 | Lofving ................ B29C 66/547 138/97 |
| 2011/0233837 | A1 | 9/2011 | Schibsbye |
| 2013/0327477 | A1 | 12/2013 | Hollensteiner et al. |
| 2016/0031167 | A1 * | 2/2016 | Dull ................ B29C 33/505 156/382 |

FOREIGN PATENT DOCUMENTS

| | | |
|---|---|---|
| JP | 2005-534533 | 11/2005 |
| JP | 2011-235635 | 11/2011 |
| RU | 1838133 | 8/1993 |
| RU | 2303320 | 7/2007 |
| RU | 2392121 | 6/2010 |
| RU | 2558315 | 7/2015 |
| WO | WO 2009/066674 | 5/2009 |

OTHER PUBLICATIONS

Notification of Third Office Action issued by the Chinese Patent Office in application No. 2016102481128 dated Aug. 20, 2020. English translation included.

Decision of Rejection issued by the Japanese Patent Office in application No. 2016-093571 dated Sep. 15, 2020. English translation included.

* cited by examiner

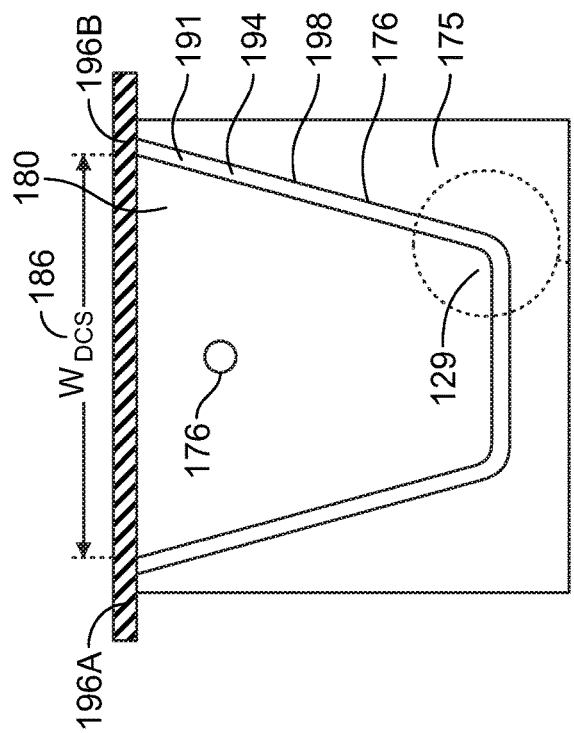
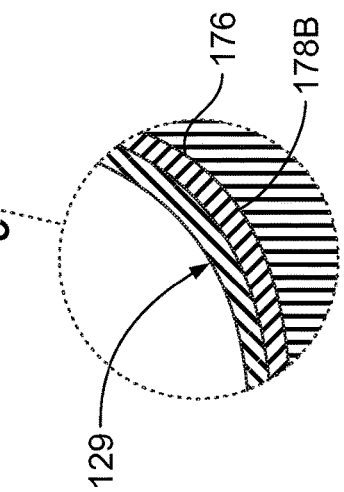
FIG. 9
FIG. 10
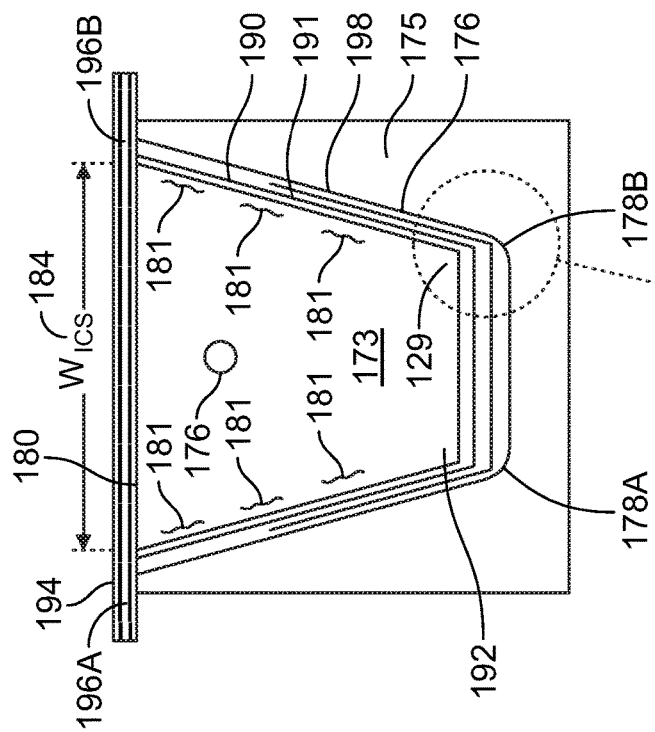
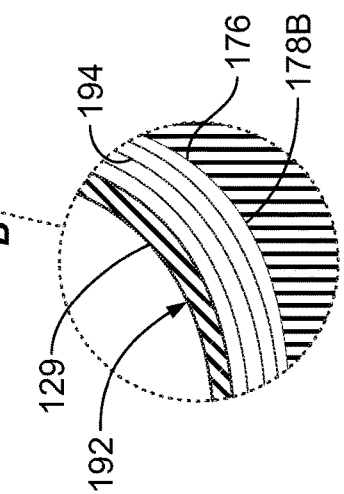
FIG. 7
FIG. 8

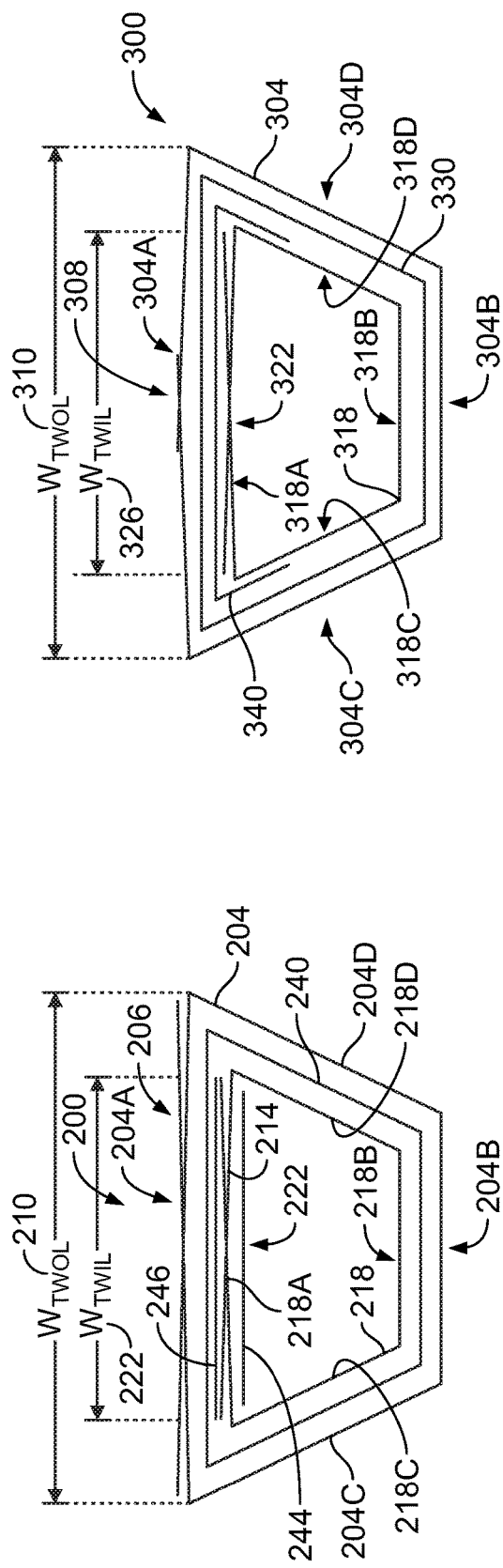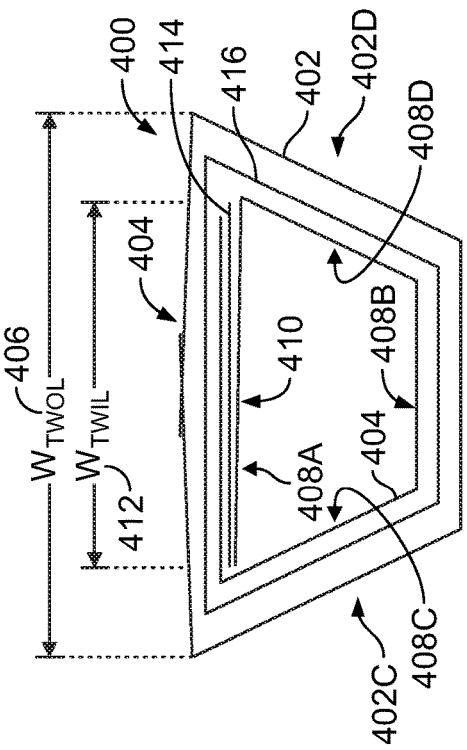

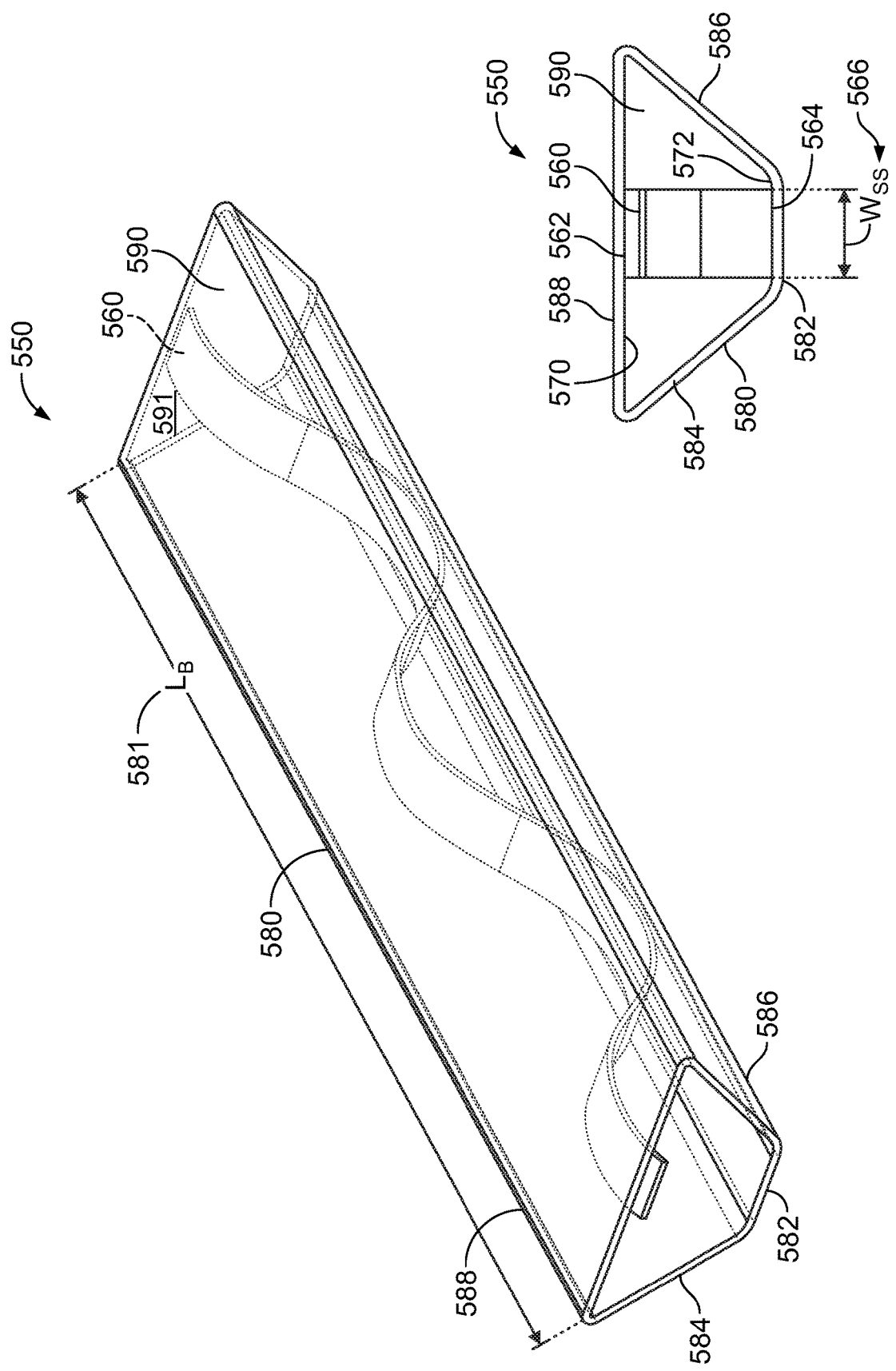

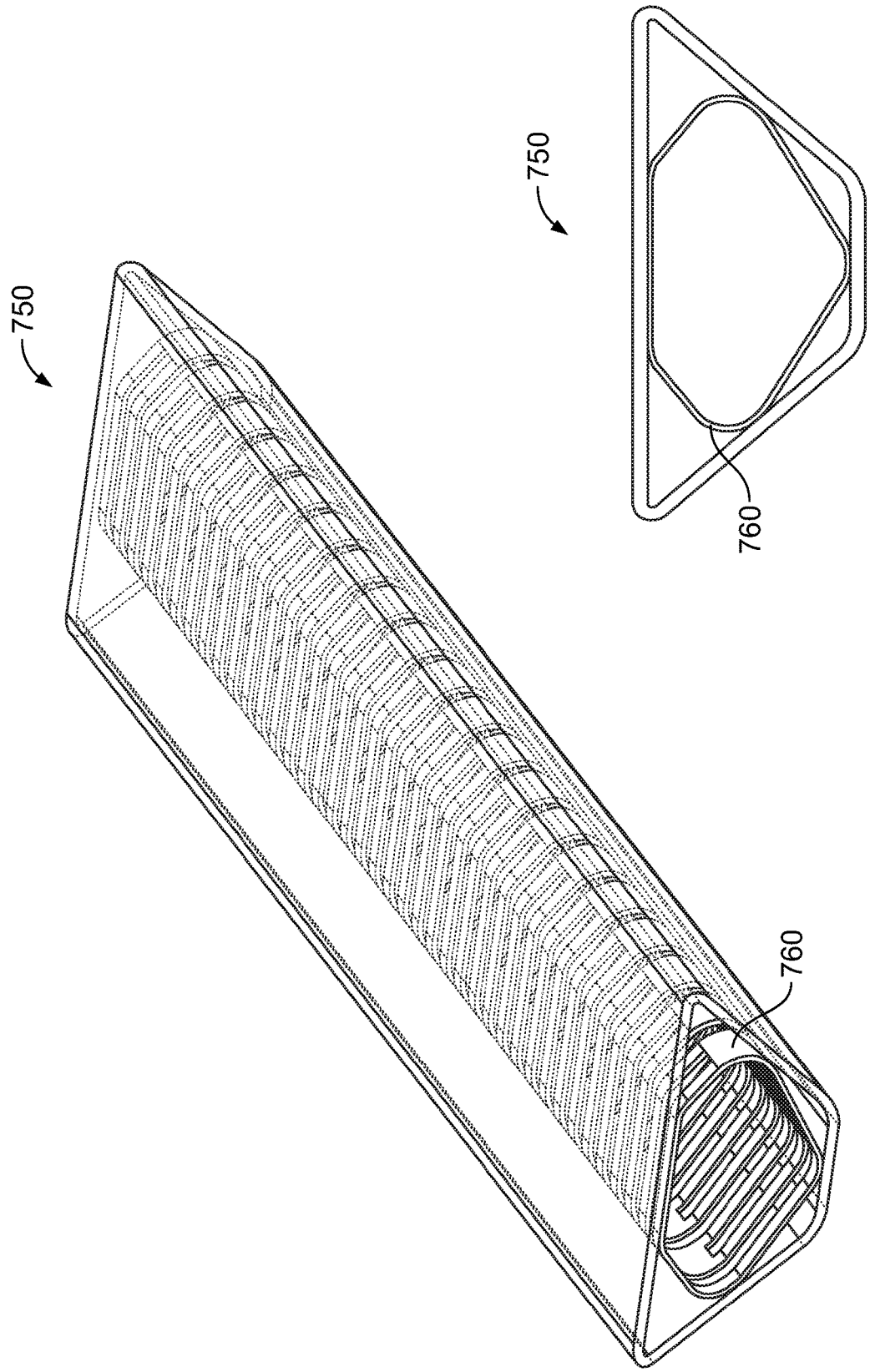

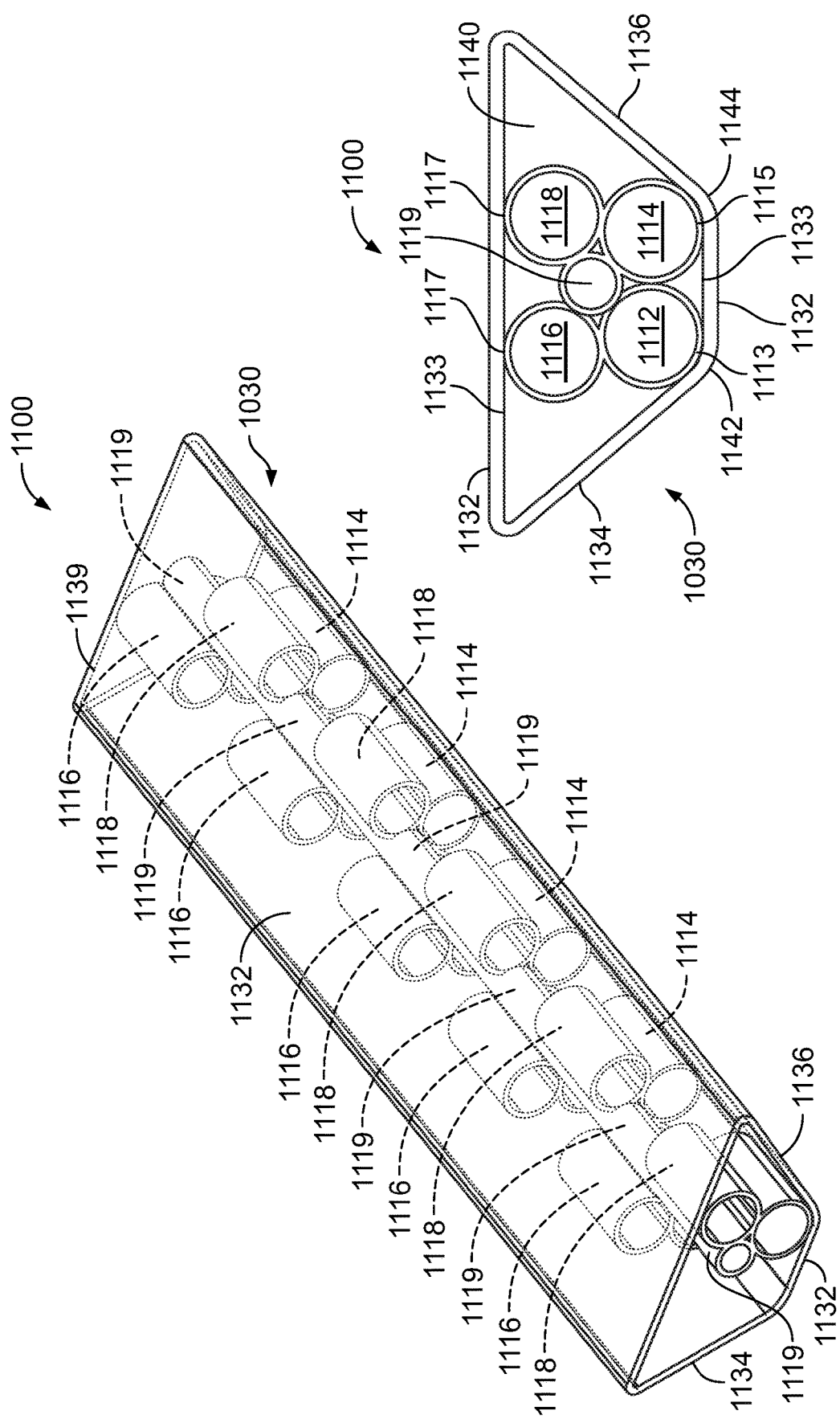

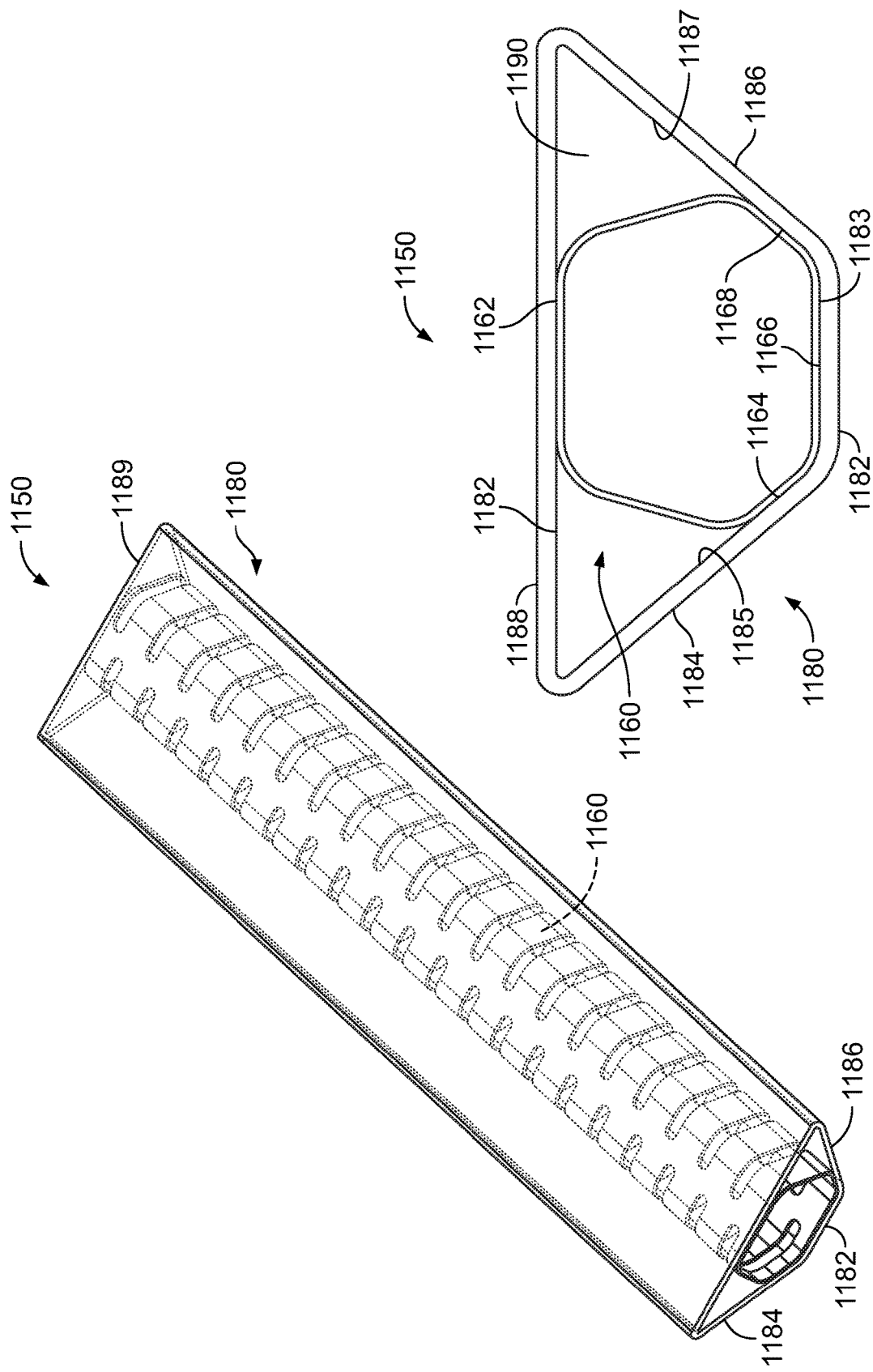

BLADDER SYSTEM FOR CURING COMPOSITE PARTS

CROSS REFERENCE TO RELATED APPLICATION

The present application is a divisional of U.S. patent application Ser. No. 14/714,590 filed May 18, 2015. The entire disclosure contents of this application is herewith incorporated by reference into the present application

FIELD

The present disclosure generally relates to methods and equipment for fabricating composite resin parts, and generally relates to bladder systems that are used in curing composite parts.

BACKGROUND

Composite resin parts may be cured within an autoclave that applies heat and pressure to the composite part during a cure cycle. Some part geometries include internal cavities that may cause the composite part to collapse under autoclave pressure unless a tool such as an inflatable bladder is placed in a composite part cavity. Such an inflatable bladder may be inflated during a cure process so as to react to the autoclave pressure force applied to the composite part. Typically, these inflatable bladders are pressurized by venting them through a vacuum bag.

There are several problems with the vented bladders that often lead to inconsistencies in the cured parts. For example, failure to properly vent the bladder may prevent the bladder from becoming pressurized sufficiently to react to the applied autoclave pressures. Similarly, insufficient bladder pressurization may result from a failure of a sealant used to seal a vent hole coupling the bladder with an outside vent. It is also possible for a bladder wall to fail or be penetrated, in which event autoclave gases may be forced into the part throughout the cure cycle. In addition, it is sometimes difficult to design a nominal bladder cross section that is both small enough to fit inside a composite stringer prior to cure, yet large enough to expand to a desired cross section during cure. Moreover, because the bladders are flexible during lay up operations, it can be a manufacturing challenge for an Automated Fiber Placement machine operation particularly when orientation dictates that the ply must be laid in a perpendicular direction to that of the bladder: a situation that can cause excess fiber length to be laid.

Accordingly, there is a need for a bladder system that may reduce or eliminate the adverse effects resulting from leaks in the bladder or failure to properly pressurize the bladder. There is also a need for a bladder system that has a desired cross section that allows the bladder to expand during a cure process. There is also a need for a bladder system that reduces the cause of excess fiber length being laid.

SUMMARY

In one arrangement, a structure comprising a plurality of walls defining a bladder cavity is disclosed. The bladder cavity comprises an initial cross section size. A first plurality of wave features provided along at least one of the plurality of walls defining the bladder cavity. In one arrangement, the first plurality of wave features allow the structure to expand from the initial cross section size to a second cross section size after the structure becomes inflated during a composite charge cure, the second cross section size larger than the initial cross sectional size.

In one arrangement, the structure comprises a bottom wall, a first side wall extending from the bottom wall, a second side wall extending from the bottom wall, a first end wall, a second end wall, and a top wall extending from the first end wall to the second end wall enclosing the structure, such that the bottom wall, the first side wall, the second side wall, the first end wall, the second end wall, and the top wall define the bladder cavity, wherein at least one of the bottom wall, the top wall, the first side wall, the first end wall, the second end wall, or the second side wall comprises the first plurality of wave features. In one arrangement, the first plurality of wave features extend over a length of the at least one of the bottom wall, the top wall, the first side wall, the first end wall, the second end wall, or the second side wall.

In one arrangement, the first plurality of wave features extend over a portion of a length of the at least one of the bottom wall, the top wall, the first side wall, the first end wall, the second end wall, or the second side wall. In one arrangement, the first plurality of wave features comprise a plurality of uniform wave features. The first plurality of uniform wave features may comprise a similar radius of curvature. In one arrangement, at least one of the bottom wall, the top wall, the first side wall, the first end wall, the second end wall, or the second side wall comprises a second plurality of wave features. In such an arrangement, the first plurality of wave features may comprise a first radius of curvature and the second plurality of wave features comprise a second radius of curvature. The first radius of curvature may be different than the second radius of curvature.

In one arrangement, a pressure fitting is adapted to be coupled with a vacuum source for inflating the structure.

In one arrangement, a method of curing a charge is described. The method comprising the steps of placing a charge on a tool; installing a structure having an initial cross section size in a charge cavity of the charge placed on the tool; coupling the structure to a vent port; sealing a flex bag over the charge, the tool, and the structure; drawing a vacuum; debulking the charge by inflating the structure; beginning to expand the structure from the initial cross section size to a desired cross section size; increasing an effective pressure that is applied to an inside radii of the charge; finalizing debulking; and curing charge.

In one arrangement, a multilayered bladder system for use in curing of a composite charge having an internal cavity is disclosed. The multilayered bladder comprises a bladder outer layer. The bladder outer layer defining a top wall, a bottom wall, a first sidewall, and a second sidewall, wherein the first and second sides walls extend between the top wall and the bottom. The multilayered bladder further comprising a bladder first inner layer. The bladder first inner layer defining a top wall, a bottom wall, a first sidewall, and a second sidewall, wherein the first and second sides walls extend between the top wall and the bottom wall. The multilayered bladder further comprising a bladder intermediate layer disposed between the bladder outer layer and the bladder first inner layer. In one arrangement, the outer layer comprises an overlapping top wall. For example, in one arrangement, the overlapping top wall of the outer layer comprises a partially overlapping top wall.

In yet another alternative arrangement, the first inner layer comprises an overlapping top wall. For example, the overlapping top wall of the first inner layer comprises a partially overlapping top wall.

In one arrangement, the multilayered bladder comprises a layer of fiberglass provided within the overlapping top wall of the first inner layer. The multilayered bladder may further comprise a second inner layer, the second inner layer provided below the top wall of the first inner layer. For example, in one arrangement, the first inner layer comprises an overlapping top wall, and the second inner layer is provided below the overlapping top wall of the first inner layer. In one arrangement, the second inner layer comprises a fluoroelastic rubber layer.

In yet another arrangement, the multilayered bladder further comprises a plurality of fluoroelastic rubber layers provided between the top wall of the first inner layer and the intermediate layer.

In yet another arrangement, the multilayered bladder further comprises a second inner layer provided between the first inner layer and the intermediate layer. The second inner layer extends along at least a portion of the first sidewall of the first inner layer. In one arrangement, the second inner layer comprises fluoroelastic rubber.

In yet another arrangement, the top wall of the outer layer comprises a first thickness and the first sidewall and the second side wall of the outer layer comprises a second thickness. In one arrangement, the first thickness of the top wall of the outer layer is different than the second thickness of the first and second sidewalls of the outer layer.

In one arrangement, a method of curing a charge is disclosed. The method comprising the steps of placing a charge on a tool; positioning a multilayered structure in a charge cavity defined by the charge placed on the tool; coupling the multilayered structure to a vent port; covering the charge, the tool, and the multilayered structure with a flex bag over; drawing a vacuum; initiating a debulking process of the charge by inflating the multilayered structure; finalizing debulk; and curing the charge.

In one arrangement, a bladder system for use in curing a composite charge having an internal cavity is disclosed. The bladder system comprising a bladder comprising a bladder bottom wall, a first bladder side wall extending from the bottom wall, a second bladder side wall extending from the bottom wall, and a bladder top wall extending from a bladder front wall to a bladder back wall enclosing the bladder. The bladder bottom wall, the first bladder side wall, the second bladder side wall, the bladder top wall, the bladder front wall, and the bladder back wall define a bladder cavity. A flexible bladder support is positioned within the bladder cavity, such that a first bearing surface of the flexible bladder support and a second bearing surface of the flexible bladder support provide a compressive load support between a bottom surface of the bladder top wall and a top surface of the bladder bottom wall. In one arrangement, the bladder support further provides the compressive load support between an inner surface of the bladder first side wall and an inner surface of the bladder second side wall. In one arrangement, the flexible bladder support comprises at least one corkscrew support.

In another arrangement, the flexible bladder support comprises a sinusoidal support. In one arrangement, the sinusoidal support comprises a constant width along a length of the sinusoidal support. In one arrangement, an additional support is provided between the bladder top wall and the sinusoidal support. In one arrangement, the additional support provided between the bladder top wall and the sinusoidal support comprises a rectangular support.

In one arrangement, the support structure comprises a segmented support.

In one arrangement, the flexible bladder support comprises a double concave support. For example, in one arrangement, the double concave support comprises a top bearing surface, a bottom bearing surface, a first side support, and a second side support. The first side support extends in a concave manner from a first end of the bottom bearing surface to a first end of the top bearing surface. The second side support extends in a concave manner between a second end of the bottom bearing surface upwards towards a second end of the top bearing surface.

In one bladder system arrangement, the flexible bladder support extends along an entire length of the bladder. In yet another bladder system arrangement, the bladder system comprises a bladder system comprising wave features. In yet another bladder system arrangement, the bladder system comprises a multilayered bladder system.

In yet another arrangement, a bladder system for use in curing a composite charge having an internal cavity is disclosed. The bladder system comprising a bladder comprising a bladder bottom wall, a first bladder side wall extending from the bottom wall, a second bladder side wall extending from the bottom wall, and a bladder top wall extends from a bladder front wall to a bladder back wall enclosing the bladder. The bladder bottom wall, the first bladder side wall, the second bladder side wall, and the bladder top wall define a bladder cavity. A flexible bladder support is positioned within the bladder cavity, such that a first bearing surface of the flexible bladder support and a second bearing surface of the flexible bladder support provide a compressive load support between a bottom surface of the bladder top wall and an inner surface of the bladder first side wall and an inner surface of the bladder second side wall. In one arrangement, the flexible bladder support comprises a trapezoidal bladder support. In one arrangement, the bladder support comprises a segmented flexible bladder support.

In an alternative arrangement, the bladder support comprises a double concave support structure. In one arrangement, the double concave support structure comprises a top bearing surface, a bottom bearing surface, a first side support, and a second side support. The first side support extends in a concave manner from a first end of the bottom bearing surface to a first end of the top bearing surface. The second side support extends in a concave manner between a second end of the bottom bearing surface upwards towards a second end of the top bearing surface. In one arrangement, the bladder support comprises a segmented bladder support.

In an alternative arrangement, a method of curing a charge is disclosed. The method comprising the steps of placing a charge on a tool; positioning a bladder in a charge cavity defined by the charge placed on the tool; positioning a bladder support into a bladder cavity defined by the bladder; laying up a plurality of plies over the structure and the bladder support; providing a compressive load support by the bladder support; coupling the bladder to a vent port; covering the charge, the tool, and the bladder with a flex bag over; drawing a vacuum; initiating a debulking process of the charge by inflating the bladder; finalizing debulk; and curing the charge.

The features, functions, and advantages can be achieved independently in various arrangements of the present disclosure or may be combined in yet other arrangements in which further details can be seen with reference to the following description and drawings.

BRIEF DESCRIPTION OF THE DRAWINGS

The novel features believed characteristic of the illustrative arrangements are set forth in the appended claims. The illustrative arrangements, however, as well as a preferred mode of use, further objectives and descriptions thereof, will best be understood by reference to the following detailed description of an illustrative arrangement of the present disclosure when read in conjunction with the accompanying drawings, wherein:

FIG. 7 illustrates a perspective view of a charge that has been placed in a cavity of a tool, such as the tool illustrated in FIG. 1;

FIG. 8 illustrates a detailed view of the portion designated as "B" in FIG. 7;

FIG. 9 illustrates a perspective view of a bladder that has been placed in a cavity of a tool, such as the bladder illustrated in FIG. 3;

FIG. 10 illustrates a detailed view of the portion designated as "C" in FIG. 9;

FIG. 11 is an illustration of an alternative bladder arrangement that may be used with the bladder system illustrated in FIG. 1;

FIG. 12 is an illustration of an alternative bladder arrangement that may be used with the bladder system illustrated in FIGS. 1;

FIG. 13A is an illustration of an alternative bladder arrangement that may be used with the bladder system illustrated in FIGS. 1;

FIG. 16A is an illustration of an exemplary bladder support positioned within a bladder, such as the bladder illustrated in FIGS. 6 and 7;

FIG. 16B is a cross sectional view of the bladder support illustrated in FIG. 16A;

FIG. 20A is an illustration an exemplary bladder support positioned within a bladder, such as the bladder illustrated in FIGS. 6 and 7;

FIG. 20B is a cross sectional view of the bladder support illustrated in FIG. 20A;

FIG. 27A is an illustration an exemplary bladder support positioned within a bladder, such as the bladder illustrated in FIGS. 6 and 7;

FIG. 27B is a cross sectional view of the bladder support illustrated in FIG. 27A;

FIG. 28A is an illustration an exemplary bladder support positioned within a bladder, such as the bladder illustrated in FIGS. 6 and 7;

FIG. 28B is a cross sectional view of the bladder support illustrated in FIG. 28A;

DETAILED DESCRIPTION

Disclosed arrangements will now be described more fully hereinafter with reference to the accompanying drawings, in which some, but not all of the disclosed arrangements are shown. Indeed, several different arrangements may be provided and should not be construed as limited to the arrangements set forth herein. Rather, these arrangements are provided so that this disclosure will be thorough and complete and will fully convey the scope of the disclosure to those skilled in the art.

Figure 1:
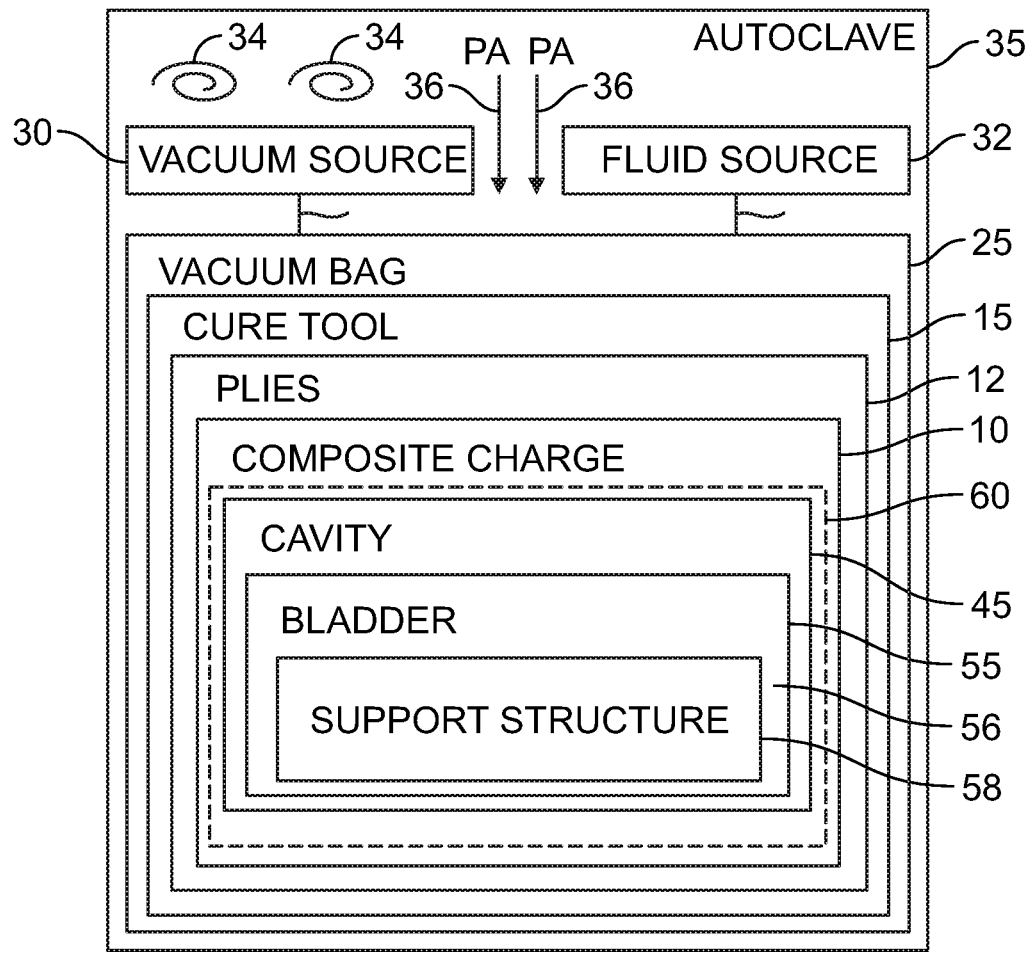
FIG. 1 is an illustration of a functional block diagram of a bladder system according to disclosed arrangements.

Referring first to FIG. 1, an uncured composite resin part 10, may be hereafter referred to as a "charge", a "composite charge", a "composite part charge" or a "stringer charge." Such a charge may be supported within the autoclave. Specifically, the charge 10 may be cured on a cure tool 15 placed in an autoclave 35 in which autoclave heat 34 and pressure 36 are applied to the composite charge 10. The composite charge 10 includes one or more internal voids, trapped or enclosed areas, or cavities, which for ease of description, will collectively be referred hereinafter as a charge cavity 45.

A bladder system 60 comprising a flexible, inflatable bladder 55 is also provided. As just one example, and as will be described in greater detail herein with respect to FIGS. 3-10, the inflatable bladder 55 may comprise a plurality of wave features. In yet another alternative bladder system 60 arrangement, and as will be described in greater detail with respect to FIGS. 11-13, the bladder system 60 may comprise a multilayered bladder. Alternatively, and as also will be described in greater detail herein with respect to FIGS. 14-30, the bladder system 60 may comprise a bladder support positioned within a bladder cavity 56 defined by the flexible, inflatable bladder 55.

The flexible, inflatable bladder 55 may be placed within or may be inserted into the internal cavity 45 of the cure tool 15 prior to a cure cycle in order to react external pressures applied to the charge 10 during a curing process, such as during an autoclave curing process. As will be described in greater detail herein, a bladder support structure 58 may be positioned in the bladder cavity 56 defined by the bladder 55. Plies 12 are laid up over the bladder and cure tool 15. Such a process step may take place by an Automated Fiber Placement machine. These laid up plies will eventually form stringer flanges.

A flexible bag, such as a vacuum bag 25, may be placed and sealed over the flexible bladder 55, the cure tool 15, and the plies and then secured to the cure tool 15. As such, the vacuum bag 25 would provide vacuum covering to the composite charge 10, the laid up plies 12, and the inflatable bladder 55. The flexible bag 25 is adapted to be coupled with a suitable vacuum source 30 for evacuating the flexible bag 25.

Figure 2:
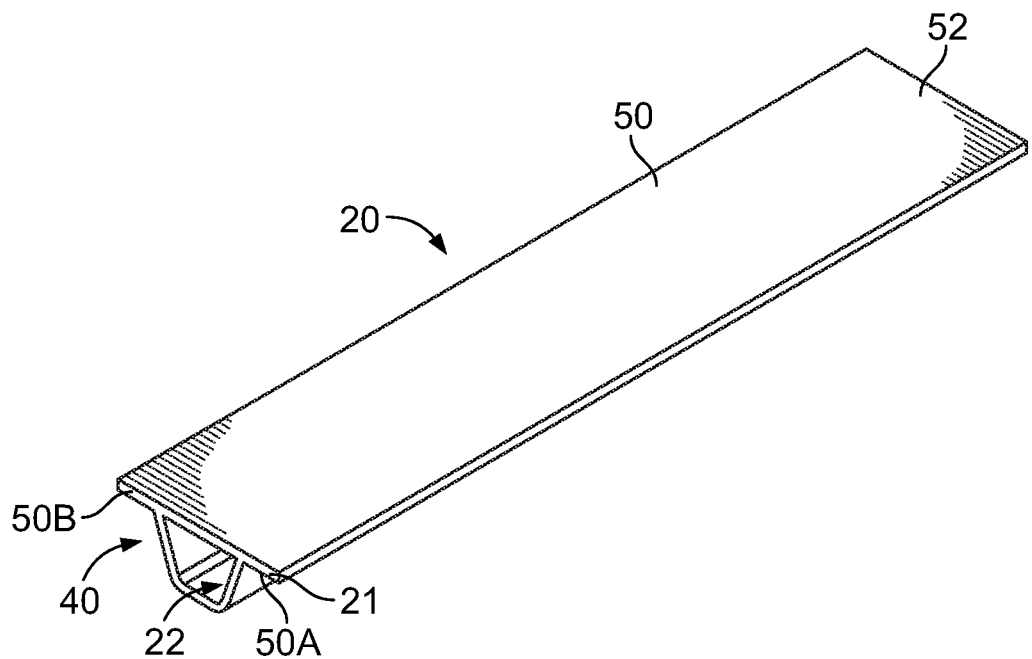
FIG. 2 is an illustration of a perspective view of a composite resin stringer cured using the bladder system shown in FIG. 1.

Referring now to FIG. 2, the disclosed bladder systems and curing methods may be employed to cure a variety of composite resin parts of various geometries, having one or more internal cavities. For example, and without limitation, the various disclosed bladder systems and methods may be used in the fabrication of a fiber reinforced composite resin stringer 20. In one preferred arrangement, this stringer 20 may comprise a multi-ply layup of prepreg. Other stringer materials may also be used, such as without limitation dry fiber reinforcing or tackified dry fiber reinforcing. In this illustrated arrangement, the stringer 20 comprises a hat section 40 forming an internal stringer cavity 22, a pair of laterally extending flange sections 50A,B, and a substantially flat skin section 52 that is consolidated together with the flange sections 50A,B during curing. A plurality of plies 21 making up the stringer are illustrated in FIG. 2. As those of ordinary skill in the art will recognize, alternative stringer compositions and geometries are possible.

Figure 3:
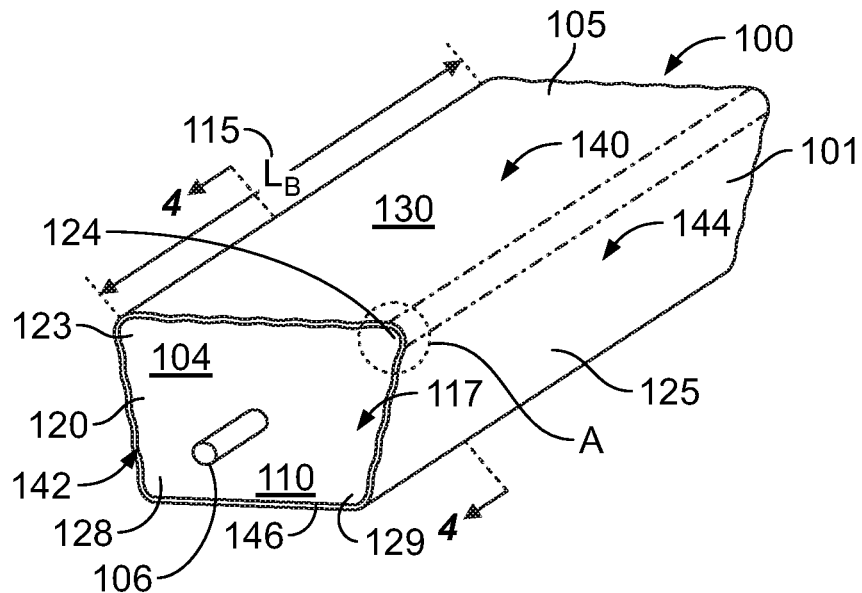
FIG. 3 is an illustration of an alternative bladder arrangement that may be used with the bladder system illustrated in FIG. 1.
Figure 4:
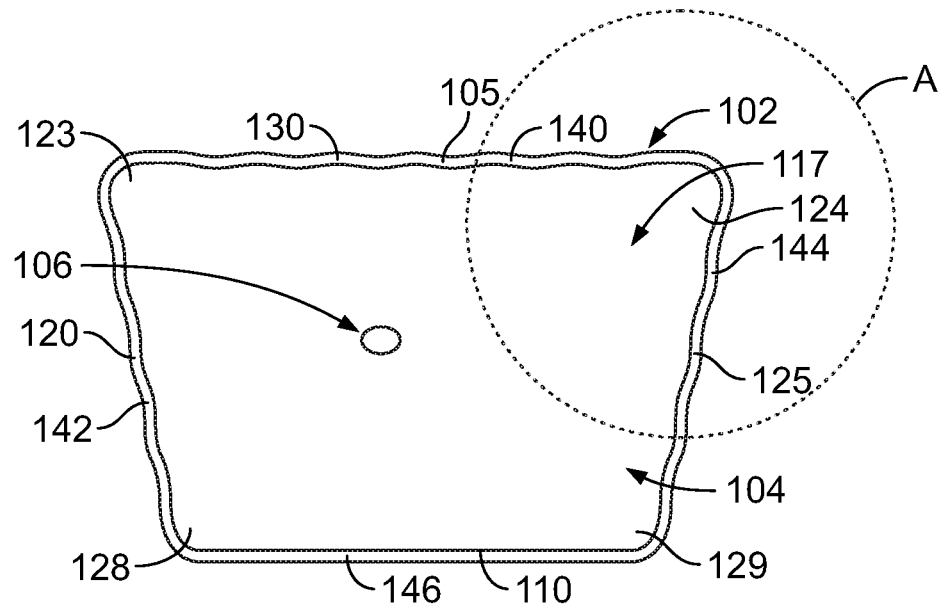
FIG. 4 is a vertical section through the bladder system 100, taken along line 4-4 in FIG. 3.

FIG. 3 illustrates a perspective view of one implementation of a preferred bladder system 100 that may be used in the system illustrated in FIG. 1. FIG. 4 is a vertical section through the bladder system 100, taken along line 4-4 in FIG. 3. A pressure fitting 106 is provided in the front wall 104 of the bladder arrangement 100. Referring now to FIGS. 3 and 4, the bladder system 100 comprises a bladder 105 comprising a bladder bottom wall 110 that is generally sized to be placed along a bottom, internal surface of a charge cavity, such as the cavity 45 of charge 10 illustrated in FIG. 1. The bladder 105 further comprises a first bladder side wall 120 that extends up from the bottom wall 110 and also comprises a second bladder side wall 125 that also extends from the bottom wall 110. A top wall 130 extends from a bladder front wall 104 to a bladder back wall 101 and encloses the bladder 105 so that the bladder bottom wall 110, the first bladder side wall 120, the second bladder side wall 125, the bladder front wall 104, the bladder back wall 101, and the bladder top wall 130 define an internal bladder cavity 135. The first bladder side wall 120 and the bladder top wall 130 define a first upper corner 123 and the second bladder side wall 125 and the bladder top wall 130 define a second upper corner 124. Similarly, The first bladder side wall 120 and the bladder bottom wall 110 define a first lower corner 128 and the second bladder side wall 125 and the bladder bottom wall 110 define a second lower corner 129.

As illustrated in FIG. 3, the bladder system 100 may also comprise a pressure fitting 106 that is adapted to be coupled to a source of pressurized fluid (such as the fluid source 32 illustrated in FIG. 1) such as air for inflating the bladder system 100, and with a vacuum source for deflating the bladder (source as the vacuum source 30 illustrated in FIG. 1). In this illustrated arrangement, the bladder 105 comprises an elongate structure that extends over a bladder length $L_B$ 115. In one arrangement, the bladder length $L_B$ 115 is generally equivalent to the length of a cure tool. However, in an alternative arrangement, the bladder length $L_B$ 115 may be longer than the cavity of the charge, extending out the ends of the charge. As those of skill in the art will recognize, alternative bladder length $L_B$ 115 configurations may also be used. In addition, the bladder 105 further comprises a generally trapezoidal cross section 117 although other geometrical configurations and structures may be used as well.

As illustrated, this bladder system 100 comprises a structure 101 and this structure comprises a plurality of wave features 140 in the form of curving or undulating features. Specifically, in this bladder arrangement 100, a first plurality of wave features 140 is provided along the bladder top wall 130. In one preferred arrangement, the first plurality of wave features 140 extend along the entire length $L_B$ 115 of the bladder 105. Similarly, a second plurality of wave features 142 are provided along a length of the first bladder side wall 120 and a third plurality of wave features 144 are also provided along a length of the second bladder side wall 125. As illustrated, the second plurality of wave features 142 run parallel to one another along the length of the first bladder side wall 120. The third plurality of wave features 144 run parallel to one another along the length of the second bladder side wall 125.

In an alternative exemplary bladder system, the first plurality of wave features 140 may be provided along only along a portion of the length $L_B$ 115 of the bladder top wall 130. As illustrated, the first plurality of wave features 140 run parallel to one another along the length 115 of the bladder top wall 130. Similarly, a second plurality of wave features 142 may be provided along only a portion of the length $L_B$ 115 of the first bladder side wall 120 and a third plurality of wave features 144 may be provided only along a portion of the length $L_B$ 115 of the second bladder side wall 125). In one preferred arrangement, and as illustrated in FIGS. 3-4, the first plurality of wave features 140, the second plurality of wave features 142, and the third plurality of wave features 144 are all similar to one another. That is, each of the plurality of wave features 140, 142, 144 comprise a similar geometrical configuration or radius of curvature.

Although the bladder system 100 as illustrated comprises similar wave features 140, 142, 144, those of ordinary skill in the art will recognize that alternative curving or undulating features may also be utilized. As just one example, in certain bladder system arrangements, only the bladder top wall 130 may comprise wave features 140, 142, 144 while the remaining bladder walls (the first and second side walls 120, 125 the bottom wall 110) do not comprises wave features 140, 142, 144. Alternatively, perhaps only a portion of the bladder top wall 130 may comprise wave features 140, 142, 144. Similarly, in yet another alternative bladder system arrangement, wave features 140, 142, 144 may only be provided along one or both of bladder side walls 120, 125. In addition, although the bladder bottom wall of the bladder 100 as illustrated in FIGS. 3 and 4 does not comprise wave features, in an alternative bladder arrangements, similar or different wave features 146 may be provided along this bladder bottom wall 110 as well.

Figure 5:
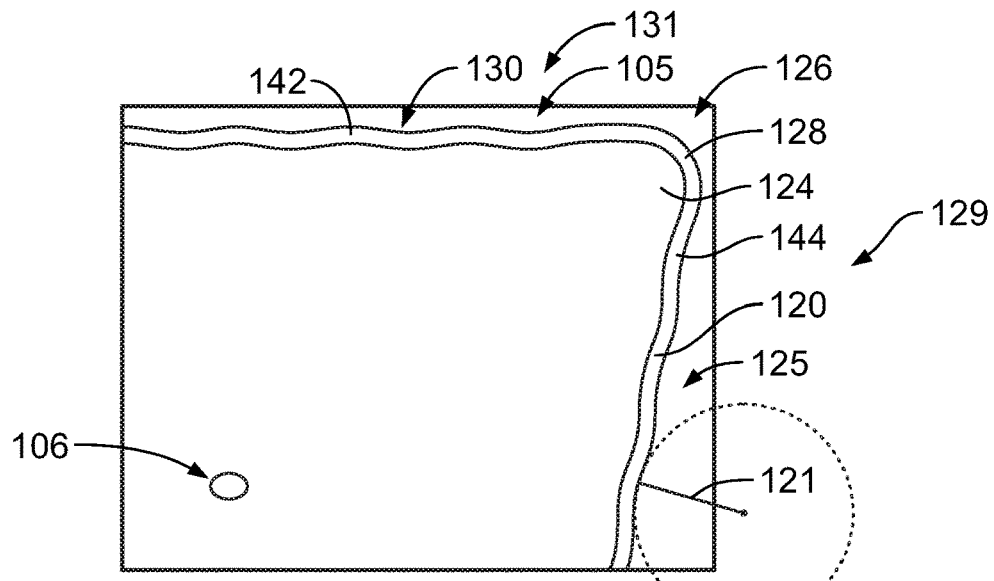
FIG. 5 illustrates a detailed view of the portion designated as "A" in FIG. 3.

FIG. 5 illustrates a detailed view 126 of the portion 128 designated as "A" of the bladder system 100 illustrated in FIGS. 3 and 4. Specifically, FIG. 5 illustrates a close up view 126 of the second upper corner 124 of a bladder system 100 defined by an upper portion 126 of the bladder second side wall 125 and a right hand portion 131 of the bladder top wall 130 of the bladder 105 illustrated in FIGS. 3 and 4. As in this close up view illustrated in FIG. 5, the plurality of wave features 142 provided along the top wall 130 and the plurality of wave features 144 provided along second side walls 120 comprise similar wave features. That is, each of the first and second plurality of wave features 142, 144 comprise a similar geometrical configuration such as a radius of curvature 121. As just one example, the wave features 142, 144 all comprise similar wave features having a radius of curvature 121 equal to approximately 0.5000 inches. Similarly, the plurality of wave features provided along the top wall 130 comprise wave features having a similar radius of curvature 121 equal to approximately 0.5000 inches. However, as those of ordinary skill in the art will recognize, alternative bladder configurations with alternative or different geometrical configurations and/or radius of curvatures may be utilized.

As just one example, in one bladder arrangement, a first plurality of wave features may be provided along the first sidewall 120. This first plurality of wave features 140 may have a first radius of curvature 121. In this same bladder arrangement, a second plurality of wave features 142 may be provided along the top wall 130 and this second plurality of wave features 142 may comprise a second radius of curvature 121 that is different from the first radius of curvature 121 of the first plurality of wave features 140. Similarly, a third plurality of wave features 144 may be provided along the second sidewall 125. The third plurality of wave features 144 may be of similar or different dimensions then either the first and second plurality of wave features 140, 142.

Figure 6:
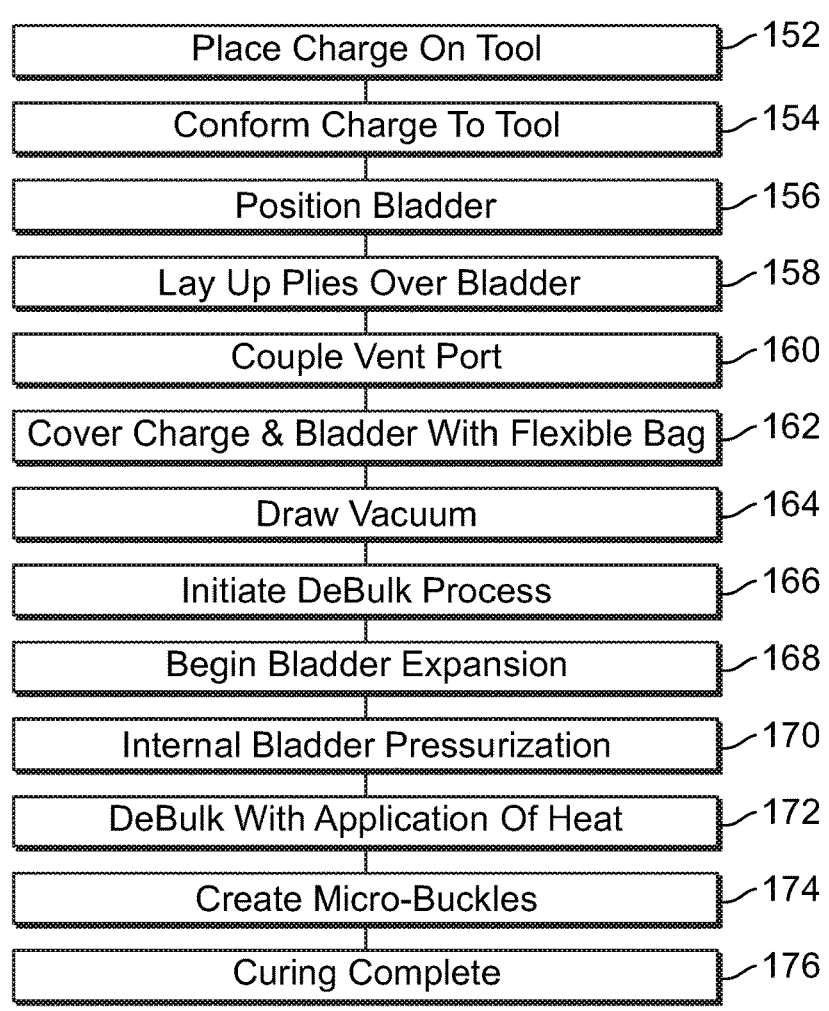
FIG. 6 illustrates steps of a method for autoclave curing using the alternative bladder arrangement illustrated in FIG. 3.

Attention is now directed to FIG. 6 which broadly illustrates steps of a method 150 for autoclave curing using the bladder system 100 described above with reference to FIGS. 3-5. For example, and beginning at step 152, a composite resin charge is supported within an autoclave by being placed on a suitable tool, such as the cure tool 15 discussed with reference to FIG. 1. At step 154, forming aids (not shown) may be used to press the various plies making up the charge down into the mold cavity, and conform the charge to radii 178A, B in the tool cavity 173. The varies plies 191 making up the charge 190 define a charge cavity 192.

At step 156, a bladder 180 comprising a plurality of wave features 181 is positioned into the charge cavity 192 and over the charge 190. For example, FIG. 7 illustrates a bladder 180 comprising a plurality of wave features 181 positioned within the charge cavity 192 and over a charge 190. As illustrated, the charge 190 comprising a plurality of plies 191 that has been placed within a tool cavity 173 of a tool 175 and also after the plies 191 of the charge 190 has conformed to the radii 178A, 178B of the tool cavity 176. In addition, FIG. 8 illustrates a detailed view of the portion designated as "B" in FIG. 7 and illustrating the plies 191 of the charge 190 conforming to the tool radii 178A,B. As illustrated in FIG. 8, a second lower corner 198 of the bladder 180 provides slight compaction to the laid up plies 191 residing along the tool radii 178B.

Prior to cure, the bladder 180 includes wave features 181 as previously discussed. Initially, the bladder 180 comprises an initial cross sectional size $W_{ICSS}$ 184 as first installed into the tool cavity 173.

Returning to the method illustrated in FIG. 6, at step 158 plies 194 are laid up over the bladder 180 and the tool 175. Such a process step may take place by an Automated Fiber Placement machine. As may be seen from FIG. 7, these laid up plies 194 will eventually help form the stringer flanges 196A,B, such as the stringer flanges 50A,B illustrated in FIG. 2.

Then, at step 160, the bladder 180 may be coupled to a vent port. Such a vent port allows the bladder 180 to be inflated to a desired pressure and also allows the bladder to inflate to a desired cross section size 186. One exemplary venting port 176 is illustrated in FIG. 7. Returning to the method 150 illustrated in FIG. 6, at step 162, the composite charge 190, the laid up plies 194, along with the bladder 180 are covered with a flexible bag such as the vacuum bag 25 illustrated in FIG. 1. The vacuum bag 25 may then be sealed to the cure tool 175. At step 164, a vacuum within the vacuum bag 25 is drawn.

At step 166, the debulk process is initiated. During this step, autoclave pressure PA is applied to the vacuum bag 25 in order to initiate compression of the various plies 191 making up the charge 190. In addition, autoclave pressure PA is also initially applied to an interior or cavity of the bladder 180 by way of the venting port, pressurizing the bladder 180 so as to react to forces applied to the composite charge 190 by autoclave pressure. At step 168, the bladder 180 begins to expand from its initial cross section size 184 to a desired cross section size 186.

At step 170, the interior of the bladder 180 is internally pressurized with autoclave pressure PA. This internal pressurization of the bladder 180 causes a force PA to be applied to the composite charge 190. Therefore, the composite charge 190 being molded can be cured in the autoclave while the bladder 180 maintains its inflated state at this desired cross section size 186. An increased bladder cross section size 186 helps to ensure, that during the curing and molding process, an outer surface 198 of the composite charge 190 is forced against a respective tool surface 176 of the tool 175. This also increases the effective pressure applied to an inside radii 186 of the charge 190.

For example, FIG. 9 illustrates a perspective view of the bladder 180 illustrated in FIG. 7 after the bladder 180 has been inflated so as to achieve a desired cross section size $W_{DCSS}$ 186 during the cure cycle. As illustrated in FIG. 9, the desired cross section size $W_{DCSS}$ 186 of the inflated bladder is greater than the initial cross section size $W_{ICSS}$ 184 of the bladder 184 prior to inflation (FIG. 7). As also illustrated in FIG. 9, the desired cross section size 186 of the inflated bladder 180 has compressed the composite plies 191 making up the charge 190. Specifically, the desired cross section size 186 of the inflated bladder 180 has caused the second lower corner 129 of the bladder 180 to compress the composite plies 191 making up the charge 190 into the tool radii 178B.

Returning to FIG. 6, at step 172, debulking of the charge 190 continues under the application of heat. Debulking continues by compacting or squeezing out air and volatiles between plies 191 or prepreg laminates of the charge 190 under moderate heat and vacuum so as to insure seating on the tool 175, to prevent wrinkles, and to promote adhesion. Next, at step 174, the plurality of wave features 181 create a plurality of "micro-buckles" that will tend to increase an amount of compression of the various bladder walls against the composite plies 191. At step 176, when curing is complete, the autoclave pressure PA is removed from the vacuum bag 25, and therefore is also removed from the interior of the bladder 180.

The bladder 105, 180 illustrated and described with reference to FIGS. 3-10 provides a number of advantages. For example, because of the way the stringers are processed as discussed herein, the inner cross section 184 of the laid up composite plies 190 making up the charge cavity 192 is smaller (so the charge cavity 192 is narrower) prior to cure than it is after cure. Cf. FIGS. 7 and 9. This is due in part to the "debulking" process that occurs during compaction and cure of the composite plies 191, 194. This debulking process is accounted for by both the coefficient of thermal expansion (CTE) of the bladder material (which is typically much higher than the CTE of the surrounding structure and the CTE of the mold the hat is built in) and by the inherently elastic nature of the bladder material (typically, rubber), especially when pressurized by an autoclave cure cycle. Unfortunately, it is sometimes difficult to design a nominal bladder cross section that is both small enough to fit inside the stringer prior to cure, and large enough to expand to the desired cross section during cure.

If the bladder 105, 180 is too small for the final cross section, the bladder 180 will bridge across the radii 186 of the charge 190 during cure. Radii bridging can result if the bladder does not have continuous compressive contact with the radius from the start of the radius section to the end of the radius section. Bridging can result in structurally unacceptable wrinkles and resin richness and radius thickening If, on the other hand, the bladder 105, 180 is designed too large to properly fit into the precure cross section of the stringer, the bladder walls may buckle during initial bladder placement and when drawing of vacuum. Sometimes, if the buckling is minor, the buckle will flatten out during the debulk process and cure. Unfortunately, many times the buckle will not flatten out, and the final composite part will include inconsistent and unpredictable resin ridges and ply distortions.

The disclosed bladder systems as discussed in detail with respect to FIGS. 3-10 tend to reduce such buckling issues. For example, and as shown in FIGS. 7-10, the wave features 140,142,144 of the bladder system 100 will tend to effectively increase a total peripheral length of the bladder system 100 without increasing an initial cross sectional size 184 of the bladder system 100. Therefore, the bladder system 100 will have a cross section 184 that will allow the bladder system 100 to fit into the cure tool prior to cure. Such a bladder cross section 184 will therefore be allowed to expand to a somewhat larger cross section during the debulking process. For example, as illustrated in FIGS. 8-10, as the plurality of wave features 181 allow the bladder 180 to expand to achieve the desired cross section $W_{DCS}$ 186, the bladder 180 pushes plies 191 into the tool radii 178A,B while preventing the bladder 180 from bridging at the tool radii 178A,B.

Another advantage of the presently disclosed bladder systems is that such bladder systems will effectively create a plurality of "micro-buckles" during the cure process. This will tend to increase an amount of compression of the bladder walls prior to them forming a single large buckle (which would not go away during cure). Finally, due to the compression that will be created in the bladder walls during the debulk cycle (where the buckles are effectively flattening under autoclave pressure), there will be an increase in the effective pressure applied to an inside radii of the stringer.

FIG. 11 illustrates an alternative multilayered bladder system 200. As illustrated, the bladder system 200 comprises a multilayered bladder system. Such a multilayered bladder system comprises a bladder outer layer 204. This outer layer 204 is configured so as to define an outer layer top wall 204a, an outer layer bottom wall 204b, an outer layer first sidewall 204c, and an outer layer second sidewall 204d. As illustrated, the outer layer first and second sides walls 204c,d extend between the outer layer top wall 204a and the outer layer bottom wall 204b. In this illustrated multilayered bladder system 200, the bladder outer layer 204 comprises an overlapping top wall 206. That is, a portion of the bladder outer layer 204 overlaps with itself along the top wall of the bladder system 200. In this illustrated arrangement, the overlapping top wall extends across an entire width $W_{TWOL}$ 210 of the top wall outer layer 204.

In an alternative multilayered bladder arrangement, only a portion of the outer layer 204 overlaps with itself along the top wall of the bladder system 200. As just one example, the outer layer 204 may overlap with itself over only a portion of the overall width $W_{TWOL}$ 210 of the outer bladder top wall 204a, such as only about a 25% overlap.

The multilayered bladder system 200 further comprises a bladder inner layer 218. This bladder inner layer 218 is configured so as to define an inner layer top wall 218a, an inner layer bottom wall 218b, an inner layer first sidewall 218c, and an inner layer second sidewall 218d. As illustrated, the inner layer first sidewall 218c and inner layer second sidewall 218d extend between the inner layer top wall 218a and the outer layer bottom wall 218b. In this illustrated multilayered bladder system 200, the inner layer 218 comprises an overlapping top wall 222. That is, a portion of the inner layer 218 overlaps with itself along the top wall of the bladder system 200. In this illustrated arrangement, the overlapping top wall extends across an entire width $W_{TWIL}$ 222 of the top wall inner layer 218.

In an alternative multilayered bladder arrangement, only a portion of the inner layer 218 overlaps with itself along the top wall of the bladder system 200. As just one example, the inner layer 218 may overlap with itself over only a portion of the width $W_{TWIL}$ 222 of the inner layer top wall 218a, such as only about a 25% overlap.

The bladder system 200 further comprises an intermediate layer 240. This intermediate layer 240 is disposed between the outer layer 204 and the inner layer 218. Preferably, this intermediate layer 240 is disposed along the bottom, top, and first and second side walls. In one example, the intermediate layer 240 comprises a Nylon layer. Alternatively, the intermediate layer 212 comprises a fiberglass layer. Additionally, the intermediate layer 212 may also comprise a reinforcement which may comprise a substantially rigid material, such as, for example and without limitation, a woven fiberglass. The intermediate layer 240 serves a number of functions. For example, the intermediate layer 240 can provide the bladder system 200 with enhanced structural rigidity. In addition, the intermediate layer 240 of the bladder system 200 can also reduce the tendency of the bladder system 200 to shrink over repeated uses.

In one alternative bladder system arrangement, at least one separate inner layer 246 may be further provided along the top wall of the bladder system 200. As just one example, a separate inner layer 244 may be provided along a bottom surface of the inner layer top wall 218a. (i.e., situated along a bottom surface 214 of the inner layer top wall 218a). As just another example, at least one separate inner layer 246 is provided between a top surface of the inner layer top wall 218a and the intermediate layer 240. In yet another example, a plurality of separate inner layers are provided between a top surface of the inner layer top wall 218a and the intermediate layer 240. In either such separate inner layer arrangements, the separate inner layer may comprise a separate layer of Viton material, a separate layer of nylon, a separate layer of fiberglass, and/or a combination of these materials.

In yet another alternative arrangement, the multilayered bladder system 200 illustrated in FIG. 11 may comprise a multilayered bladder system comprising at least a first plurality of wave features 140. (e.g., such as the wave features 140, 142, 144, and 146 illustrated and discussed herein with respect to FIGS. 3-10) For example, a first plurality of wave features 140 could be provided on at least a portion of either the bladder outer layer first side wall 204c, the second bladder sidewall 204d, the bladder top wall 204a and/or the bladder bottom wall 204b. As those of ordinary skill in the art will recognize, alternative multilayered bladder systems may also be utilized.

In one preferred arrangement, the bladder inner layer 218 comprises a fluoroelastic rubber, such as Viton®. Similarly, in one preferred arrangement, the bladder outer layer 204 also comprises a fluoroelastic rubber, such as Viton®. As those of ordinary skill in the art will recognize, fluoroelastomer is a special purpose fluorocarbon-based synthetic rubber that has wide chemical resistance and superior performance, particularly in high temperature applications. The fluoroelastomeric rubber has a relatively low coefficient of thermal expansion, thus providing the multilayered bladder system 200 with enhanced dimensional stability. Preferably, the thickness of the inner and outer layers of 218, 204 fluoroelastomeric rubber will depend upon the particular application. As just one example, the thickness of the inner layer 218 and the outer layer 204 may be approximately 0.060 inches.

FIG. 12 illustrates another alternative multilayered bladder system 300 that may be used in the bladder system illustrated in FIG. 5. As illustrated, the multilayered bladder system 300 comprises a bladder outer layer 304. This outer layer 304 is configured so as to define an outer layer top wall 304a, an outer layer bottom wall 304b, an outer layer first sidewall 304c, and an outer layer second side wall 304d. As illustrated, the outer layer first and second sides walls 304c,d extend between the outer layer top wall 304a and the outer layer bottom wall 304b. In this illustrated bladder system 300, the outer layer top wall 304a comprises an overlapping top wall 308. That is, a portion of the outer layer 304 overlaps with itself along the top wall of the bladder system 300. In this illustrated arrangement, the overlapping top wall extends only along a portion of the entire width $W_{TWOL}$ 310 of the top wall of the outer layer 304.

Similarly, the bladder system 300 illustrated in FIG. 12 further comprises an inner layer 318. This inner layer 318 is configured so as to define an inner layer top wall 318a, an inner layer bottom wall 318b, an inner layer first sidewall 318c, and an inner layer second side wall 318d. As illustrated, the inner layer first and second sides walls 318c,d extend between the inner layer top wall 318a and the outer layer bottom wall 318b. In this illustrated bladder system 300, the inner layer 318 comprises an overlapping top wall 322. That is, a portion of the inner layer 318 overlaps with itself along an entire width of the top wall of the inner layer 318. In this illustrated arrangement, the overlapping top wall 322 extends across an entire width $W_{TWIL}$ 326 of the top wall of the inner layer 318.

In an alternative arrangement, only a portion of the bladder inner layer 318 may be overlapped with itself along the top wall 322 of the bladder system 300. As just one example, the inner layer 318 may only be overlapped with itself over a portion of the width $W_{TWIL}$ 326 of the inner layer top wall, such as only about 25% overlap.

The multilayered bladder system 300 further comprises an intermediate layer 330. As illustrated in FIG. 12, the intermediate layer 330 is disposed between the bladder outer layer 304 and the bladder inner layer 318. In this preferred arrangement, the intermediate layer 330 extends along the bottom walls, the top walls, the first side walls and the second side walls of the bladder system 300. In one exemplary arrangement, the intermediate layer 330 comprises a Nylon layer. Alternatively, the intermediate layer 330 comprises a fiberglass layer. The intermediate layer 330 may also comprise a reinforcement which may include a substantially rigid material, such as, for example and without limitation, a woven fiberglass. The intermediate layer 330 serves a number of advantages. For example, the intermediate layer 330 can provide the bladder system 300 with enhanced structural rigidity. In addition, the intermediate layer 330 can also reduce the tendency of the bladder system 300 to lose its original form (i.e., shrink) over repeated uses.

In one alternative bladder system arrangement, the bladder system 300 may further comprise a separate inner layer 340. As just one example and as may be seen from FIG. 12, this separate inner layer 340 may be provided along the top wall of the bladder system 300. As just one example, the separate inner layer 340 may be provided along a top surface of the inner layer top wall 318a and extend along at least a portion of the inner layer first side wall 318c and at least a portion of the inner layer second side wall 318d. In one preferred arrangement, the separate inner layer 340 comprises a layer of Viton material. Alternatively, the separate inner layer 340 comprises a fiberglass layer.

In yet another alternative arrangement, the multilayered bladder system 300 illustrated in FIG. 12 comprises a multilayered bladder system comprising at least a first plurality of wave features. For example, a plurality of wave features maybe provided on at least a portion of either the bladder outer layer first side wall 304c, the second side wall 304d, the top wall 304a, and/or the bottom wall 304b.

FIG. 13A illustrates another alternative multilayered bladder system 400. As illustrated, the multilayered bladder system 400 comprises a bladder outer layer 402. This bladder outer layer 402 is configured so as to define an outer layer top wall 402a, an outer layer bottom wall 402b, an outer layer first sidewall 402c, and an outer layer second side wall 402d. As illustrated, the outer layer first and second sides walls 402c,d extend between the outer layer top wall 402a and the outer layer bottom wall 402b. In this illustrated bladder system 400, the outer layer top wall 402a comprises an overlapping top wall 404. That is, a portion of the outer layer 402 overlaps with itself along the top wall of the bladder system 400. In this illustrated arrangement, the overlapping top wall 404 extends only along a portion of an entire width $W_{TWOL}$ 406 of the top wall of the outer layer 404.

The bladder system 400 illustrated in FIG. 13A further comprises a bladder first inner layer 408. This bladder first inner layer 408 is configured so as to define an inner layer top wall 408a, an inner layer bottom wall 408b, an inner layer first sidewall 408c, and an inner layer second side wall 408d. As illustrated, the inner layer first and second sides walls 408c,d extend between the inner layer top wall 408a and the outer layer bottom wall 408b. In this illustrated bladder system 400, the inner layer 408 comprises an overlapping top wall 410. That is, in this illustrated arrangement, a first portion of the inner layer 408 overlaps a second portion of the inner layer 408 along an entire width $W_{TWIL}$ 412 of the top wall of the inner layer 408. In this illustrated arrangement, the overlapping top wall extends across an entire width $W_{TWIL}$ 412 of the top wall of the inner layer 408.

The bladder system 400 further comprises a separate or second inner layer 414. As may be seen from FIG. 13A, this separate inner layer 414 is provided within the first portion of the bladder inner layer 408 and the second portion of the overlapping top wall 410 of the inner layer 408. In this illustrated arrangement, the separate inner layer 414 extends along at least a portion of the inner layer top surface. In one preferred arrangement, the separate inner layer 414 may comprise a layer of Viton material. Alternatively, the separate inner layer 414 comprises a fiberglass layer.

The multilayered bladder system 400 further comprises an intermediate layer 416. As illustrated in FIG. 13A, the intermediate layer 416 is disposed between the bladder outer layer 402 and the bladder first inner layer 408. In this preferred arrangement, the intermediate layer 416 extends along the bottom walls, the top walls, the first side walls and the second side walls of the bladder system 400. In one exemplary arrangement, the intermediate layer 416 comprises a Nylon layer. Alternatively, the intermediate layer 416 comprises a fiberglass layer. The intermediate layer 416 may also comprise a reinforcement which may include a substantially rigid material, such as, for example and without limitation, a woven fiberglass. The intermediate layer 416 serves a number of advantages. For example, the intermediate layer 416 can provide the bladder system 400 with enhanced structural rigidity. In addition, the intermediate layer 416 can also reduce the tendency of the bladder system 400 to lose its original form (i.e., shrink) over repeated uses.

In yet another alternative arrangement, the multilayered bladder system 400 illustrated in FIG. 13A comprises a multilayered bladder system comprising at least one plurality of wave features. For example, in one exemplary multilayered bladder system, wave features are provided on at least a portion of either the bladder outer layer first side wall 404c, the second side wall 404d, the top wall 404a, and/or the bottom wall 404b.

The disclosed multilayered bladder systems provide a number of advantages. For example, a standard fuselage production bladder has a significant amount of resin richness. Resin richness describes an uneven distribution or excessive use of resin within the cured composite laminate. Areas of resin richness typically are subject to cracking. Though this resin richness can be repaired for production use, the repairs can be costly and may require many hours of rework. The standard bladder also has encountered handling issues, leaks, shrinkage, and overall durability issues that limit the number of cures that can be performed per ship set. The bladder systems as described herein which comprise multilayers of Viton and fiberglass layers provide a number of advantages of conventional type bladder systems. For example, the disclosed multilayered bladder systems help to reduce leaks, reduce shrinkage, and provide enhanced overall durability which leads to reducing costly repairs and wasted man hours.

Figure 13B:
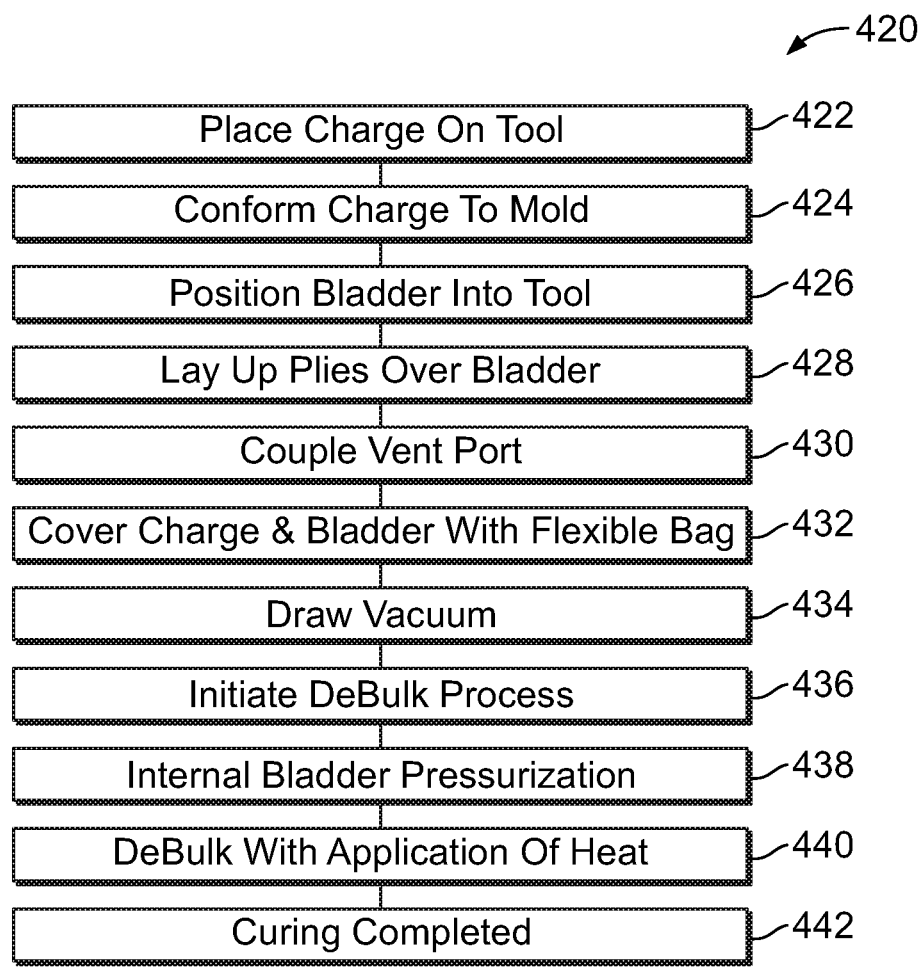
FIG. 13B illustrates steps of a method for autoclave curing using the alternative bladder arrangement illustrated in FIG. 3.

Attention is now directed to FIG. 13B which broadly illustrates steps of a method 420 for autoclave curing using a multilayered bladder system, such as the systems described above with reference to FIGS. 11-13A. For example, and beginning at step 422, a composite resin charge is supported within an autoclave by being placed on a suitable tool, such as the cure tool 15 discussed with reference to FIG. 1. At step 424, forming aids (not shown) may be used to press the various plies making up the charge down into the mold cavity, and conform the charge to radii in the mold cavity.

At step 426, a multilayered bladder is inserted into the tool cavity over the charge. At step 428, additional plies may be laid over the bladder. At step 430, the bladder is coupled to a vent port. Such a venting port allows the bladder to be inflated to a desired pressure and also allows the bladder to inflate to a desired cross section size. This venting port 176 is illustrated in FIGS. 7 and 9. At step 432, the composite charge along with the bladder are covered with a flexible bag such as the vacuum bag 25 illustrated in FIG. 1. The vacuum bag may then be sealed to the cure tool. At step 434, a vacuum within the vacuum bag is drawn.

At step 436, the debulk process is initiated wherein autoclave pressure PA is applied to the vacuum bag in order to initiate compression of the various plies making up the charge. In addition, autoclave pressure PA is also initially applied to an interior or cavity of the bladder by way of the venting port, pressurizing the bladder so as to react to forces applied to the composite charge by autoclave pressure. At step 438, the interior of the bladder is internally pressurized with autoclave pressure PA. This internal pressurization of the bladder causes a force PA to be applied to the composite charge. Therefore, the composite charge being molded can be cured in the autoclave while the bladder maintains its inflated state at this desired cross section size. An increased bladder cross section size helps to ensure, that during the curing and molding process, the outer surface of the composite charge will be forced against respective tool surfaces of the tool. This also increases the effective pressure applied to the inside radii of the charge.

At step 440, debulking of the charge continues under the application of heat. Debulking continues by compacting or squeezing out air and volatiles between plies or prepreg laminates of the charge under moderate heat and vacuum so as to insure seating on the tool, to prevent wrinkles, and to promote adhesion. At step 442, when curing is complete, the autoclave pressure PA is removed from the vacuum bag, and therefore is also removed from the interior of the bladder.

As described above, the bladder system 60 illustrated in FIG. 1 may comprise a bladder having wave features, such as the exemplary bladder systems discussed and illustrated with respect to FIGS. 3-10. As also described herein, in an alternative arrangement, the bladder system 60 illustrated in FIG. 1 comprises a multilayered bladder system comprising a bladder with inner layers, outer layers, and intermediate layers of various materials such as Viton, nylon, and/or fiberglass. In yet another alternative bladder system arrangement, the bladder system 60 illustrated in FIG. 1 comprises a bladder system comprising, in combination, an bladder along with a flexible internal bladder support wherein the bladder support is provided within a bladder inner cavity defined by the bladder so as to provide a compressive load support between a bottom surface of a bladder top wall and a top surface of a bladder bottom wall.

Flexible internal bladder supports that provide compressive load support as disclosed and described herein provide a number of benefits. For example, flexible bladders are often used in applications where the bladders need to react a head pressure of automatic fiber placement machines when prior to the bladder being pressurized (as they are during autoclave cure). One example might be a hat-stiffened panel where the panel plies are laid by machine after the hat-stringers have already been placed in the layup tool. Because the bladders are flaccid during these operations, it can be a manufacturing challenge for machine operation particularly when orientation dictates that the ply must be laid in a perpendicular direction to that of the bladder which can also cause excess fiber length to be laid. The presently disclosed internal flexible bladder support provides the support needed during skin/panel fiber placement needed while otherwise not affecting the bladders' performance adversely.

In addition, the presently disclosed bladder support systems also tend to prevent excessive tow layup. Additionally, such bladder support systems also tend to allow the fiber to be layed more quickly, hence achieving a higher quality laminate. Typical bladder systems without such an internal bladder support oftentimes results in a lower quality laminate that requires causes rework or even a scrapped barrel when composite wrinkles are in excess.

In addition, the presently disclosed bladder supports are generally light in weight, so that the radius fillers (i.e., noodles) will not fall out of their respective troughs during skin application. In addition, the bladder support material is strong, and able to withstand up to 120 pounds of Automatic Fiber Placement (AFP) head pressure for purposes of enhanced composite quality. The bladder support material is generally flexible for highly contoured stringers, and conforms in transition areas (i.e., joggle areas) as necessary. Moreover, the presently disclosed bladder supports are decoupled from the bladder and therefore do not interfere with the bladder's ability to adequately expand in the autoclave during the cure cycle.

In one preferred internal bladder arrangement, the bladder support is configured to provide a compressive load support between a bottom surface of a bladder top wall and a top surface of a bladder bottom wall. In an alternative bladder support system arrangement, the bladder support provides a compressive load support between a bottom surface of a bladder top wall, a top surface of a bottom wall of the bladder, an inside surface of a first bladder sidewall, and an inside surface of a second bladder sidewall of the flexible bladder. (See, e.g., FIGS. 15A,B, 19A,B, 20A,B, 21A,B, 27A,B, 28A,B, 29A,B, and 30A,B). In yet another alternative arrangement, the bladder support is configured to provide a compressive load support between a bottom surface of a bladder top wall, an inside surface of a first bladder side wall and an inside surface of a second bladder side wall of a flexible bladder. (See, e.g., FIGS. 24A,B, 25A,B, and 26A,B). As those of ordinary skill will recognize, alternative bladder support systems may also be used.

Figures 14A, 14B:
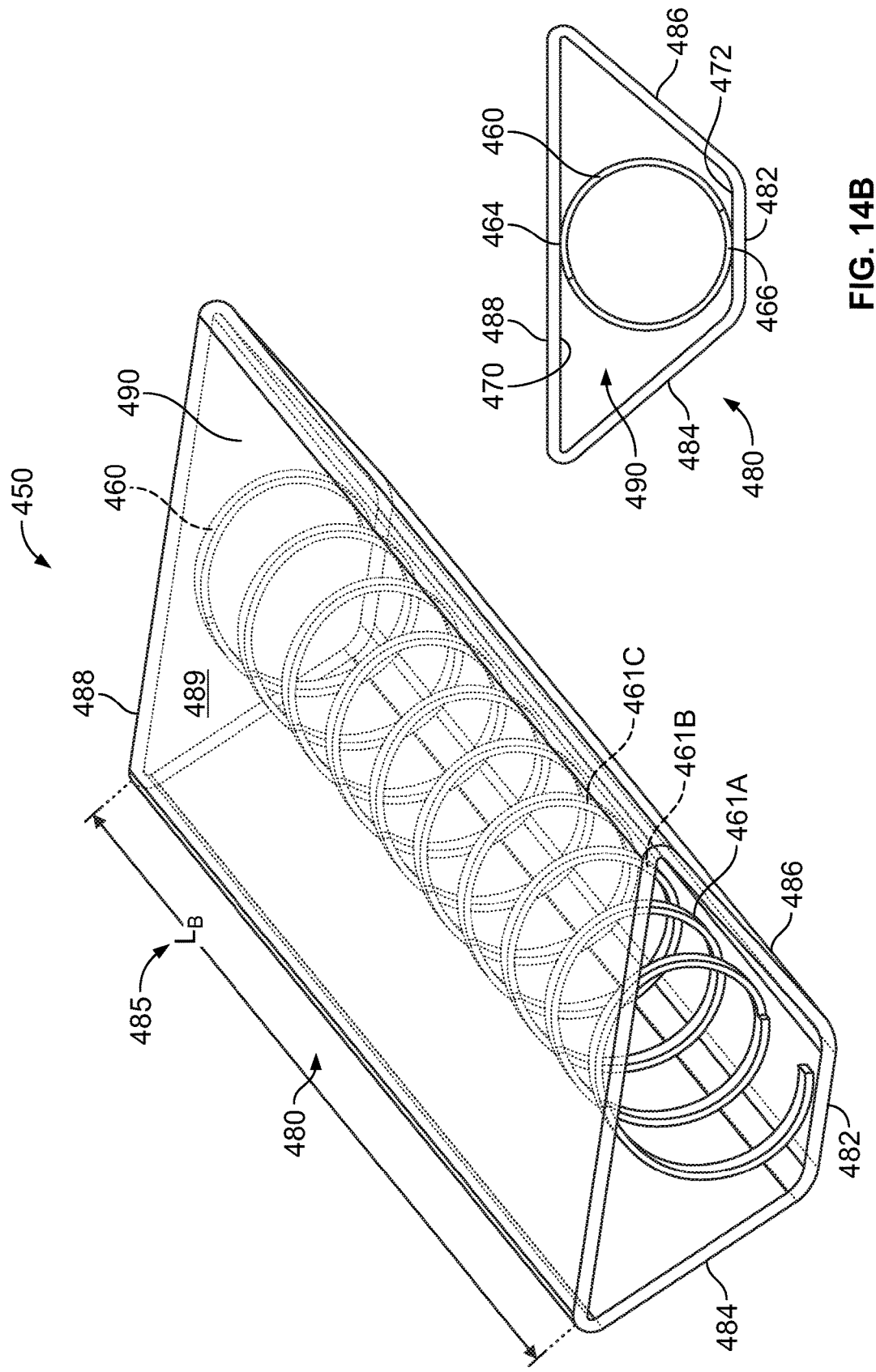
FIG. 14A is an illustration of an exemplary bladder support positioned within a bladder, such as the bladder illustrated in FIGS. 6 and 7.
FIG. 14B is a cross sectional view of the bladder support illustrated in FIG. 14A.

For example, FIG. 14A is an illustration an exemplary bladder system 450 comprising a bladder 480 and a bladder support 475 that is positioned within an internal bladder cavity 485 defined by the bladder 480. FIG. 14B is a cross sectional view of the exemplary bladder system 450 illustrated in FIG. 14A. In one preferred arrangement, the bladder 480 comprises a similar structure as the bladder 70 illustrated in FIGS. 6 and 7. Alternatively, the bladder 480 comprises a bladder having a plurality of wave features, such as the exemplary bladders described and illustrated herein with reference to FIGS. 3-10. In yet an alternative arrangement, the bladder 480 comprises a multilayered bladder, such as the exemplary multilayered bladders described and illustrated herein with reference to FIGS. 11-13.

Returning to FIGS. 14A and B, the bladder 480 comprises a bottom wall 482, a first bladder sidewall 484 extending from the bottom wall 482, and a second bladder sidewall 486 extending from the bottom wall 482. A bladder top wall 488 extends from a bladder front wall (not shown) to a bladder back wall 489 and encloses the bladder, thereby defining an internal bladder cavity 490. The bladder system 450 further comprises a bladder support 460 comprising a spiral or corkscrew like shaped support structure that is positioned within the internal bladder cavity 490 defined by the bladder 480. In this illustrated arrangement, the spiral or corkscrew support structure 460 comprises a structure wherein a spacing between adjacent turns of the spiral are all of uniform length along the length $L_{BS}$ 485 of the bladder support 460. For example, the spacing between a first spiral 461a and a second spiral 461b is the same as the spacing between the second spiral 461b and a third spiral 461c. In alternative spiral shaped support structure arrangements, spiral spacing may vary along the length $L_{BS}$ 485 of the bladder support 460.

The spiral shaped bladder support 460 supports the bladder 480 between a bottom surface 470 of the bladder top wall 488 and a top surface 472 of the bladder bottom wall 482 so as to provide a compressive load support between the bladder top wall 488 and the bladder bottom wall 482. Specifically, and as may be seen from FIG. 14B, a first bearing surface 464 of the flexible bladder support 460 and a second bearing surface 466 of the flexible bladder support 460 provide the compressive load support between the bottom surface of the bladder top wall 488 and a top surface of the bladder bottom wall 482.

In this preferred arrangement, the bladder support 460 provides support along the entire length $L_B$ 485 of the bladder 480. However, as with the other exemplary bladder supports disclosed herein, alternative bladder support lengths may be provided. As just one alternative arrangement, the bladder system 450 may comprise a plurality of spiral bladder supports provided along the length $L_B$ 485 of the bladder 480, rather than just a single, continuous bladder support as illustrated. In yet another bladder support arrangement, a bladder support is provided along only a portion of the bladder length $L_B$ 485.

Figures 15A, 15B:
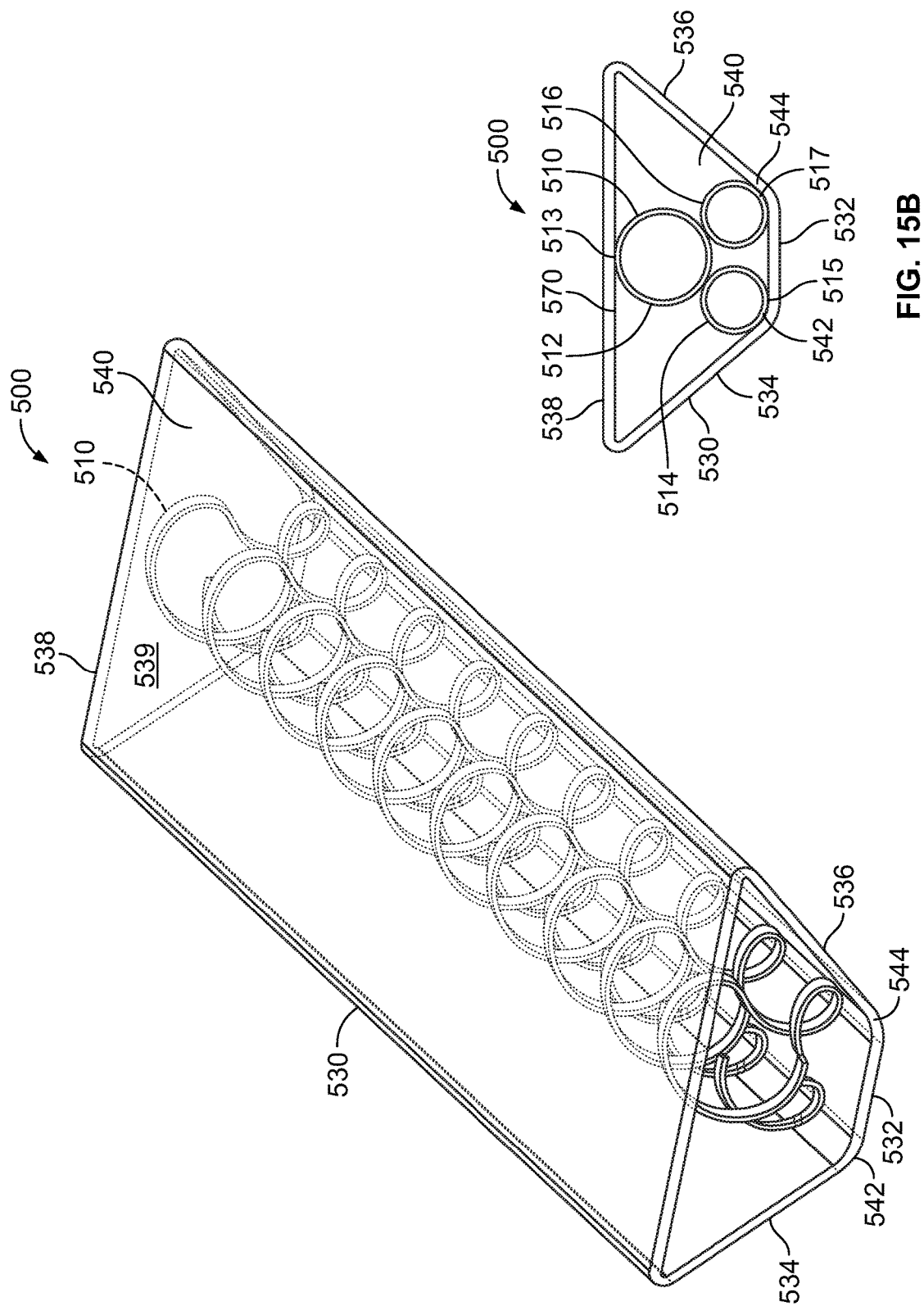
FIG. 15A is an illustration of an exemplary bladder support positioned within a bladder, such as the bladder illustrated in FIGS. 6 and 7.
FIG. 15B is a cross sectional view of the bladder support illustrated in FIG. 15A.

FIG. 15A is an illustration another bladder system 500 comprising an exemplary bladder support 510 positioned within a bladder cavity of a bladder 530, such as the bladder 80 illustrated in FIGS. 6 and 7. FIG. 15B is a cross sectional view of the exemplary bladder system 500 illustrated in FIG. 15A. As illustrated, the bladder system comprises a bladder 530 (similar to the bladder 480 described and illustrated in FIGS. 14A and B) along with another exemplary bladder support 510.

Returning to FIGS. 15A and B, the bladder 530 comprises a bottom wall 532, a first bladder sidewall 534 extending from the bottom wall 532, and a second bladder sidewall 536 extending from the bottom wall 532. A bladder top wall 538 extends from a bladder front wall (not shown) to a bladder back wall 539 and encloses the bladder 530, thereby defining an internal bladder cavity 540.

In this illustrated arrangement, the bladder support 510 comprises a plurality of spiral or corkscrew support structures 512, 514, 516. Specifically, in this arrangement, the bladder support comprises a first spiral support 512, a second spiral support 514, and a third spiral support 516 wherein the second and third spiral support structures 514, 516 comprise similar geometries. The first spiral support structure 512 comprises a larger geometrical configuration than the second and third support structures 514, 516.

As illustrated, the second spiral support structure 514 resides in a nested position within a first bottom corner 542 of the bladder 530 defined between the first bladder side wall 534 and the bladder bottom wall 532. The third spiral support structure 516 resides in a nested position within a second bottom corner 544 of the bladder 530 defined between the bladder second sidewall 536 and the bladder bottom wall 532. The first spiral support structure 512 is positioned between a bottom surface 520 of the bladder top wall 538 and the first and second support structures 514, 526, respectively. In one preferred arrangement, the first support structure 512 comprises a larger diameter than the second and third support structures 514, 516. However, those of ordinary skill in the art will recognize alternative bladder support geometrical configurations and sizes are also possible.

In this arrangement, and as may be seen from FIG. 15B, a first bearing surface 513 of the first spiral support 512, a second bearing surface 515 of the second spiral support 514, and a third bearing surface 517 of the third spiral support 516 provide the compressive load support between the bottom surface of the bladder top wall 538 and a top surface of the bladder bottom wall 532, respectively.

FIG. 16A is an illustration another exemplary bladder system 550 comprising a bladder support 560 positioned within a bladder cavity 590 defined by a bladder 580, such as the bladder illustrated in FIGS. 5 and 6. FIG. 16B is a cross sectional view of the bladder support 560 illustrated in FIG. 16A. As illustrated, the bladder support 560 comprises a sinusoidal structure that extends over the length $L_B$ 581 of the bladder 580.

Returning to FIGS. 16A and B, the bladder 580 comprises a bottom wall 582, a first bladder sidewall 584 extending from the bottom wall 582, and a second bladder sidewall 586 extending from the bottom wall 582. A bladder top wall 588 extends from a bladder front wall (not shown) to a bladder back wall 591 and encloses the bladder 580, thereby defining an internal bladder cavity 590.

In this illustrated arrangement, the sinusoidal support structure 560 is positioned within the bladder cavity 590 so that a top bearing surface 562 of the support structure 560 supports a bottom surface 570 of the bladder top wall 588. In addition, a bottom bearing surface 564 of the support structure 560 resides along a top surface 572 of the bladder bottom wall 582. As such, in this support structure arrangement, and as may be seen from FIG. 16B, the top bearing surface 562 of the bladder support 560 supports the bottom surface 570 of the bladder top wall and the bottom bearing surface 564 of the bladder support 560 provide the compressive load support between the bottom surface of the bladder top wall 588 and the top surface of the bladder bottom wall 582, respectively.

As illustrated in FIGS. 16A and B, the support structure 560 comprises a constant width $W_{SS}$ 566 along the entire length $L_{BS}$ of the bladder support 560. As those of ordinary skill in the art will recognize, alternative sinusoidal bladder support arrangements may also be utilized. For example, alternative sinusoidal support structures with varying amplitudes, periods, and support structure widths may also be provided.

Figures 17A, 17B:
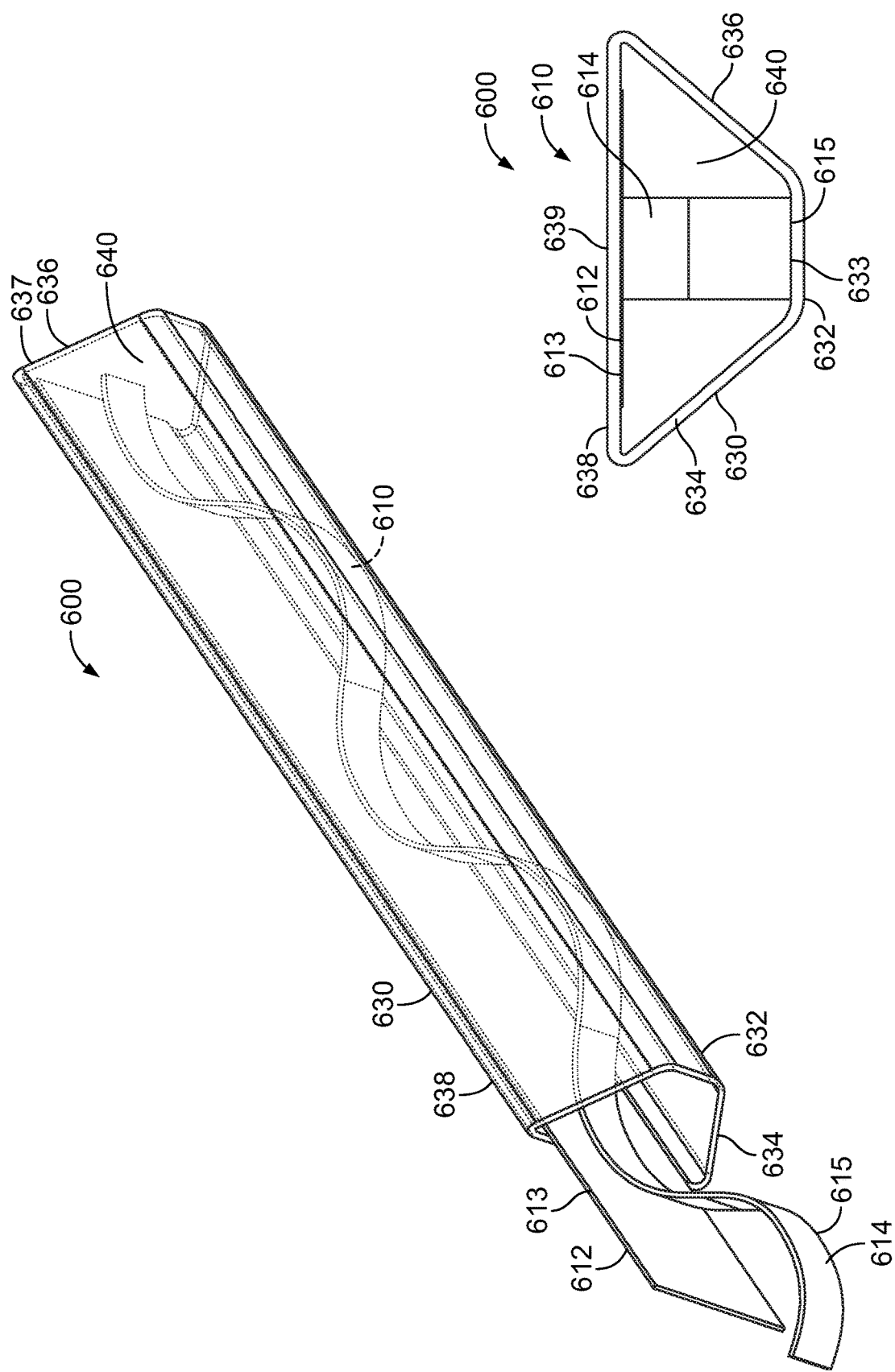
FIG. 17A an illustration an exemplary bladder support positioned within a bladder, such as the bladder illustrated in FIGS. 6 and 7.
FIG. 17B is a cross sectional view of the bladder support illustrated in FIG. 17A.

For example, FIG. 17A is an illustration of yet another exemplary sinusoidal bladder support 610 positioned within a bladder cavity 640 defined by a bladder 630. FIG. 17B is a cross sectional view of the bladder support 610 illustrated in FIG. 17A positioned within the bladder cavity 640 defined by a bladder 630. Similar to the bladder 580 illustrated in FIGS. 16A and B, the bladder 630 comprises a bottom wall 632, a first bladder sidewall 634 extending from the bottom wall 632, and a second bladder sidewall 636 extending from the bottom wall 632. A bladder top wall 638 extends from a bladder front wall (not shown) to a bladder back wall 637 and encloses the bladder 630, thereby defining an internal bladder cavity 640.

As illustrated, this bladder support 610 comprises two separate support structures: a first sinusoidal support structure 614, similar to the sinusoidal support structure 560 illustrated in FIGS. 16A and 16B along with a second planar bladder support 612. In this illustrated arrangement, the second planar bladder support 612 is provided between the bladder top wall 638 and a first bearing surface of the sinusoidal bladder support 614.

As such, in this two component support structure arrangement, and as may be seen from FIG. 17B, a top bearing surface 613 of the second planar bladder support 612 supports a bottom surface 639 of the bladder top wall 638 and a bottom bearing surface 615 of the second sinusoidal bladder support 614 provide the compressive load support between the bottom surface 639 of the bladder top wall 638 and the top surface 633 of the bladder bottom wall 632, respectively.

Figures 18A, 18B:
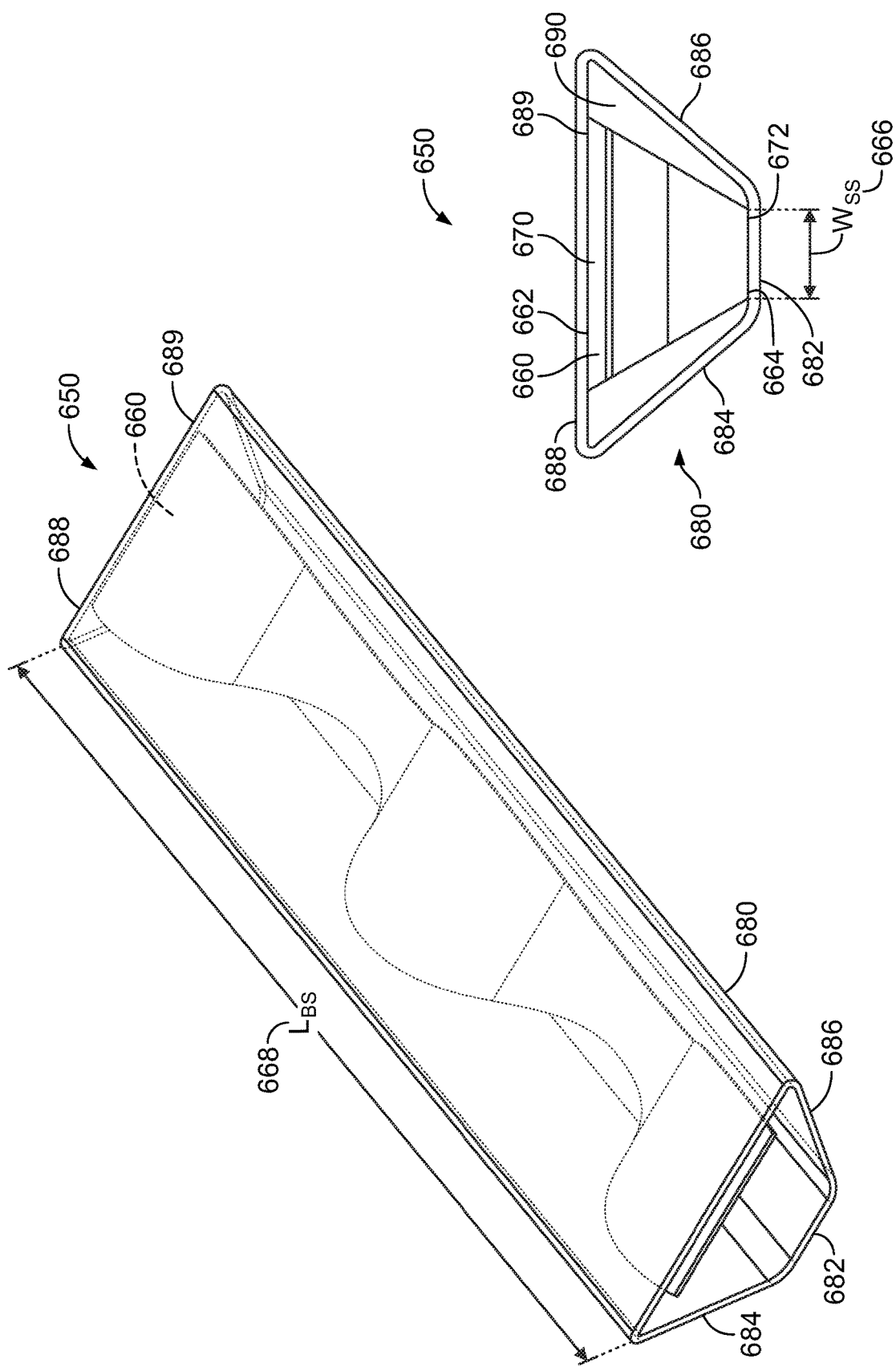
FIG. 18A is an illustration an exemplary bladder support positioned within a bladder, such as the bladder illustrated in FIGS. 6 and 7.
FIG. 18B is a cross sectional view of the bladder support illustrated in FIG. 18A.

FIG. 18A is an illustration of a yet another alternative sinusoidal bladder support 660 that is positioned within a bladder cavity 690 defined by a bladder 680, similar to the bladder illustrated in FIGS. 5 and 6. FIG. 18B is a cross sectional view of the bladder support arrangement illustrated in FIG. 18A positioned within the cavity 690 defined by the bladder 680. The bladder 680 comprises a bottom wall 682, a first bladder sidewall 684 extending from the bottom wall 682, and a second bladder sidewall 686 extending from the bottom wall 682. A bladder top wall 688 extends from a bladder front wall (not shown) to a bladder back wall 689 and encloses the bladder 680, thereby defining an internal bladder cavity 690.

In this illustrated arrangement, the sinusoidal support structure 660 is positioned within the bladder cavity 690 so that a top bearing surface 662 of the support structure 660 supports a bottom surface 670 of the bladder top wall 688 and a bottom bearing surface 664 of the support structure 660 resides along a top surface 672 of the bladder bottom wall 682. As such, and as may be seen from FIG. 18B, the top bearing surface 662 of the bladder support 660 supports the bottom surface 670 of the bladder top wall 688 and the bottom bearing surface 664 of the bladder support 660 provide the compressive load support between the bottom surface 689 of the bladder top wall 688 and the top surface of the bladder bottom wall 682, respectively.

As illustrated in FIGS. 18A,B, the support structure 660 comprises a varying width $W_{SS}$ 666 along the entire length $L_{BS}$ 668 of the bladder support 660. However, as those of ordinary skill in the art will recognize, sinusoidal support structures comprising alternative widths may also be used. As just one example, a sinusoidal structure comprising a constant width over a first portion of the bladder support length $L_{BS}$ along with a varying width over a second portion of the length $L_{BS}$ may also be used.

Figures 19A, 19B:
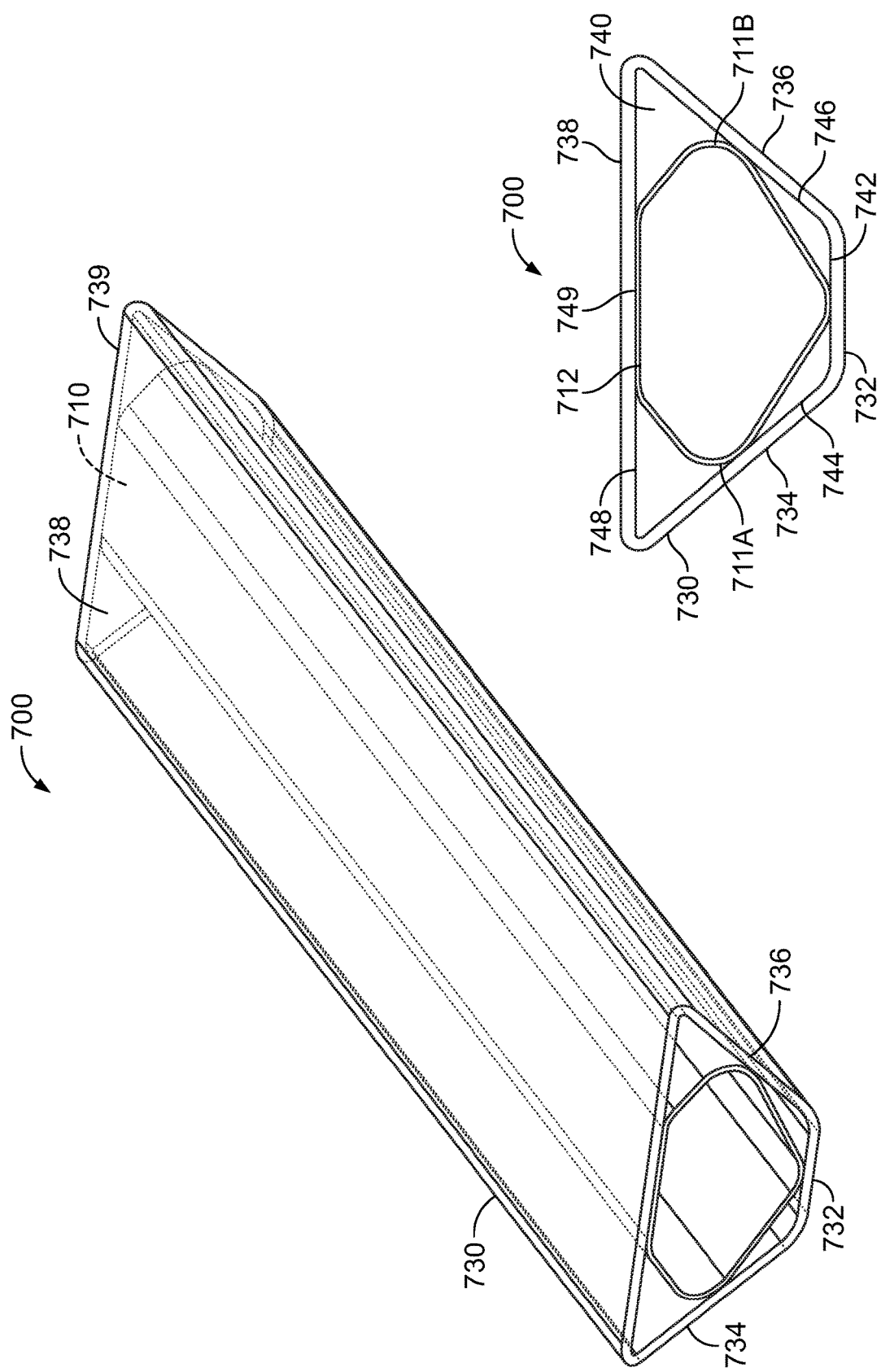
FIG. 19A is an illustration an exemplary bladder support positioned within a bladder, such as the bladder illustrated in FIGS. 6 and 7.
FIG. 19B is a cross sectional view of the bladder support illustrated in FIG. 19A.

FIG. 19A is an illustration another bladder system 700 comprising a bladder support 710 positioned within a bladder cavity 740 defined by a bladder 730, such as the bladder illustrated in FIGS. 5 and 6. FIG. 19B is a cross sectional view of the bladder support 710 illustrated in FIG. 19A positioned within the bladder cavity 740 defined by the bladder 730. The bladder 730 comprises a bottom wall 732, a first bladder sidewall 734 extending from the bottom wall 732, and a second bladder sidewall 736 extending from the bottom wall 322. A bladder top wall 738 extends from a bladder front wall (not shown) to a bladder back wall 739 and encloses the bladder 730, thereby defining an internal bladder cavity 740.

As illustrated, the bladder support 710 comprises a multi-sided bladder support. Specifically, the bladder support 710 comprises a five sided structure wherein the bladder support 710 is positioned within the bladder cavity 740. Specifically, the bladder support 710 is positioned so as to support a bottom surface 748 of the bladder top wall 738, an inner surface 744 of the first bladder side wall 734, an inner surface 746 of the second bladder side wall 736, and a top surface 742 of the bladder bottom wall 732. As such, and as may be seen from FIG. 19B, a top bearing surface 712 of the bladder support 710 supports the bottom surface 749 of the bladder top wall 748, a first side bearing surface 711a of the bladder support 710 supports the inner surface 744 of the first bladder side wall, a second side bearing surface 711b of the bladder support 710 supports the inner surface 746 of the second side wall 736, and a bottom bearing surface 718 of the bladder support 710 provide the compressive load support between the bladder top wall 738, the bladder side walls 734, 736, and the bladder bottom wall 732, respectively.

In one arrangement, the multi-sided bladder support 710 comprises a solid bladder support as illustrated in FIG. 19A. However, in an alternative arrangement, the multi-sided bladder support 710 comprises a segmented multi-walled bladder support. For example, FIG. 20A is an illustration of yet another bladder support system 750 wherein the bladder support comprises a segmented, multi-sided support 760. As illustrated, the multi-sided support 760 comprises a plurality of cut-outs along a length of the support 760. Advantages of such a segmented, multi-sided support 760 include lighter weight and greater flexibility.

Figures 21A, 21B:
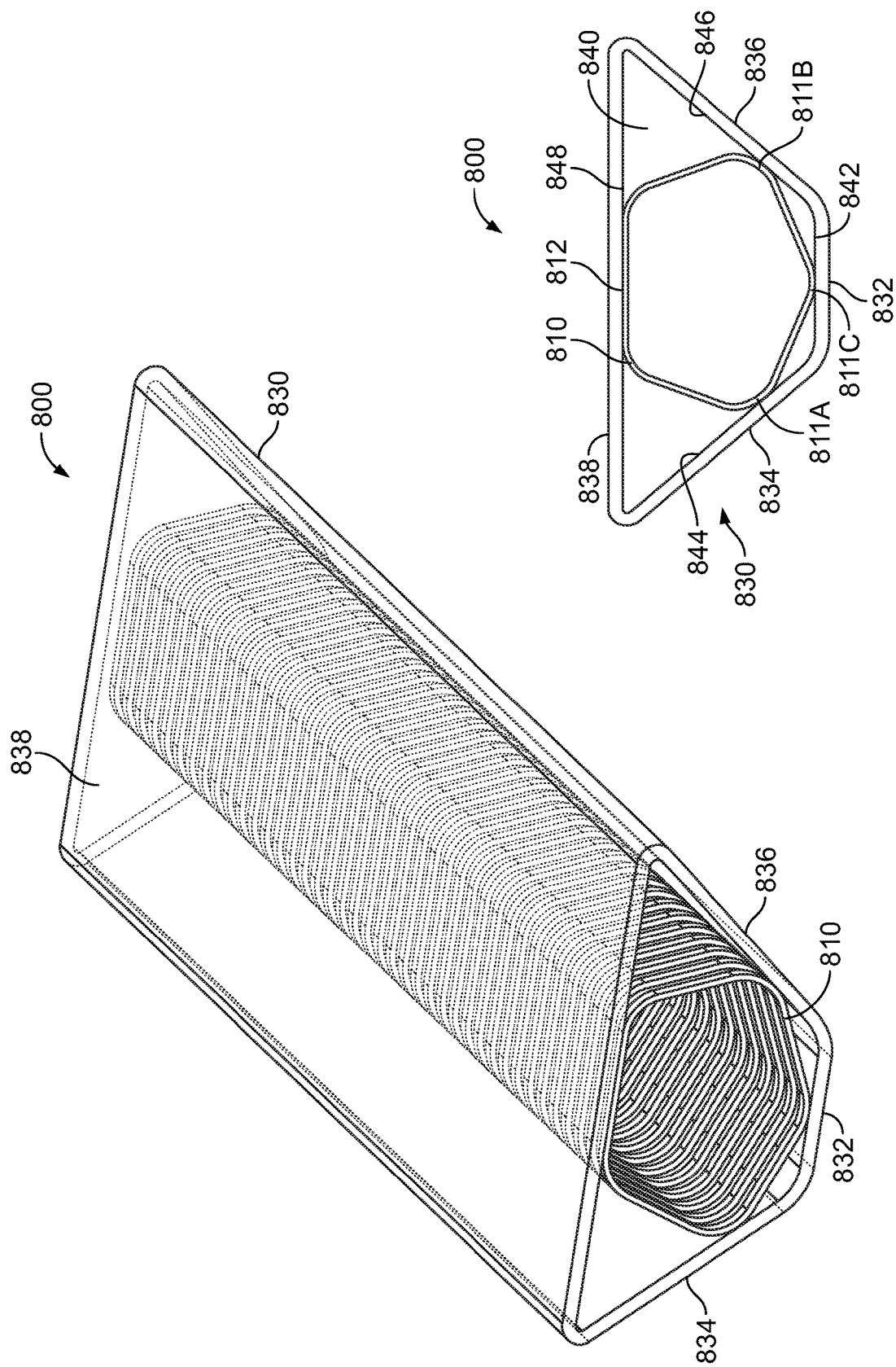
FIG. 21A is an illustration an exemplary bladder support positioned within a bladder, such as the bladder illustrated in FIGS. 6 and 7.
FIG. 21B is a cross sectional view of the bladder support illustrated in FIG. 21A.

FIG. 21A is an illustration another bladder system 800 comprising a bladder support 810 positioned within a bladder cavity 840 defined by a bladder, such as the bladder illustrated in FIGS. 5 and 6. FIG. 21B is a cross sectional view of the bladder support arrangement illustrated in FIG. 21A. As illustrated, the bladder support 810 comprises a multi-sided bladder support.

As illustrated, the bladder support 810 comprises a multi-sided bladder support. Specifically, the bladder support 810 comprises a five sided structure wherein the bladder support 810 is positioned within the bladder cavity 840. Specifically, the bladder support 810 is positioned so as to support a bottom surface 848 of the bladder top wall 838, an inner surface 844 of the first bladder side wall 834, an inner surface 846 of the second bladder side wall 836, and a top surface 842 of the bladder bottom wall 832. As such, and as may be seen from FIG. 21B, a top bearing surface 812 of the bladder support 810 supports the bottom surface 848 of the bladder top wall 848, a first side bearing surface 811a of the bladder support 810 supports the inner surface 844 of the first bladder side wall, a second side bearing surface 811b of the bladder support 810 supports the inner surface 846 of the second side wall 836, and a bottom bearing surface 811c of the bladder support 810 provide the compressive load support between the bladder top wall 888, the bladder side walls 834, 836, and the bladder bottom wall 832, respectively.

Figures 22A, 22B:
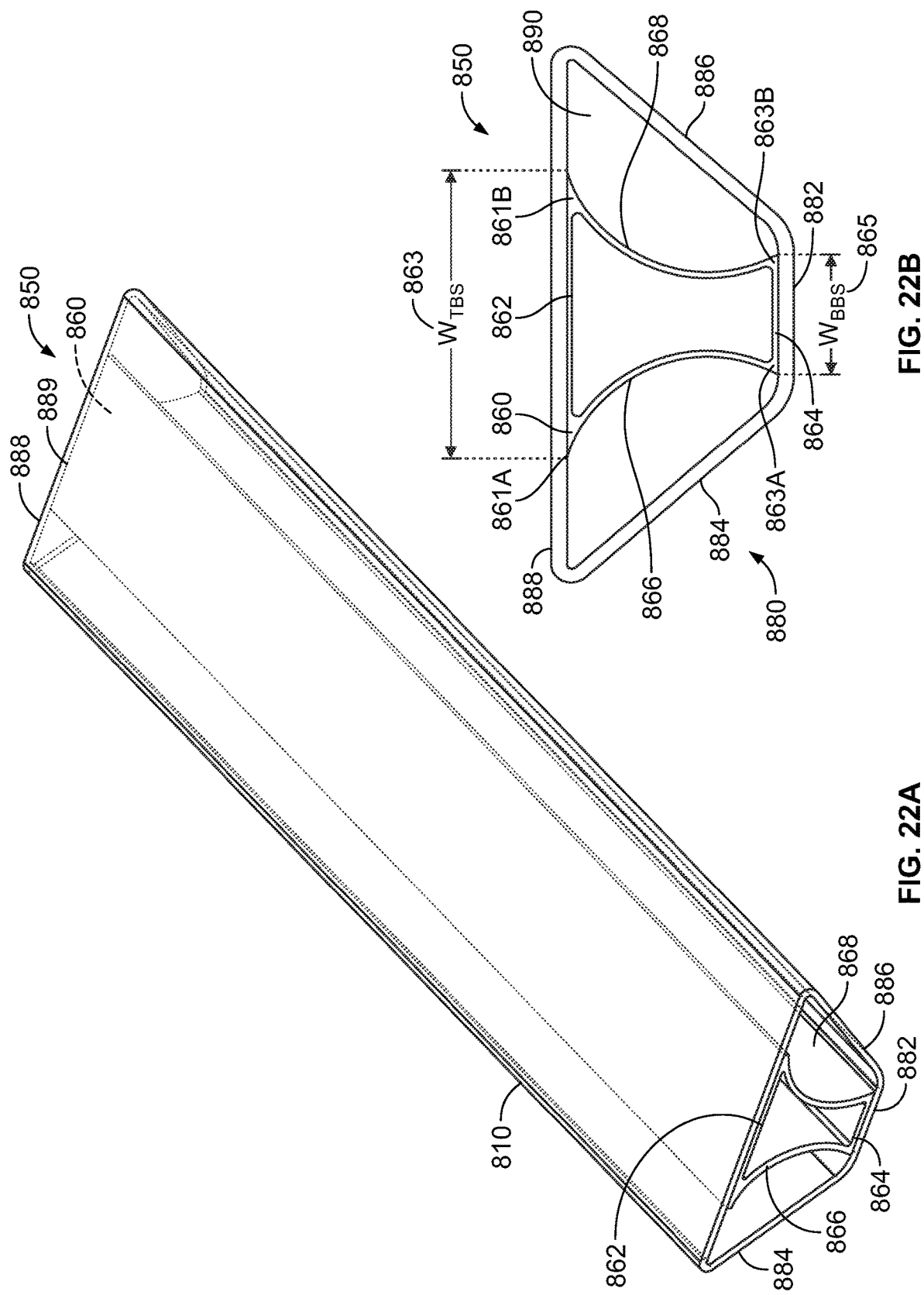
FIG. 22A is an illustration an exemplary bladder support positioned within a bladder, such as the bladder illustrated in FIGS. 6 and 7.
FIG. 22B is a cross sectional view of the bladder support illustrated in FIG. 22A.

FIG. 22A is an illustration of another bladder system 850 comprising a bladder support 860 positioned within a bladder cavity 890 defined by a bladder 880, such as the bladder illustrated in FIGS. 5 and 6. FIG. 22B is a cross sectional view of the bladder support 860 illustrated in FIG. 22A positioned within the cavity formed by the bladder 880. The bladder 880 comprises a bottom wall 882, a first bladder sidewall 884 extending from the bottom wall 882, and a second bladder sidewall 886 extending from the bottom wall 882. A bladder top wall 888 extends from a bladder front wall (not shown) to a bladder back wall 889 and encloses the bladder 880, thereby defining an internal bladder cavity 890.

As illustrated, the bladder support 860 comprises a double concave support. This double concave bladder 860 comprises both a top bearing surface 862 and a bottom bearing surface 864. This bladder support 860 further comprises a first side support 866 and a second side support 868. Specifically, the first side support 866 extends in a concave manner from a first end 863a of the bottom bearing surface 864 to a first end 861a of the top bearing surface 862. Similarly, the second side support 868 extends in a concave manner from a second end 863b of the bottom bearing surface 864 upwards towards a second end 861b of the top bearing surface 862. In this manner, a top surface of the top bearing surface 862 provides support along a bottom surface of the bladder top wall 888. In addition, a bottom bearing surface of the bottom support 864 provides bladder support to the top surface of the bladder bottom wall 882.

As such, and as may be seen from FIG. 22B, a top bearing surface 862 of the bladder support 860 supports the bottom surface of the bladder top wall 888 and a bottom bearing surface 864 of the bladder support 860 is provided along a top surface of the bladder bottom wall 832 so as to provide the compressive load support between the bladder top wall 888 and the bladder bottom wall 832, respectively.

As illustrated in FIG. 22B, the top bearing surface 862 comprises a surface width $W_{TBS}$ 863 that is generally larger than a width $W_{BBS}$ 865 of the bottom bearing surface 864. As those of ordinary skill will recognize, alternative supporting width structures may also be provided.

Figures 23A, 23B:
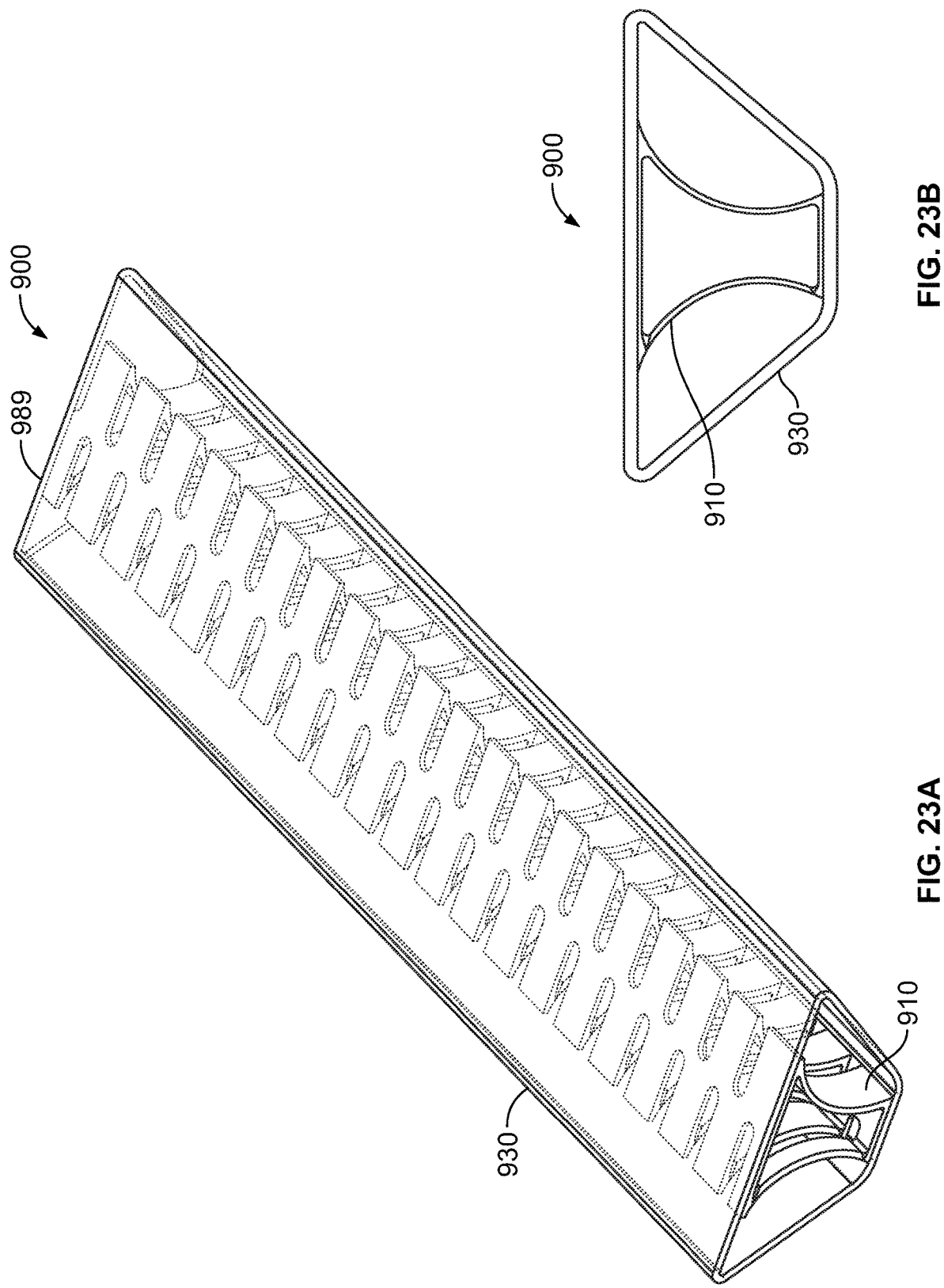
FIG. 23A is an illustration an exemplary bladder support positioned within a bladder, such as the bladder illustrated in FIGS. 6 and 7.
FIG. 23B is a cross sectional view of the bladder support illustrated in FIG. 23A.

As illustrated in FIG. 22A, the double concave bladder support 860 comprises a continuous structure. In an alternative arrangement, the double concave bladder support may comprise a double concave segmented bladder support. For example, FIG. 23A is an illustration a segmented double concave bladder support 900 positioned within a bladder 930, such as the bladder illustrated in FIGS. 5 and 6. FIG. 23B is a cross sectional view of the segmented double concave bladder support 930 illustrated in FIG. 25A. Advantages of such a segmented bladder support include lighter weight and greater flexibility.

Figures 24A, 24B:
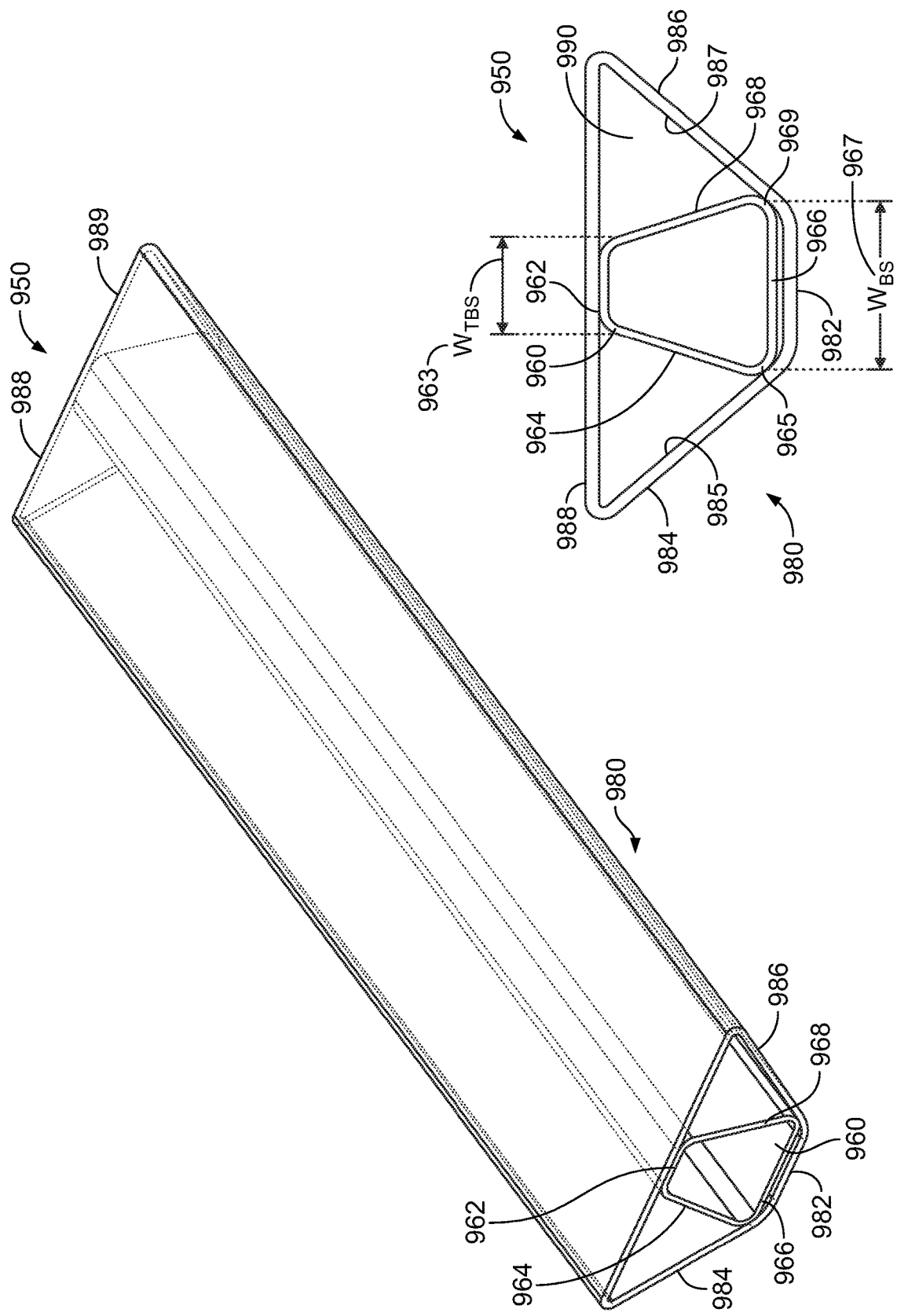
FIG. 24A is an illustration an exemplary bladder support positioned within a bladder, such as the bladder illustrated in FIGS. 6 and 7.
FIG. 24B is a cross sectional view of the bladder support illustrated in FIG. 24A.

FIG. 24A is an illustration another bladder system 950 comprising a bladder support 960 positioned within a bladder cavity 990 defined by a bladder 980, such as the bladder illustrated in FIGS. 5 and 6. FIG. 24B is a cross sectional view of the bladder support 960 illustrated in FIG. 24A positioned within the cavity defined by the bladder 980. The bladder 980 comprises a bottom wall 982, a first bladder sidewall 984 extending from the bottom wall 982, and a second bladder sidewall 986 extending from the bottom wall 982. A bladder top wall 988 extends from a bladder front wall (not shown) to a bladder back wall 989 and encloses the bladder 980, thereby defining an internal bladder cavity 990.

As illustrated, the bladder support 960 comprises a multi-sided structure wherein the multi-sided structure comprise a top bearing surface 962 and a bottom wall 966. As illustrated, the top bearing surface comprises a width $W_{TBS}$ 963 and the bottom wall 966 comprises a width $W_{BS}$ 967 wherein the bottom side width $W_{BS}$ 967 is greater than the top side width $W_{TS}$ 963.

As illustrated, the bladder support 960 comprises a multi-sided bladder support. Specifically, the bladder support 960 comprises a four sided structure wherein the bladder support 960 is positioned within the bladder cavity 990. As illustrated, the bladder support 960 is positioned so as to support a bottom surface of the bladder top wall 988, an inner surface 985 of the first bladder side wall 984, and an inner surface 987 of the second bladder side wall 986. As such, and as may be seen from FIG. 24B, the top bearing surface 962 of the bladder support 960 supports the bottom surface of the bladder top wall 988, a first side bearing surface 965 of the bladder support 960 supports an inner surface 985 of the first bladder side wall 984, and a second side bearing surface 969 of the bladder support 960 supports an 987 inner surface of the second side wall 986, such that the bladder support 960 provides the compressive load support between the bladder top wall 988, and the bladder side walls 984, 986, respectively.

Figures 25A, 25B:
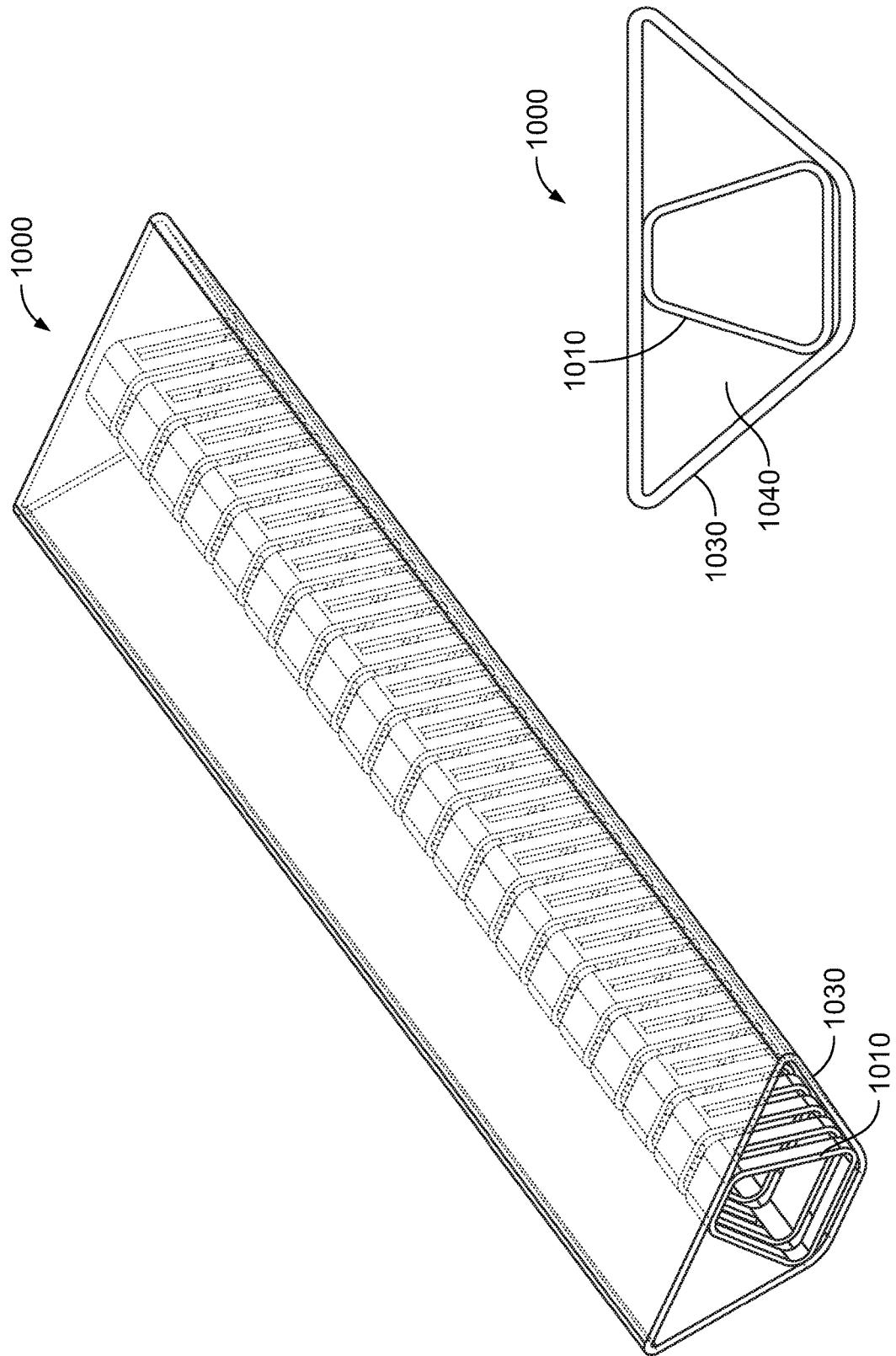
FIG. 25A is an illustration an exemplary bladder support positioned within a bladder, such as the bladder illustrated in FIGS. 6 and 7.
FIG. 25B is a cross sectional view of the bladder support illustrated in FIG. 25A.

As illustrated, the multi-sided support 950 illustrated in FIG. 24A comprises a non-segmented structure. However, in an alternative arrangement, the multi-sided bladder support 950 comprises a segmented bladder support. For example, FIG. 25A is an illustration a segmented multi-walled structure bladder support 1010 positioned within a bladder cavity 1040 defined by a bladder 1030, such as the bladder illustrated in FIGS. 5A and 5B. FIG. 25B is a cross sectional view of the bladder support 1010 illustrated in FIG. 25A positioned within the bladder cavity 1040.

Figures 26A, 26B:
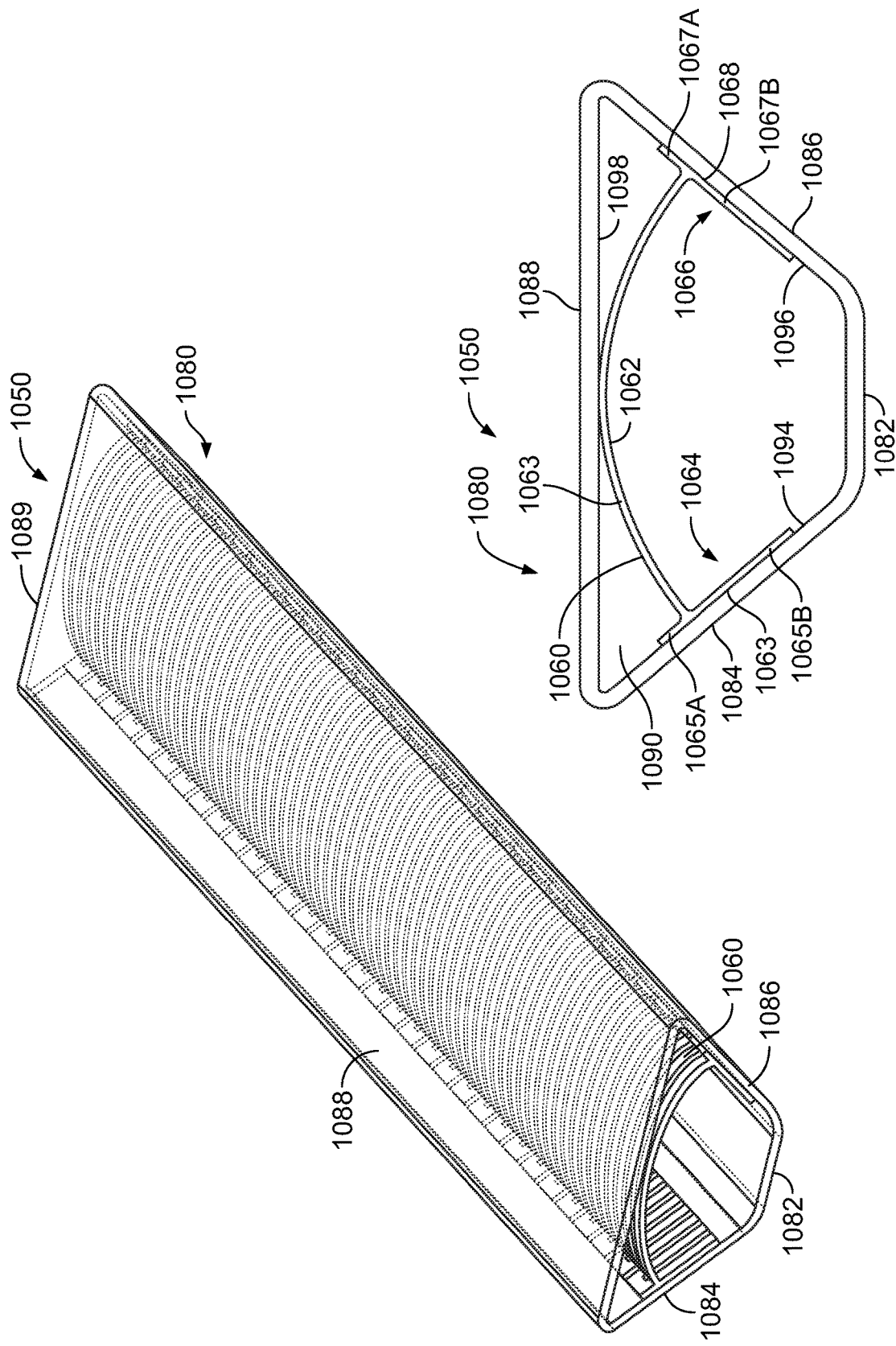
FIG. 26A is an illustration an exemplary bladder support positioned within a bladder, such as the bladder illustrated in FIGS. 6 and 7.
FIG. 26B is a cross sectional view of the bladder support illustrated in FIG. 26A.

FIG. 26A is an illustration another bladder system 1050 comprising a bladder support 1060 positioned within a bladder cavity 1090 defined by a bladder 1080, such as the bladder illustrated in FIGS. 5 and 6. FIG. 26B is a cross sectional view of the bladder support arrangement illustrated in FIG. 26A. The bladder 1080 comprises a bottom wall 1082, a first bladder sidewall 1084 extending from the bottom wall 1082, and a second bladder sidewall 1086 extending from the bottom wall 1082. A bladder top wall 1088 extends from a bladder front wall (not shown) to a bladder back wall 1089 and encloses the bladder 1080, thereby defining an internal bladder cavity 1090.

As illustrated, the bladder support 1060 comprises a main support portion 1062, a first support leg 1064, and a second support leg 1066. The support first leg 1064 comprises a first leg portion 1065a and a second leg portion 1065b. In this illustrated arrangement, the second leg portion 1065b is longer than the first leg portion 1065a. Similarly, the second support leg 1066 comprises a first leg portion 1067a and a second leg portion 1067b. In this illustrated arrangement, the second leg portion 1067b is longer than the first leg portion 1067a.

As illustrated in FIG. 26B, when providing support to the bladder 1080, an outer surface 1063 of the first support leg 1064 resides along an inner surface of the bladder first side wall 1084 while an outer surface 1068 of the second leg 1066 resides along an inner surface of the bladder second side wall 1086. In this illustrated arrangement, the main portion 1062 of the bladder support 1060 is bowed in a convex shape so that an upper surface of the bladder support main portion 1060 provides support to a bottom surface of the bladder top wall.

As such, and as may be seen from FIG. 26B, a top bearing surface 1063 of the bladder support main portion 1060 supports the bottom surface 1098 of the bladder top wall 1088, the first support leg 1064 supports the inner surface 1094 of the first bladder side wall 1084, and a second support leg 1064 supports the inner surface 1096 of the second side wall 1086, such that the bladder support 1060 provides the compressive load support between the bladder top wall 1088, and the bladder side walls 1084, 1086, respectively.

FIG. 27A is an illustration another bladder system 1100 comprising a bladder support 1110 positioned within a bladder cavity 1140 defined by a bladder 1030, such as the bladder illustrated in FIGS. 5 and 6. FIG. 27B is a cross sectional view of the bladder support arrangement illustrated in FIG. 27A. The bladder 1130 comprises a bottom wall 1132, a first bladder sidewall 1134 extending from the bottom wall 1132, and a second bladder sidewall 1136 extending from the bottom wall 1132. A bladder top wall 1138 extends from a bladder front wall (not shown) to a bladder back wall 1139 and encloses the bladder 1130, thereby defining an internal bladder cavity 1140.

In this illustrated arrangement, the bladder support 1110 comprises a plurality of cylindrical support structures 1112a-d, 1114. Specifically, in this arrangement, the bladder support comprises a plurality of first and a plurality of second cylindrical support structures wherein the first and second cylindrical support structures comprise a similar geometrical configuration. For example, and as illustrated in FIG. 27B, the cylindrical support structure The third spiral like support structure comprises a larger geometrical configuration than the first and second support structures.

In this illustrated arrangement, the bladder support 1110 comprises a plurality of cylindrical supports 1112, 1114, 1116, 1118, and 1119. Specifically, in this arrangement, the bladder support 1110 comprises a first plurality of cylindrical supports 1112, a second plurality of cylindrical supports 1114, a third plurality of cylindrical supports 1116, a fourth plurality of cylindrical supports 1119. In this preferred arrangement, the first, second, fourth and fifth cylindrical support structures comprise similar cylindrical geometries.

The third spiral support structure 1119 comprises a smaller geometrical configuration than the first, second, fourth and fifth cylindrical supports.

As illustrated in FIG. 27B, the first cylindrical support 1112 resides in a nested position within a first bottom corner 1142 of the bladder 1130 defined between the first bladder side wall 1134 and the bladder bottom wall 1132. Similarly, the second cylindrical support structure 1114 resides in a nested position within a second bottom corner 1144 of the bladder 1130 defined between the bladder second sidewall 1136 and the bladder bottom wall 1132.

The third cylindrical support structure 1119 is nested between the first and second support structures 1112, 1114. The fourth and fifth cylindrical supports 1116, 1118 are then positioned between a bottom surface 1133 of the bladder top wall 1132 and the first and second support structures 1112, 1114, respectively. In one preferred arrangement, the third cylindrical support 1119 comprises a smaller diameter than the first, second, fourth and fifth cylindrical supports 1112, 1114, 1116, and 1118. However, those of ordinary skill in the art will recognize alternative bladder support geometrical configurations and sizes are also possible.

In this arrangement, and as may be seen from FIG. 27B, a bearing surface 1113 of the first cylindrical support 1112, a bearing surface 1115 of the second cylindrical support 1114, a bearing surface 1117 of the fourth cylindrical support 1116 and a bearing surface 1117 provide the compressive load support between the bottom surface 1133 of the bladder top wall 1132 and a top surface 1133 of the bladder bottom wall 1132, respectively.

FIG. 28A is an illustration another bladder system 1150 comprising a bladder support 1160 positioned within a bladder cavity of a bladder, such as the bladder illustrated in FIGS. 5A and 5B. FIG. 28B is a cross sectional view of the bladder support 1160 illustrated in FIG. 18A positioned within the bladder cavity 1190 defined by the bladder 1180. The bladder 1180 comprises a bottom wall 1182, a first bladder sidewall 1184 extending from the bottom wall 1182, and a second bladder sidewall 1186 extending from the bottom wall 1182. A bladder top wall 1188 extends from a bladder front wall (not shown) to a bladder back wall 1189 and encloses the bladder 1180, thereby defining an internal bladder cavity 1190.

As illustrated, the bladder support 1160 comprises a multi-sided bladder support. In this illustrated multi-sided bladder support, the bladder support 1160 comprises a six sided structure wherein the bladder support 1160 is positioned within the bladder cavity 1190. Specifically, the bladder support 1160 is positioned so as to support a bottom surface 1182 of the bladder top wall 1188, an inner surface 1185 of the first bladder side wall 1184, an inner surface 1187 of the second bladder side wall 1186, and a top surface 1183 of the bladder bottom wall 1182. As such, and as may be seen from FIG. 28B, a top bearing surface 1162 of the bladder support 1160 supports the bottom surface 1182 of the bladder top wall 1188, a first side bearing surface of the bladder support 1160 supports the inner surface 1185 of the first bladder side wall 1184, a second side bearing surface 1168 of the bladder support 1160 supports the inner surface 1187 of the second bladder side wall 1186, and a bottom bearing surface 1166 of the bladder support 1160 provide the compressive load support between the bladder top wall 1188, the bladder side walls 1184, 1186, and the bladder bottom wall 1182, respectively.

In one arrangement, the multi-sided bladder support 1160 comprises a segmented bladder support as illustrated in FIG. 28A. In such a segmented bladder support arrangement, a plurality of slots are provided along a length of the bladder support 1160. In an alternative arrangement, the multi-sided bladder support 1160 comprises a solid or a non-segmented multi-walled bladder support.

Figures 29A, 29B:
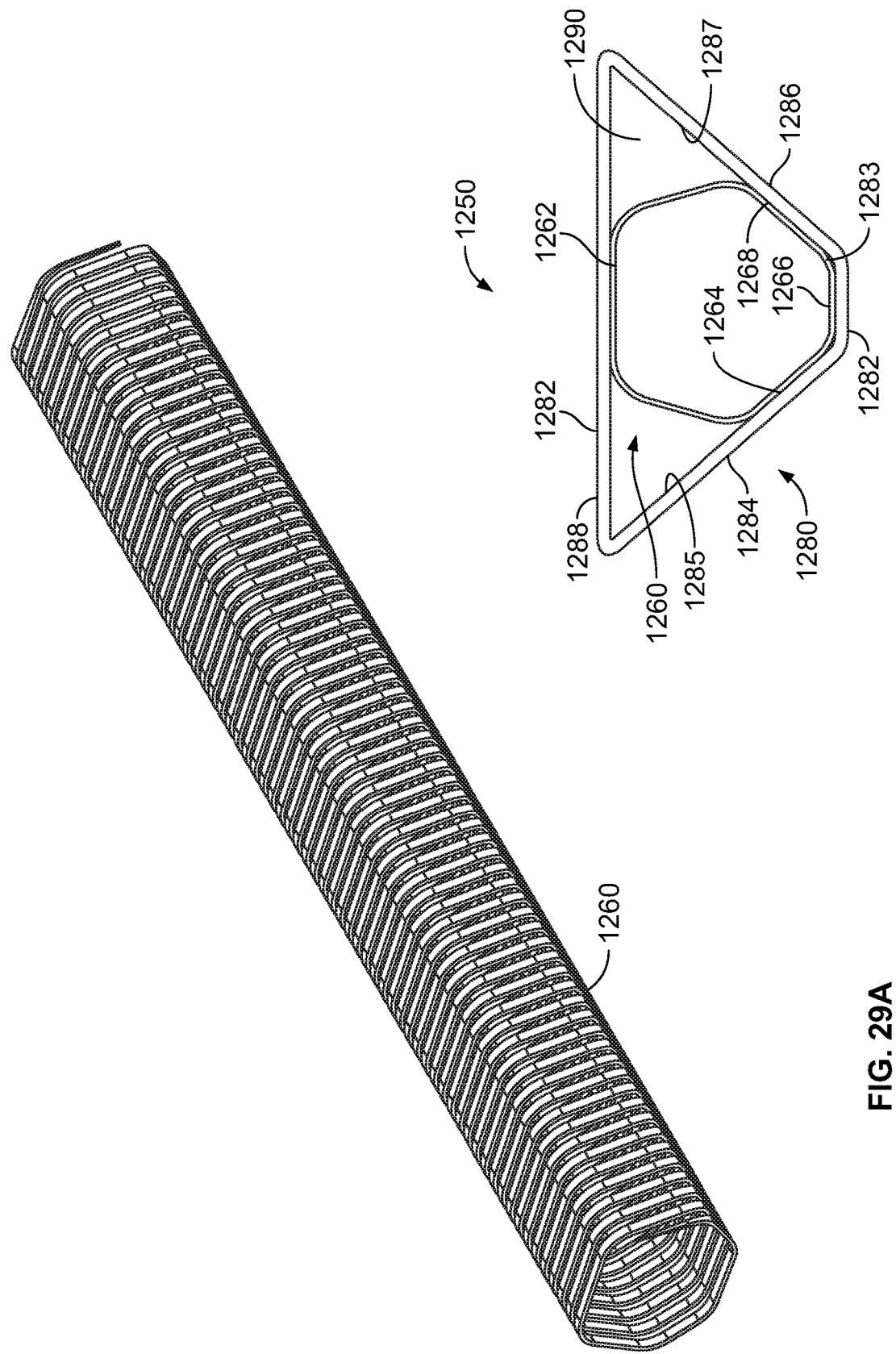
FIG. 29A is an illustration an exemplary bladder support.
FIG. 29B is a cross sectional view of the bladder support illustrated in FIG. 28A, positioned within a bladder, such as the bladder illustrated in FIGS. 6 and 7.

FIG. 29A is an illustration another spiral bladder support 1260. FIG. 29B is a cross sectional view of the spiral bladder support 1260 illustrated in FIG. 29A positioned within a bladder cavity 1290 defined by a bladder 1280. The bladder 1280 comprises a bottom wall 1282, a first bladder sidewall 1284 extending from the bottom wall 1282, and a second bladder sidewall 1286 extending from the bottom wall 1282. A bladder top wall 1288 extends from a bladder front wall (not shown) to a bladder back wall (not shown) and encloses the bladder 1280, thereby defining an internal bladder cavity 1290.

As illustrated, the spiral bladder support 1260 comprises a multi-sided bladder support in the form of a continuous spiral. In this illustrated multi-sided bladder support, the spiral bladder support 1260 comprises a six sided structure wherein the bladder support 1260 is positioned within the bladder cavity 1290. Specifically, the spiral bladder support 1260 is positioned so as to support a bottom surface 1282 of the bladder top wall 1288, an inner surface 1285 of the first bladder side wall 1284, an inner surface 1287 of the second bladder side wall 1286, and a top surface 1283 of the bladder bottom wall 1282. As such, and as may be seen from FIG. 29B, a top bearing surface 1262 of the spiral bladder support 1260 supports the bottom surface 1282 of the bladder top wall 1288, a first side bearing surface of the spiral bladder support 1260 supports the inner surface 1285 of the first bladder side wall 1284, a second side bearing surface 1268 of the bladder support 1260 supports the inner surface 1287 of the second bladder side wall 1286, and a bottom bearing surface 1266 of the bladder support 1260 provide the compressive load support between the bladder top wall 1288, the bladder side walls 1284, 1286, and the bladder bottom wall 1282, respectively.

In one arrangement, a top bearing surface 1262 of the spiral bladder support 1260 comprises a crowned top bearing surface 1262 comprising an upwardly extending convex shape. Such a crowned top bearing surface 1262 would have a first height at room temperature that is equal to a second height at a cure temperature. As such, the crowned top bearing surface would support the bottom surface of the bladder top wall 1288 at room temperature. In addition, at the higher cure temperature, the crowned top bearing surface 1262 would continue to support the bottom surface of the bladder top wall 1288 since at the cure temperature the coefficient of thermal expansion of the bladder 1280 would extend to the design dimensions of the cavity. Advantageously, the crowned top bearing surface 1262 would continue to provide support to the top wall of the bladder 1280 even at higher cure temperatures.

In one arrangement, the spiral bladder support 1260 comprises an even segmented spiral bladder support wherein a spacing between adjacent spiral portions are generally equal to one another. In one arrangement, the spiral bladder support 1260 comprises a spiral comprising a continuous width along the entire length of the spiral bladder support.

Figures 30A, 30B:
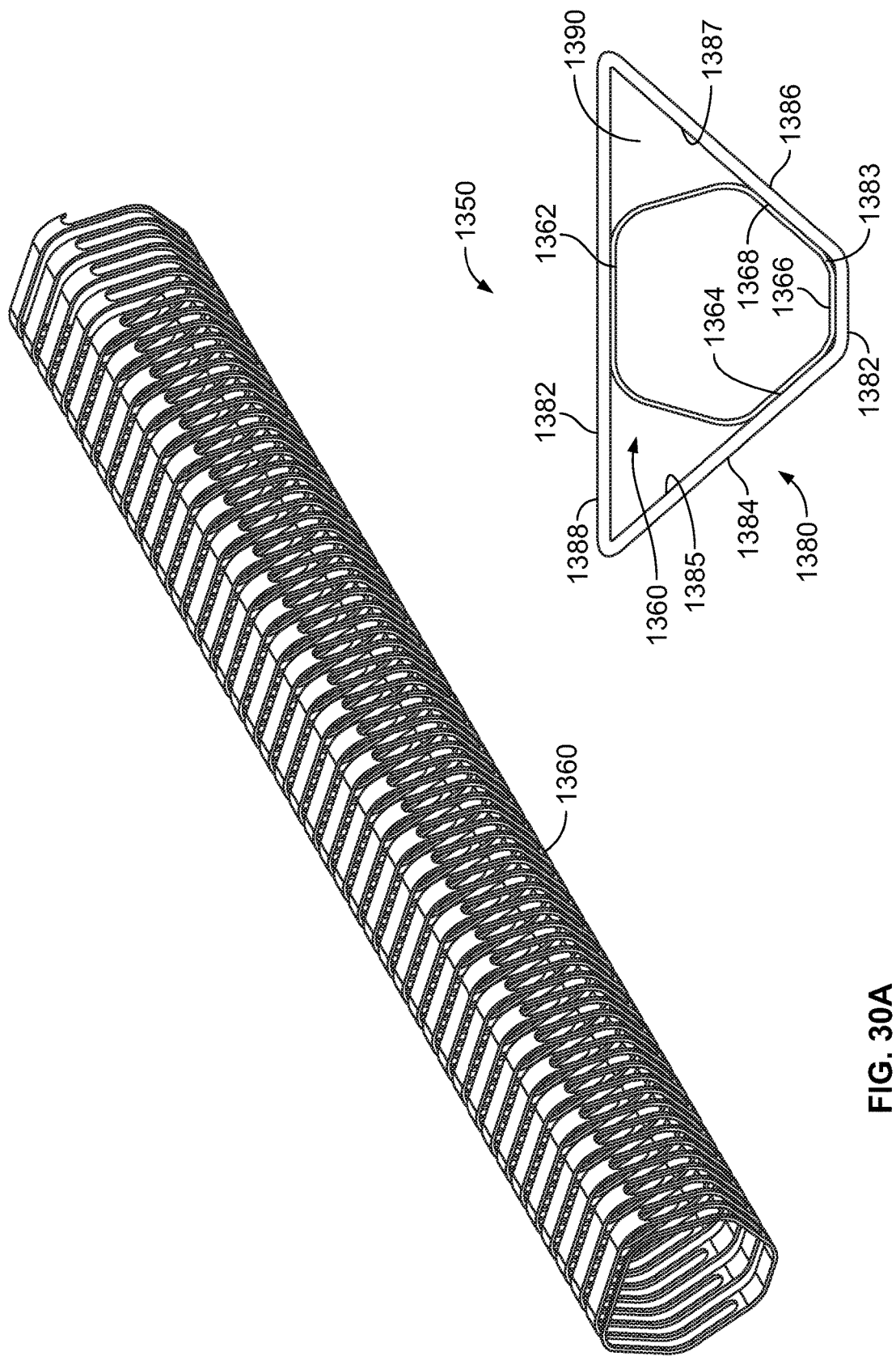
FIG. 30A is an illustration an exemplary bladder support.
FIG. 30B is a cross sectional view of the bladder support illustrated in FIG. 30A, positioned within a bladder, such as the bladder illustrated in FIGS. 6 and 7.

FIG. 30A is an illustration another spiral bladder support 1360. FIG. 30B is a cross sectional view of the spiral bladder support 1360 illustrated in FIG. 30A positioned within a bladder cavity 1390 defined by the bladder 1380. The bladder 1380 comprises a bottom wall 1382, a first bladder sidewall 1384 extending from the bottom wall 1382, and a second bladder sidewall 1386 extending from the bottom wall 1382. A bladder top wall 1388 extends from a bladder front wall (not shown) to a bladder back wall (not shown) and encloses the bladder 1380, thereby defining an internal bladder cavity 1390.

As illustrated, the spiral bladder support 1360 comprises a multi-sided bladder support in the form of a continuous spiral. In this illustrated multi-sided bladder support, the spiral bladder support 1360 comprises a six sided structure wherein the bladder support 1360 is positioned within the bladder cavity 1390. Specifically, the spiral bladder support 1360 is positioned so as to support a bottom surface 1382 of the bladder top wall 1388, an inner surface 1385 of the first bladder side wall 1384, an inner surface 1387 of the second bladder side wall 1386, and a top surface 1383 of the bladder bottom wall 1382. As such, and as may be seen from FIG. 30B, a top bearing surface 1362 of the spiral bladder support 1360 supports the bottom surface 1382 of the bladder top wall 1388, a first side bearing surface of the spiral bladder support 1360 supports the inner surface 1385 of the first bladder side wall 1384, a second side bearing surface 1368 of the bladder support 1360 supports the inner surface 1387 of the second bladder side wall 1386, and a bottom bearing surface 1366 of the bladder support 1360 provide the compressive load support between the bladder top wall 1388, the bladder side walls 1384, 1386, and the bladder bottom wall 1382, respectively.

In one arrangement, the spiral bladder support 1360 comprises an even segmented spiral bladder support wherein a spacing between adjacent spiral portions are generally equal to one another. In one arrangement, the spiral bladder support 1360 comprises a spiral comprising a continuous width along the entire length of the spiral bladder support 1360. In one arrangement, a slot is provided within each spiral segment of the spiral bladder support 1360. As illustrated, the plurality of slots provided in the plurality of spiral bladder support segments are all of uniform shape and dimensions. However, in alternative spiral bladder support arrangements, different sized slots and slot configurations may also be used.

Figure 31A:
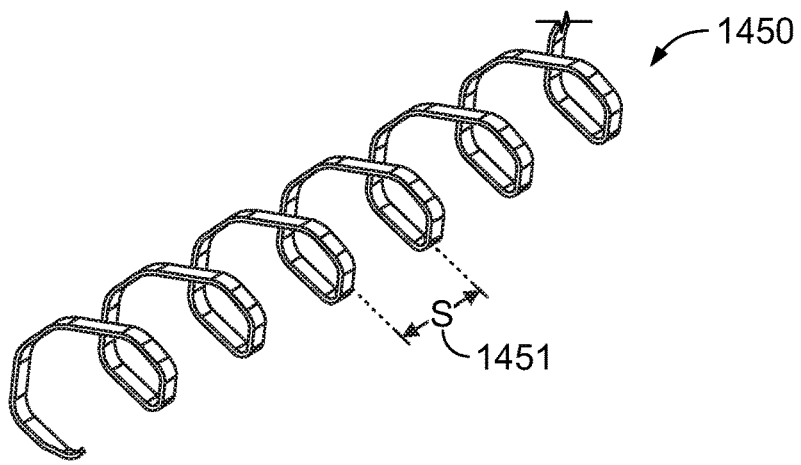
FIG. 31A is an illustration an exemplary bladder support.
Figure 31B:
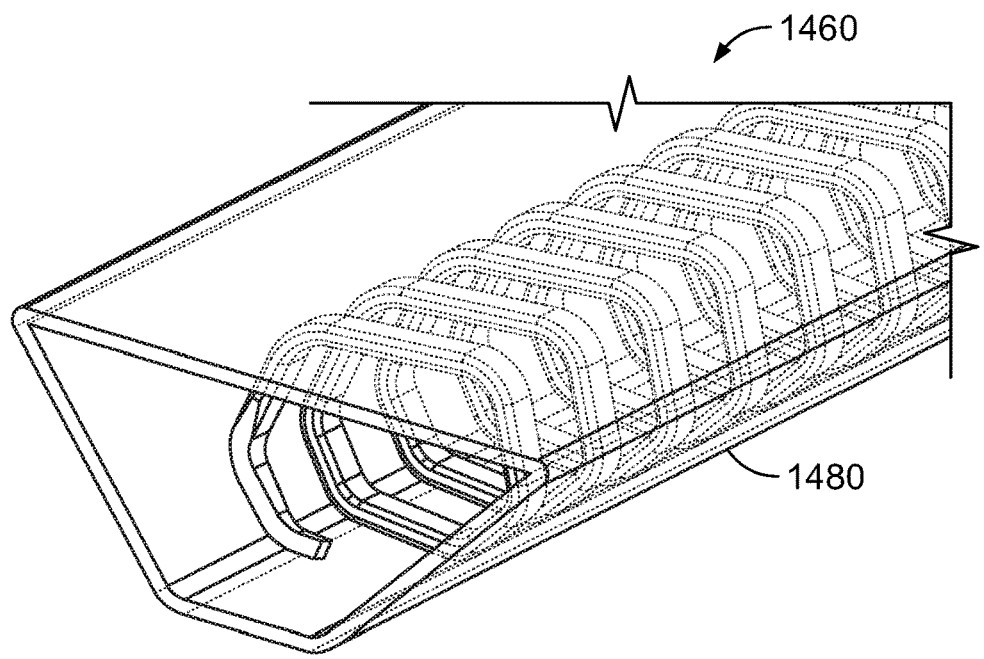
FIG. 31B is an illustration the exemplary bladder support illustrated in FIG. 31A positioned within a bladder, such as the bladder illustrated in FIGS. 6 and 7.
Figure 31C:
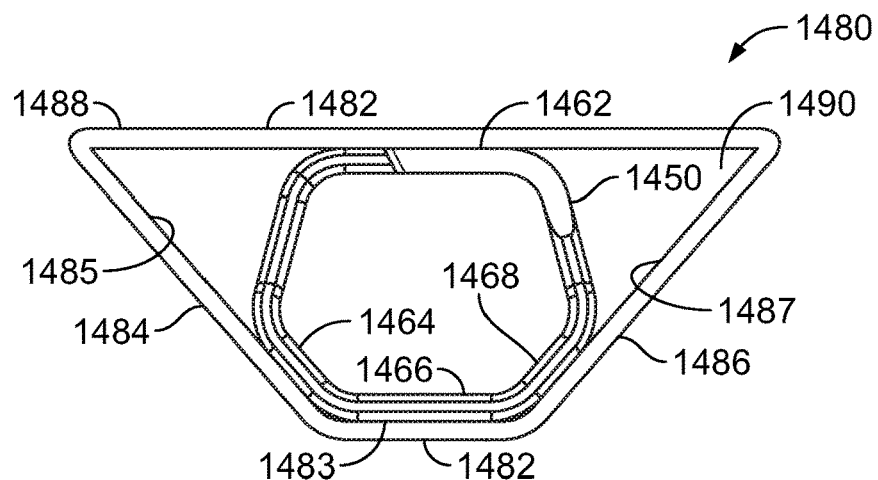
FIG. 31C is a cross sectional view of the bladder support system illustrated in FIG. 31B.

FIG. 31A is an illustration another bladder support in the form of a spiral bladder support 1450. FIG. 31B is an illustration of a bladder support system 1460 comprising the spiral bladder support 1450 positioned within a bladder cavity 1490 of a bladder 1480, such as the bladder illustrated in FIGS. 5A and 5B. FIG. 31C is a cross sectional view of the spiral bladder support 1450 illustrated in FIG. 31B positioned within the bladder cavity 1490 defined by the bladder 1480. The bladder 1480 comprises a bottom wall 1482, a first bladder sidewall 1484 extending from the bottom wall 1482, and a second bladder sidewall 1486 extending from the bottom wall 1482. A bladder top wall 1488 extends from a bladder front wall (not shown) to a bladder back wall (not shown) and encloses the bladder 1480, thereby defining an internal bladder cavity 1490.

As illustrated, the spiral bladder support 1450 comprises a multi-sided bladder support in the form of a continuous spiral. In this illustrated multi-sided bladder support, the spiral bladder support 1450 comprises a six sided structure wherein the bladder support 1450 is positioned within the bladder cavity 1490. Specifically, the spiral bladder support 1450 is positioned so as to support a bottom surface 1482 of the bladder top wall 1488, an inner surface 1485 of the first bladder side wall 1484, an inner surface 1487 of the second bladder side wall 1486, and a top surface 1483 of the bladder bottom wall 1482. As such, and as may be seen from FIG. 31C, a top bearing surface 1462 of the spiral bladder support 1460 supports the bottom surface 1482 of the bladder top wall 1488, a first side bearing surface of the spiral bladder support 1450 supports the inner surface 1485 of the first bladder side wall 1484, a second side bearing surface 1468 of the bladder support 1450 supports the inner surface 1487 of the second bladder side wall 1486, and a bottom bearing surface 1466 of the bladder support 1460 provide the compressive load support between the bladder top wall 1488, the bladder side walls 1484, 1486, and the bladder bottom wall 1482, respectively.

In one arrangement, the spiral bladder support 1450 comprises an even segmented spiral bladder support wherein a spacing S between adjacent spiral portions is generally equal to one another. In the spiral bladder support 1450 illustrated in FIGS. 31A-C, this spacing S 1451 (FIG. 31A) between adjacent spiral portions can be increased or decreased depending on the bladder support application. For example, the spacing S 1451 of the bladder support 1450 is generally greater than the spacing of the spiral bladder supports illustrated in FIGS. 29 and 30.

Figure 32A:
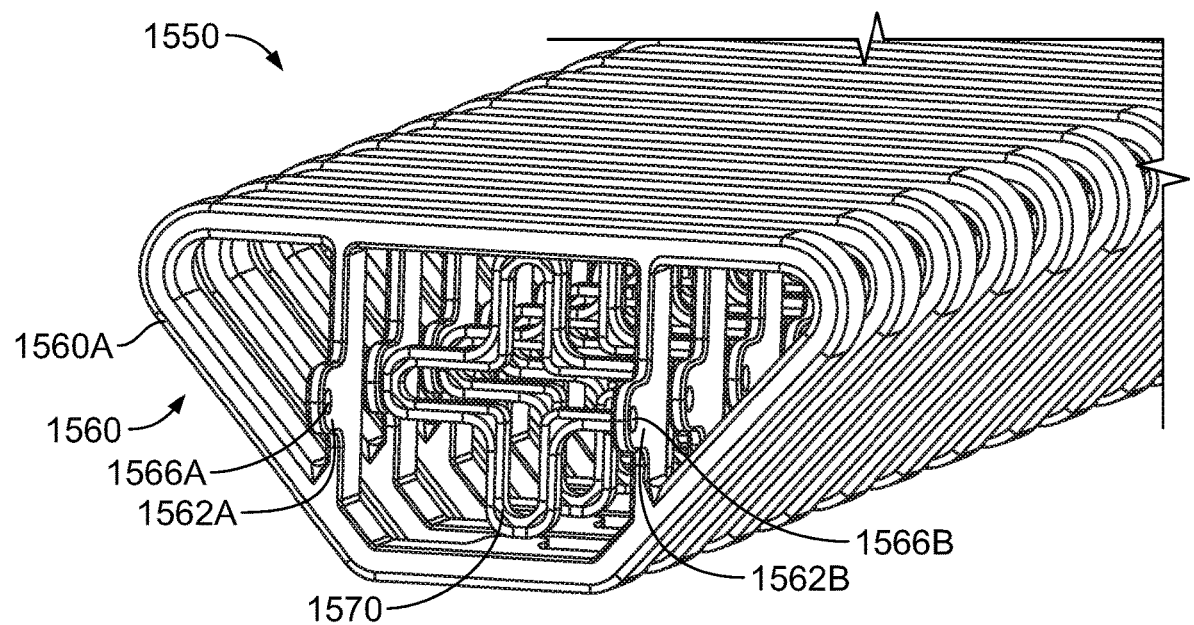
FIG. 32A is an illustration an exemplary bladder support.

FIG. 32A illustrates a perspective view of a multi-segmented articulated bladder support 1550. As illustrated, the multi-segmented bladder support 1550 comprises a plurality of bladder segments 1560 joined to one another. As illustrated, the plurality of bladder segments 1560 are fixedly attached to one another by way of a joining member, such as joining member 1570. In this illustrated arrangement, the joining member 1570 comprises a cross joining member. As also illustrated, each bladder support segment within the plurality of segments 1560 comprises a four sided support structure that is joined to an adjacent four sided bladder support segment by way of the cross joining member.

To enable joining adjacent bladder support segments, each bladder support segment comprises two vertically oriented, forward facing arm segments. For example, bladder support segment 1560A comprises two vertically oriented, forward facing arm segments 1562A, B. Each of these forward facing arm segments define a receiving cavity. For example, first vertically oriented, forward facing arm segment 1562A defines a first receiving cavity 1566A and the second vertically oriented, forward facing arm segment 1562B defines a second receiving cavity 1566B.

In addition, each bladder support segment comprises two horizontally oriented, rearward facing arm segments. For example, bladder support segment 1560 comprises two horizontally oriented, rearward facing arm segments 1570A, B. Each of these rearward facing arm segments define a receiving cavity. For example, first horizontally oriented, rearward facing arm segment 1572A defines a first receiving cavity 1574A and second horizontally oriented, rearward facing arm segment 1570B defines a second receiving cavity 1574B.

When the various adjacent support segments 1560 are joined to another so as to define the articulated bladder support 1550, the arms of the cross joining member 1570 engage the forward vertically oriented arm segments 1562A, B of the bladder support segment and the top and bottom portions of the cross joining member 1570 engage the rearward, horizontally facing arm segments of a second bladder support segment residing adjacent the first bladder support segment 1560.

Figure 32B:
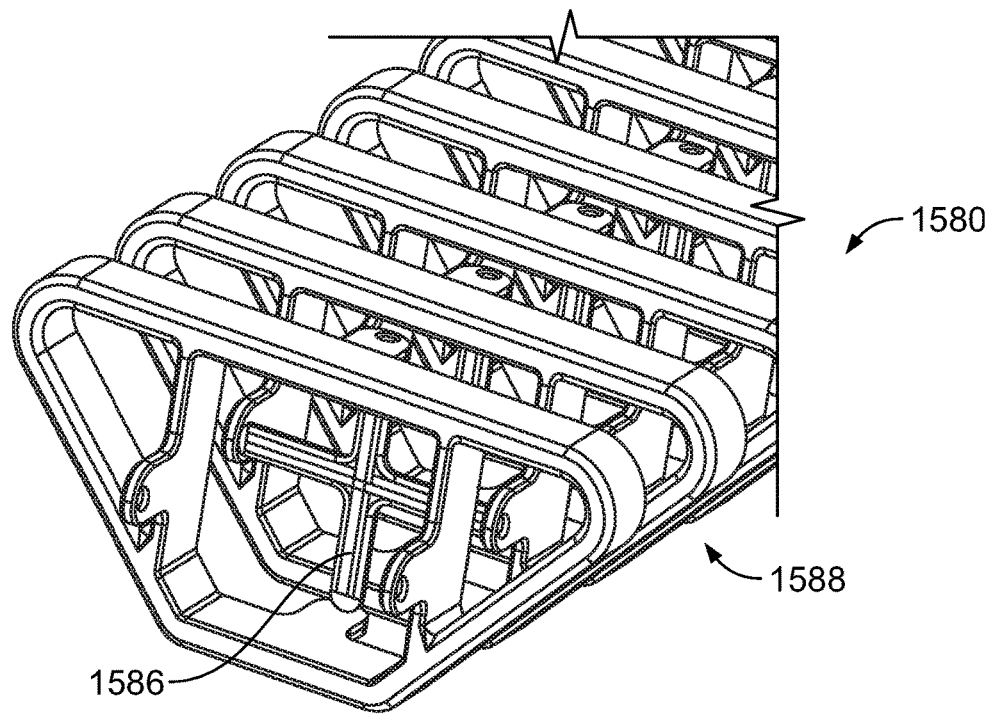
FIG. 32B is an illustration an exemplary bladder support.

FIG. 32B illustrates a perspective view of an alternative multi-segmented articulated bladder support 1580 similar in structure to the bladder support 1550 illustrated in FIG. 32A. As illustrated, the multi-segmented bladder support comprises a plurality of bladder supports 1588 that are operatively coupled to one another by way of a joining member 1586. However, one difference between the bladder support 1550 and the bladder support 1580 is that bladder support

1580 utilizes a star joining member 1586 to join the adjacent bladder support segments making up the bladder support.

That is, when the various adjacent support segments 1588 are joined to another so as to define the articulated bladder support 1580, the arms of the star joining member 1586 engage forward vertically oriented arm segments of the bladder support segment and the top and bottom portions of the star joining member 1586 engage the rearward, horizontally facing arm segments of a second bladder support segment residing adjacent the first bladder support segment 1580.

Figure 32C:
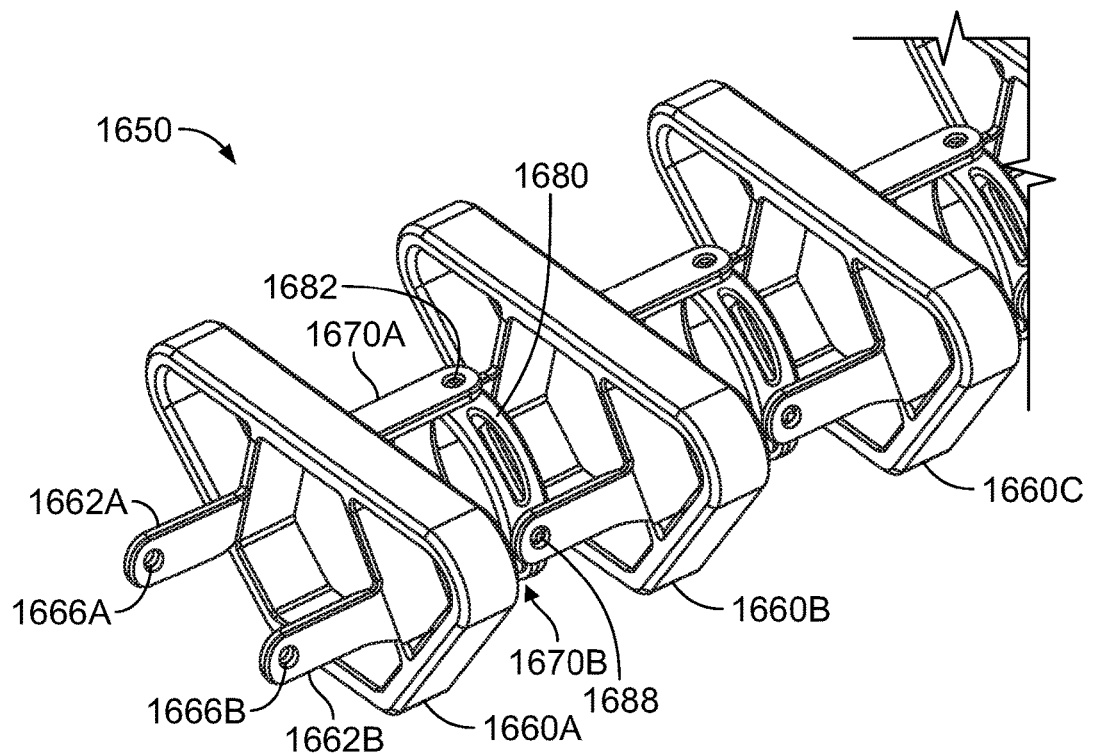
FIG. 32C is an illustration an exemplary bladder support.

FIG. 32C illustrates a perspective view of a multi-segmented articulated bladder support 1650. As illustrated, the multi-segmented articulated bladder support 1650 comprises a plurality of bladder segments 1660A-B that are fixedly attached to one another by way of a joining member 1680. In this illustrated arrangement, the joining member 1680 comprises a ring joining member. As also illustrated, each bladder support segment 1660A-C comprises a four sided support structure wherein each of these bladder support segments are joined to an adjacent bladder support segment by way of a ring joining member.

To enable joining adjacent bladder support segments, each bladder support segment 1660A-C comprises two vertically oriented, forward facing arm segments. For example, the first bladder support segment 1660A comprises a first forward facing arm segment 1662A and a second vertically oriented, forward facing arm segment 1662B. Each of these forward facing arm segments 1662A,B define a receiving cavity. For example, the first vertically oriented, forward facing arm segment 1662A defines a first receiving cavity 1666A and the second vertically oriented, forward facing arm segment 1662B defines a second receiving cavity 1662B.

Similarly, each bladder support segment 1660A-C comprises two horizontally oriented, rearward facing arm segments. In addition, each of these rearward facing arm segments define a receiving cavity. For example, first horizontally oriented, rearward facing arm segment 1670A of the first bladder support segment 1660A defines a first receiving cavity 1674A. Similarly, the second horizontally oriented, rearward facing arm segment 1670B of the first bladder support segment 1660A defines a second receiving cavity. (not shown in FIG. 32C). The second and third bladder support elements 1660B and 1660C comprise similar structures.

As also illustrated in FIG. 32C, the ring joining member 1680 comprises a generally circular geometry. Along an outside surface of the ring joining member 1680, a plurality of radially extending protrusions are provided. For example, in the ring joining member arrangement illustrated in FIG. 32C, four equally spaced radially extending protrusions are provided along an outer surface of the ring joining member 1680. In FIG. 32C, only two of these radially extending protrusions 1682 and 1688 are illustrated.

When the various adjacent support segments 1660A-C are joined to another so as to define the articulated bladder support 1650 as illustrated in FIG. 32C, two of the protrusions of the ring joining member 1680 engage the forward vertically oriented arm segments 1562A,B of the second support segment 1660B and two of the pegs of the ring joining member 1680 engage the horizontally oriented, rearward facing arm segments of the first bladder support segment 1660A residing adjacent the second bladder support segment 1660B.

Figure 32D:
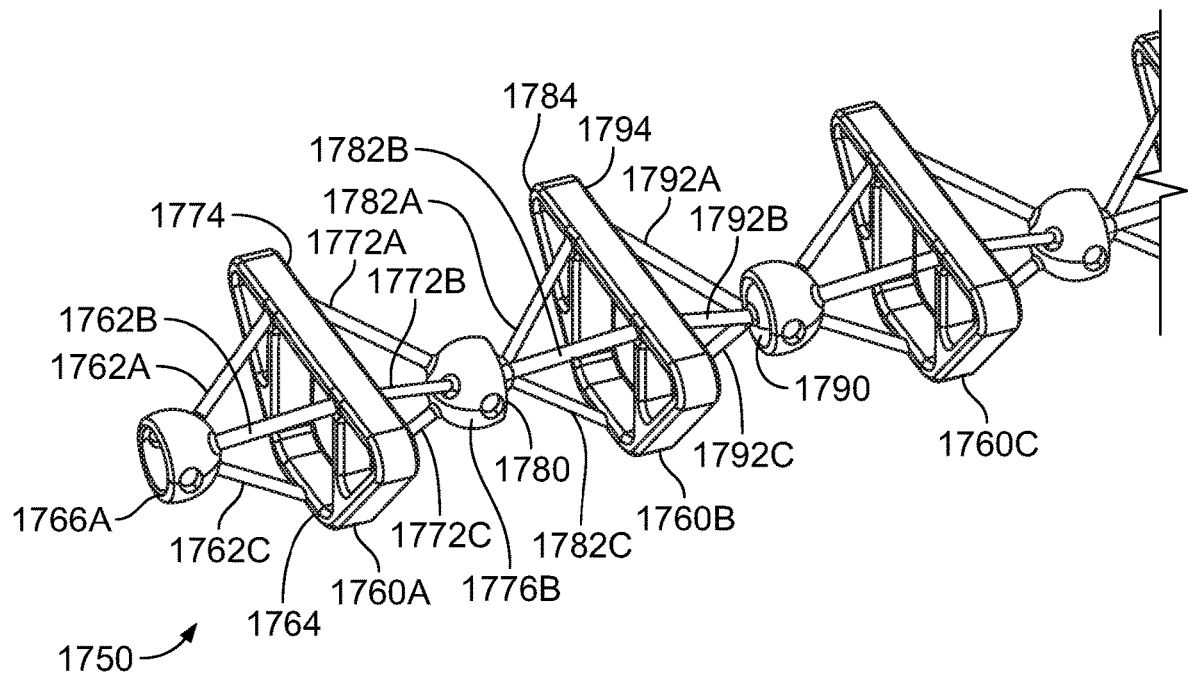
FIG. 32D is an illustration an exemplary bladder support.

FIG. 32D illustrates a perspective view of a multi-segmented articulated bladder support 1750. As illustrated, the multi-segmented articulated bladder support 1750 comprises a plurality of bladder segments 1760A-C that are fixedly attached to one another. In this illustrated arrangement, each bladder support segment 1760A-C comprises a four sided support structure that are joined to one another by way of a ball and socket member arrangement as herein described.

For example, the first bladder support segment 1760A comprises three arms that extend from a first surface 1764 of the bladder support segment 1760A. These three arms 1762A-C extend away from the first surface 1764 and support a first socket member 1766A. Similarly, the first bladder support segment 1760A comprises three arms 1772A-C that extend from a second surface 1774 of the bladder support segment 1760A. These three arms 1772A-C extend away from the second surface 1774 and support a second socket member 1776B. The third bladder support segment 1760C within the illustrated bladder support 1750 of FIG. 32D comprises a similar first and second socket member arrangement.

The second bladder support segment 1760B is of similar configuration to the first and second bladder support segments 1760A and 1760C. However, rather than comprise first and second socket members, the second bladder support segment 1760B comprises a first and second ball member arrangement.

For example, the second bladder support segment 1760B comprises three arms 1782A-C that extend from a first surface 1784 of the second bladder support segment 1760B. These three arms 1782A-C extend away from the first surface 1784 to support a first ball member 1780. Similarly, the second bladder support segment 1760B further comprises three arms 1792A-C that extend from a second surface 1794 of the second bladder support segment 1760B. These three arms 1792A-C extend away from the second surface 1794 so as to support a second ball member 1790.

When the various adjacent support segments 1760A-C are joined to another so as to define the articulated bladder support 1750 as illustrated in FIG. 32D, the first ball member 1780 of the second support segment 1760B is removably coupled to the second 1776B of the first support segment. Similarly, the second ball member 1790 of the second support segment 1760B is removably joined to a first of the third support segment 1760C.

Figure 33:
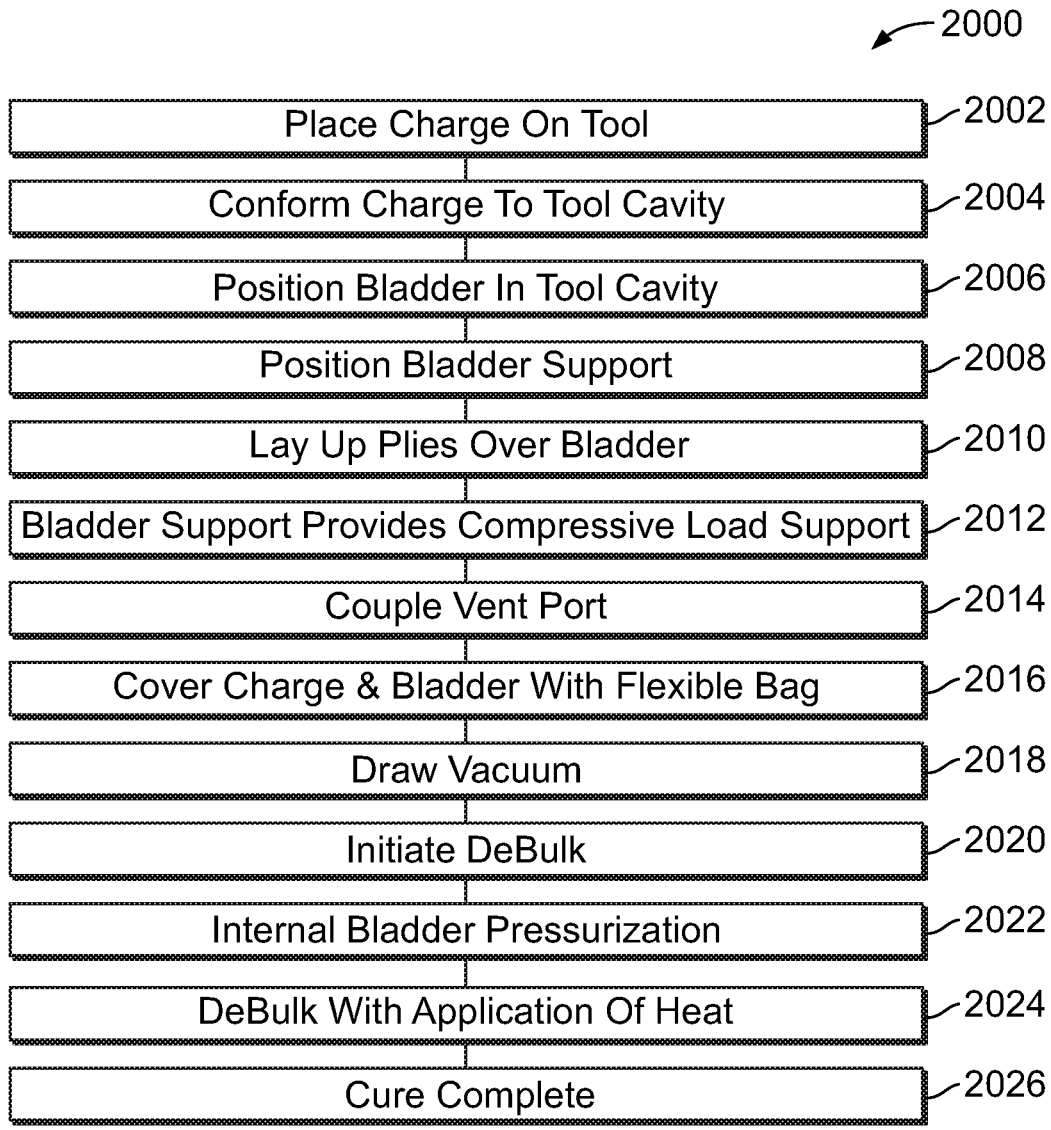
FIG. 33 illustrates steps of a method for autoclave curing using a bladder support, such as the bladder supports arrangements illustrated in FIGS. 14-32.
Figure 34:
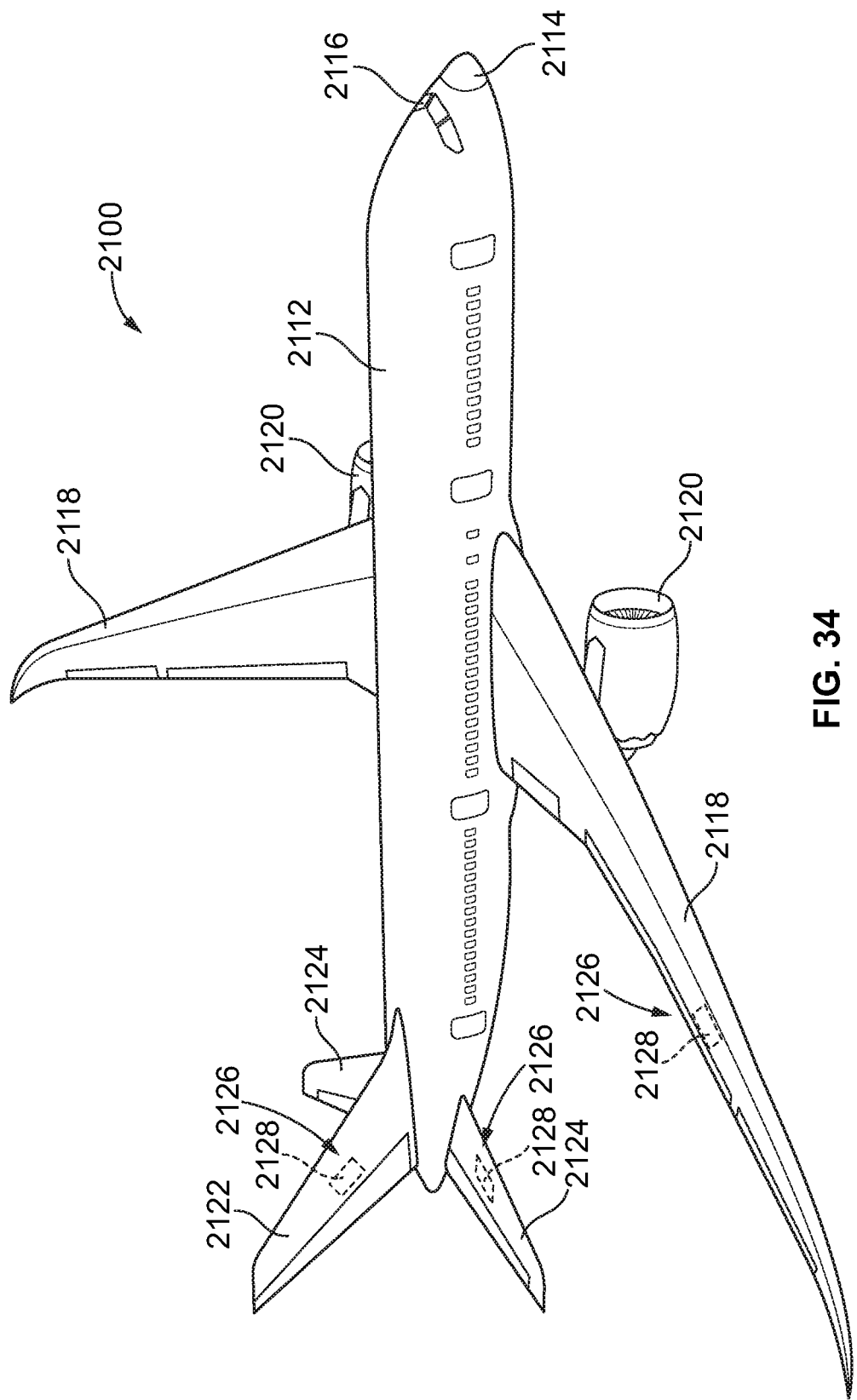
FIG. 34 is an illustration of a perspective view of an aircraft that may incorporate one or more composite laminate structures manufactured in accordance with one or more arrangements disclosed herein.

One advantage of utilizing an articulated bladder support structure, such as those articulated bladder support structures illustrated in FIGS. 32-34, is their ease of manufacturing. That is, a single bladder support segment, such as the bladder support segments 1588 can manufactured and then the final bladder support structure can be assemble to a specific or desired length, depending on the application.

Attention is now directed to FIG. 33 which broadly illustrates steps of a method 2000 for autoclave curing using a bladder system comprising a bladder support, such as the bladder supports described above with reference to FIGS. 14-32. For example, and beginning at step 2002, a composite resin charge is supported within an autoclave by being placed on a suitable tool, such as the cure tool 15 discussed with reference to FIG. 1. At step 2004, forming aids (not shown) may be used to press the various plies making up the charge down into the mold cavity, and conform the charge to radii in the mold cavity.

At step 2006, a bladder is positioned into the tool cavity over the charge. Such a bladder may comprise wave features as disclosed herein. In addition, such a bladder may comprise a multilayered bladder system as described herein. At step 2008, a bladder support is positioned into a cavity defined by the bladder.

At step 2010, plies are laid by a machine over the bladder creating a head pressure on the bladder. At step 2012, the bladder support provides a compressive load support between the plies being laid by the machine and the bladder itself. At step 2014, the bladder may be coupled to a vent port. Such a venting port allows the bladder to be inflated to a desired pressure and also allows the bladder to inflate to a desired cross section size. Such a venting port 176 is illustrated in FIGS. 7 and 9. At step 2016, the composite charge along with the bladder are covered with a flexible bag such as the vacuum bag 25 illustrated in FIG. 1. The vacuum bag may then be sealed to the cure tool. At step 2018, a vacuum within the vacuum bag is drawn.

At step 2020, the debulk process is initiated wherein autoclave pressure PA is applied to the vacuum bag in order to initiate compression of the various plies making up the charge. In addition, autoclave pressure PA is also initially applied to an interior or cavity of the bladder by way of the venting port, pressurizing the bladder so as to react to forces applied to the composite charge by autoclave pressure.

At step 2022, the interior of the bladder is internally pressurized with autoclave pressure PA. This internal pressurization of the bladder causes a force PA to be applied to the composite charge. Therefore, the composite charge being molded can be cured in the autoclave while the bladder maintains its inflated state at this desired cross section size. An increased bladder cross section size helps to ensure, that during the curing and molding process, the outer surface of the composite charge will be forced against respective tool surfaces of the tool. This also increases the effective pressure applied to the inside radii of the charge.

At step 2024, debulking of the charge continues under the application of heat. Debulking continues by compacting or squeezing out air and volatiles between plies or prepreg laminates of the charge under moderate heat and vacuum so as to insure seating on the tool, to prevent wrinkles, and to promote adhesion. At step 2026, when curing is complete, the autoclave pressure PA is removed from the vacuum bag, and therefore is also removed from the interior of the bladder.

FIG. 34 is an illustration of a perspective view of an aircraft 2100 that may incorporate one or more composite laminate structures manufactured by one of the bladder system arrangements of the present disclosure. As shown in FIG. 34, the aircraft 2100 comprises a fuselage 2112, a nose 2114, a cockpit 2116, wings 2118 operatively coupled to the fuselage 2120, one or more propulsion units 2120, a tail vertical stabilizer 2122, and one or more tail horizontal stabilizers 2124. Although the aircraft 2100 shown in FIG. 34 is generally representative of a commercial passenger aircraft, the one or more composite laminates, as disclosed herein, may also be employed in other types of aircraft or air vehicles. More specifically, the teachings of the disclosed arrangements may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that arrangements of structures and methods in accordance with the disclosure may be utilized in other transport vehicles, such as boats and other watercraft, trains, automobiles, trucks, buses, or other suitable transport vehicles formed from or utilizing the composite laminates as disclosed herein.

Figure 35:
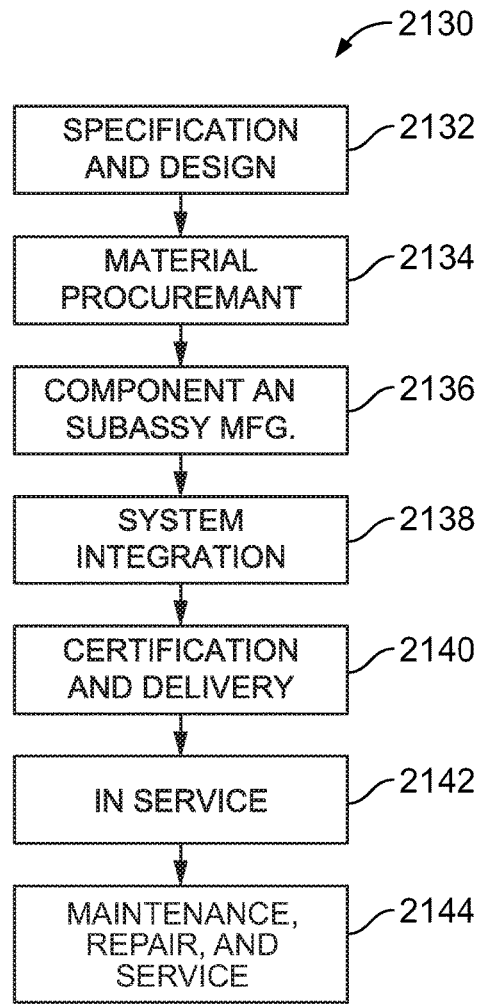
FIG. 35 is an illustration of a flow diagram of aircraft production and service methodology.
Figure 36:
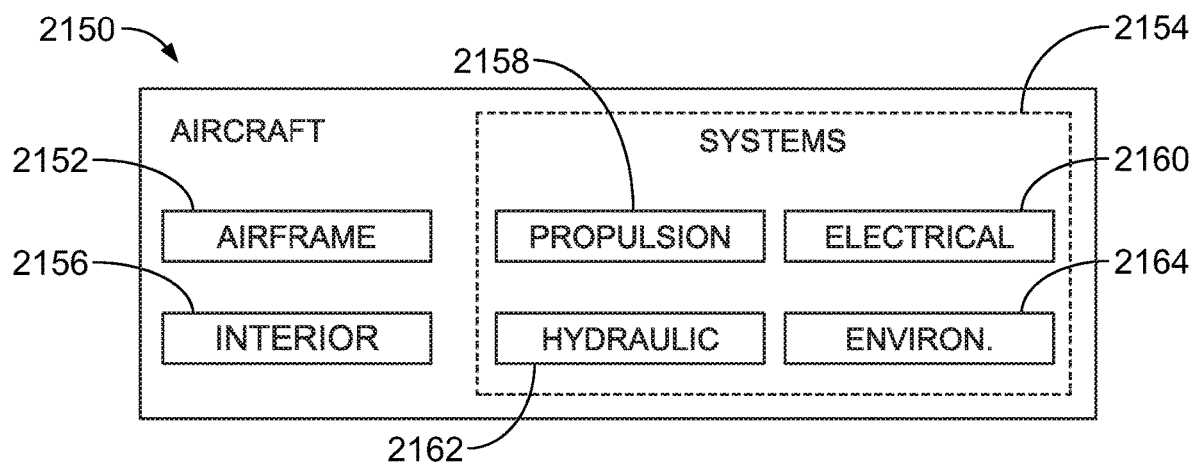
FIG. 36 is an illustration of a block diagram of an aircraft.

Arrangements of the disclosure may find use in a variety of potential applications, particularly in the transportation industry, including for example, aerospace, marine, automotive applications and other application where thermoplastic composite structures may be used. Therefore, referring now to FIGS. 35 and 36, arrangements of the disclosure may be used in the context of an aircraft manufacturing and service method 2130 as shown in FIG. 34 and an aircraft 2150 as shown in FIG. 36. Aircraft applications of the disclosed arrangements may include, for example, without limitation, the design and fabrication of composite laminates fabricated by way of one or more of the various bladder systems as disclosed herein.

During pre-production, exemplary method 2130 may include specification and design 2132 of the aircraft 2150 and material procurement 2134. As just one example, for the specification and design of the aircraft related composite laminates, the desired engineering characteristics of the bladder system may be determined at this step. This might include the selection of bladder system type for manufacturing a composite laminate that requires a cavity, such as the stringer illustrated in FIG. 2. Such a bladder system may comprise a bladder system comprising wave features, a multilayered bladder system, a bladder system utilizing a bladder support, or perhaps a combination thereof.

As another example, during this specification and design step, in one particular bladder system arrangement, the type of wave features may be selected. In yet another example, during this specification and design step, if a multilayered bladder system is selected, the thickness of the bladder inner layer or bladder outer layer and/or whether inner layer and outer layer overlaps may be determined. In addition, during this specification and design step, the use of one or more bladder supports may be determined. As just another example, at this design step, it may be determined that a combination of a bladder wave features, a multilayered bladder system, and a bladder support are to be employed in the manufacturing the composite laminate.

During production, component and subassembly manufacturing 2136 and system integration 2138 of the aircraft 2150 takes place. After such a component and subassembly manufacturing step, the aircraft 2150 may go through certification and delivery 2140 in order to be placed in service 2142. While in service by a customer, the aircraft 2150 is scheduled for routine maintenance and service 2144, which may also include modification, reconfiguration, refurbishment, and so on.

Each of the process steps of method 2150 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 36, the aircraft 2150 produced by exemplary method 2130 may include an airframe 2152 with a plurality of high-level systems 2154 and an interior 2156. Examples of high-level systems 2154 may include one or more of a propulsion system 2158, an electrical system 2160, a hydraulic system 2162, and an environmental system 2164. Any number of other systems may be included. Although an aerospace example is shown, the principles of the disclosure may be applied to other industries, such as the marine and automotive industries.

Systems and methods embodied herein may be employed during any one or more of the stages of the production and service method 2130. For example, components or subassemblies corresponding to production process may be fabricated or manufactured in a manner similar to components or subassemblies produced while the aircraft 2150 is in service. Also, one or more apparatus arrangements, method arrangements, or a combination thereof may be utilized during the production stages 2132 and 2134, for example, by substantially expediting assembly of or reducing the cost of an aircraft 2150. Similarly, one or more of apparatus arrangements, method arrangements, or a combination thereof may be utilized while the aircraft 2150 is in service, for example and without limitation, to maintenance and service 2144.

The description of the different advantageous arrangements has been presented for purposes of illustration and description, and is not intended to be exhaustive or limited to the arrangements in the form disclosed. Many modifications and variations will be apparent to those of ordinary skill in the art. Further, different advantageous arrangements may provide different advantages as compared to other advantageous arrangements. The arrangement or arrangements selected are chosen and described in order to best explain the principles of the arrangements, the practical application, and to enable others of ordinary skill in the art to understand the disclosure for various arrangements with various modifications as are suited to the particular use contemplated.

We claim:

1. A multilayered bladder system comprising:
   an outer bladder layer, wherein a first portion of the outer bladder layer overlaps a second portion of the outer bladder layer;
   an intermediate bladder layer contained within the outer bladder layer;
   an inner bladder layer contained within the intermediate bladder layer, wherein a third portion of the inner bladder layer overlaps a fourth portion of the inner bladder layer; and
   a separate inner layer between the third portion and the fourth portion, the separate inner layer comprising nylon.

2. The multilayered bladder system of claim 1, wherein the first portion overlaps the second portion over less than an entirety of a length of an outer face of the outer bladder layer.

3. The multilayered bladder system of claim 1, wherein the third portion overlaps the fourth portion over less than an entirety of a length of an outer face of the inner bladder layer.

4. The multilayered bladder system of claim 1, wherein the first portion of the outer bladder layer overlaps the second portion of the outer bladder layer by a first distance, and wherein the third portion of the inner bladder layer overlaps the fourth portion of the inner bladder layer over a second distance that is less than the first distance.

5. The multilayered bladder system of claim 4, wherein the first distance is parallel to the second distance.

6. The multilayered bladder system of claim 4, wherein the first portion overlaps the second portion over an entirety of a length of an outer face of the outer bladder layer.

7. The multilayered bladder system of claim 4, wherein the first portion overlaps the second portion over less than an entirety of a length of an outer face of the outer bladder layer.

8. The multilayered bladder system of claim 4, wherein the third portion overlaps the fourth portion over an entirety of a length of an outer face of the inner bladder layer.

9. The multilayered bladder system of claim 4, wherein the third portion overlaps the fourth portion over less than an entirety of a length of an outer face of the inner bladder layer.

10. The multilayered bladder system of claim 4, wherein the intermediate bladder layer comprises nylon, fiberglass, or a rigid material.

11. The multilayered bladder system of claim 4, further comprising a second separate inner layer on an inner face of the inner bladder layer, the second separate inner layer comprising a fluoroelastomer, nylon, or fiberglass.

12. The multilayered bladder system of claim 4, further comprising a second separate inner layer between the intermediate bladder layer and the outer bladder layer, the second separate inner layer comprising a fluoroelastomer, nylon, or fiberglass.

13. The multilayered bladder system of claim 1, wherein the first portion of the outer bladder layer overlaps the second portion of the outer bladder layer by a first distance, and wherein the third portion of the inner bladder layer overlaps the fourth portion of the inner bladder layer over a second distance that is greater than the first distance.

14. The multilayered bladder system of claim 13, further comprising a second separate inner layer that includes a first rigid corner and a second rigid corner, wherein the second separate inner layer is between the inner bladder layer and the intermediate bladder layer.

15. The multilayered bladder system of claim 13, wherein the first portion overlaps the second portion over less than an entirety of a length of an outer face of the outer bladder layer.

16. The multilayered bladder system of claim 13, wherein the third portion overlaps the fourth portion over an entirety of a length of an outer face of the inner bladder layer.

17. The multilayered bladder system of claim 13, wherein the third portion overlaps the fourth portion over less than an entirety of a length of an outer face of the inner bladder layer.

18. The multilayered bladder system of claim 13, wherein the intermediate bladder layer comprises nylon, fiberglass, or a rigid material.

19. The multilayered bladder system of claim 1, wherein the separate inner layer comprises fiberglass.

20. The multilayered bladder system of claim 1, wherein the separate inner layer comprises a fluoroelastomer.

* * * * *